(12) United States Patent
Oliver et al.

(10) Patent No.: US 12,246,678 B2
(45) Date of Patent: Mar. 11, 2025

(54) MOUNTED RETRACTABLE CATWALK FOR TRUCKS, UTILITY, CONSTRUCTION, AND INDUSTRIAL VEHICLES AND EQUIPMENT

(71) Applicant: ANDERSON & WOOD CONSTRUCTION CO., INC., Meridian, ID (US)

(72) Inventors: Fred S. Oliver, Eagle, ID (US); Michael R. Bruett, Caldwell, ID (US); Chase C. Oliver, Meridian, ID (US); Lee M. Ward, Meridian, ID (US)

( * ) Notice: Subject to any disclaimer, the term of this patent is extended or adjusted under 35 U.S.C. 154(b) by 1206 days.

(21) Appl. No.: 17/028,987

(22) Filed: Sep. 22, 2020

(65) Prior Publication Data

US 2021/0070223 A1    Mar. 11, 2021

Related U.S. Application Data

(63) Continuation-in-part of application No. 16/052,572, filed on Aug. 1, 2018, now Pat. No. 10,780,831, (Continued)

(30) Foreign Application Priority Data

May 1, 2017   (CA) .................................. CA 2965639

(51) Int. Cl.
    *B60R 3/00*    (2006.01)
(52) U.S. Cl.
    CPC .................................. *B60R 3/005* (2013.01)
(58) Field of Classification Search
    CPC ..... B60R 3/005; B60P 3/34; B63B 2017/045; B63B 17/04; E04B 1/003; E04B 1/1344; E06C 9/00
    See application file for complete search history.

(56) References Cited

U.S. PATENT DOCUMENTS 2,767,032 A   10/1956   Mitchell
3,110,359 A   11/1963   Solomon
(Continued)

OTHER PUBLICATIONS

Kringstad Ironworks, Folding Catwalks, http://www.kringstadiron.com/products_fcatwalks.cfm, at least as early as Dec. 12, 2016.
(Continued)

*Primary Examiner* — Colleen M Chavchavadze
(74) *Attorney, Agent, or Firm* — Pedersen and Company, PLLC; Ken J. Pedersen; Barbara S. Pedersen

(57) ABSTRACT

A catwalk includes a mounting frame or other connection to a side of a vehicle/equipment, a floor, and at least one railing/railing-portion; an actuator system to move the catwalk enclosure between retracted and deployed positions; and a guide arm for guiding/controlling pivoting of the at least one railing/railing-portion relative to the floor. The actuator system and guide arm are preferably substantially or entirely outside of the catwalk walkway space, for easy movement along the walkway, easy access to the walkway at one or both ends, and obstacle/barrier-free passage from one catwalk to another on the same vehicle/equipment. The actuator system prevents the catwalk from collapsing/retracting when a person is on the catwalk, for example, by the lift capacity of a hydraulic or pneumatic cylinder being controlled/tuned so that the cylinder does not have the capacity/capability to lift and retract the catwalk when the catwalk is occupied.

22 Claims, 54 Drawing Sheets

Related U.S. Application Data which is a continuation-in-part of application No. 15/936,973, filed on Mar. 27, 2018, now Pat. No. 10,780,830.

(60) Provisional application No. 62/477,362, filed on Mar. 27, 2017.

(56) References Cited

U.S. PATENT DOCUMENTS

| | | | |
|---|---|---|---|
| 3,493,079 A | | 2/1970 | Dudschus |
| 3,601,220 A | | 8/1971 | Saucier |
| 3,989,122 A | | 11/1976 | Jenkins |
| 4,090,585 A | * | 5/1978 | Laub ................. E04B 1/003 182/47 |
| 4,371,056 A | | 2/1983 | Anglade |
| 4,408,948 A | | 10/1983 | Robinson |
| 4,613,155 A | * | 9/1986 | Greenwood ....... A01D 41/1261 105/457 |
| 4,936,407 A | | 6/1990 | Brock et al. |
| 5,634,681 A | | 6/1997 | Gionta |
| 5,799,962 A | | 9/1998 | Barnhart |
| 6,045,157 A | | 4/2000 | Poulin |
| 6,068,277 A | | 5/2000 | Magnussen |
| 6,431,093 B1 | | 8/2002 | Hansen |
| 6,494,291 B2 | | 12/2002 | Ono |
| 6,598,704 B2 | | 7/2003 | Hansen |
| 7,174,993 B2 | | 2/2007 | Lantz |
| 7,841,645 B2 | * | 11/2010 | Diamond ................. B60P 3/34 296/165 |
| D670,639 S | | 11/2012 | Hanks et al. |
| 8,317,249 B2 | | 11/2012 | Slater et al. |
| 8,632,099 B2 | | 1/2014 | Conny et al. |
| 8,745,799 B1 | | 6/2014 | Thomasson et al. |
| 9,334,023 B2 | * | 5/2016 | Admire ................. B63B 29/00 |
| 9,470,050 B2 | | 10/2016 | Yorga et al. |
| 9,701,249 B2 | * | 7/2017 | Leitner ................. B60R 3/02 |
| 9,944,231 B2 | * | 4/2018 | Leitner ................. B60R 3/02 |
| 9,957,016 B2 | * | 5/2018 | Grimaldi ............... B63B 17/04 |
| 10,077,002 B2 | * | 9/2018 | Okuyama ............. B60R 3/002 |
| 10,730,372 B2 | * | 8/2020 | Roth ................. B60P 1/435 |
| 10,780,830 B2 | | 9/2020 | Oliver et al. |
| 10,780,831 B2 | | 9/2020 | Oliver et al. |
| 10,875,456 B2 | * | 12/2020 | Beam, IV ............. B60R 3/005 |
| 2002/0189503 A1 | | 12/2002 | Hansen |
| 2003/0020253 A1 | | 1/2003 | Bosman et al. |
| 2013/0187351 A1 | | 7/2013 | Reguis et al. |
| 2017/0144603 A1 | | 5/2017 | Matthiesen |
| 2017/0283010 A1 | | 10/2017 | Dishon |
| 2018/0215421 A1 | | 8/2018 | Claerhout et al. |
| 2018/0272951 A1 | | 9/2018 | Oliver |
| 2019/0135185 A1 | | 5/2019 | Oliver et al. |

OTHER PUBLICATIONS

Aquaneering, Truck-mounted Pneumatic Walkway, http://www.aquaneer.com/stainless_steel_fish_transport_tanks.php, at least as early as Dec. 12, 2016.

Kleint Industries, Truck Mounted Pull Out Walkway, http://www.kleintindustries.com.au/support-trucks, at least as early as Dec. 12, 2016.

Truckstanks.com, Safety Handrail System, https://trucktanks.com/handrail-safety-system-truck-trailer/, at least as early as Dec. 12, 2016.

* cited by examiner

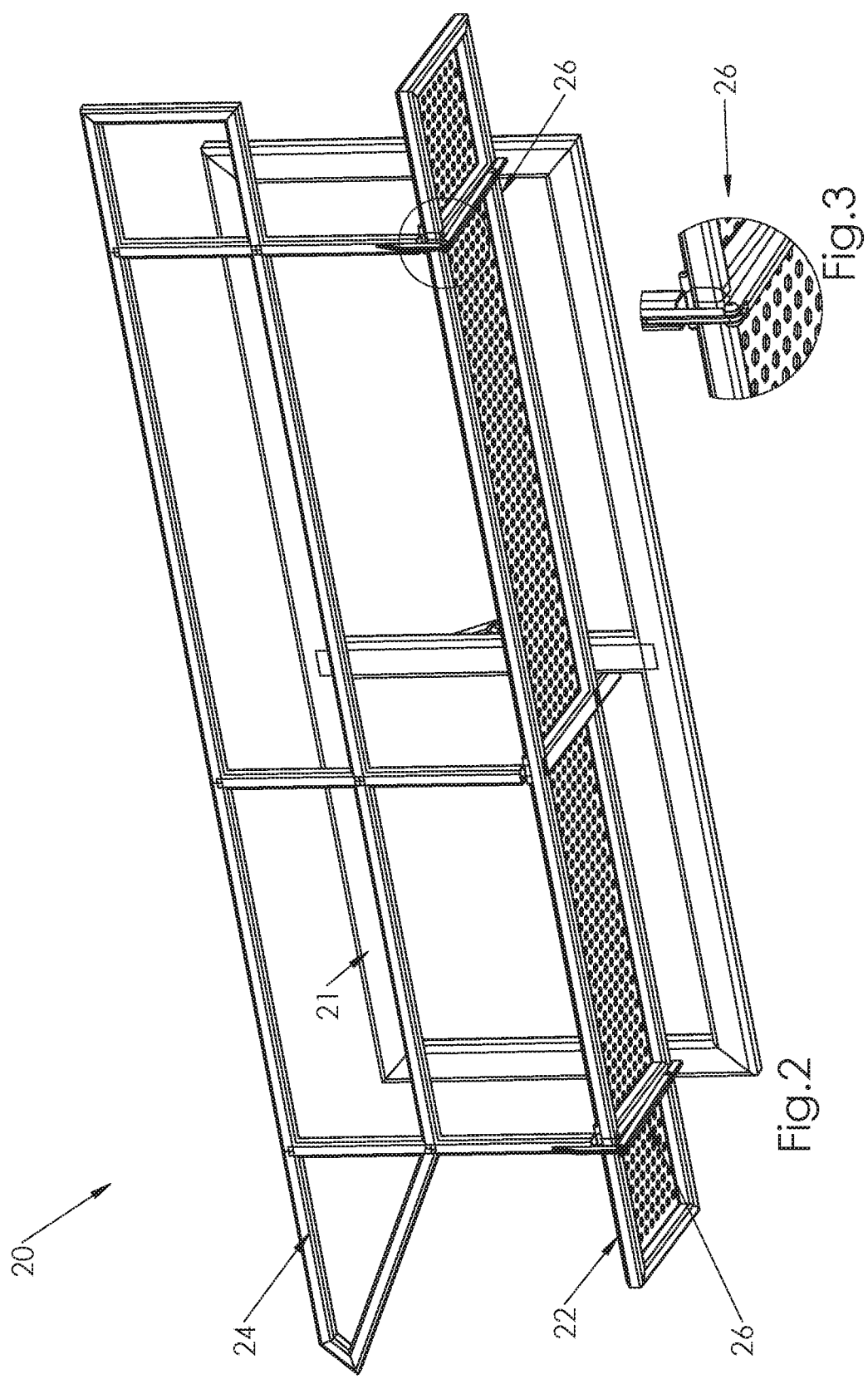

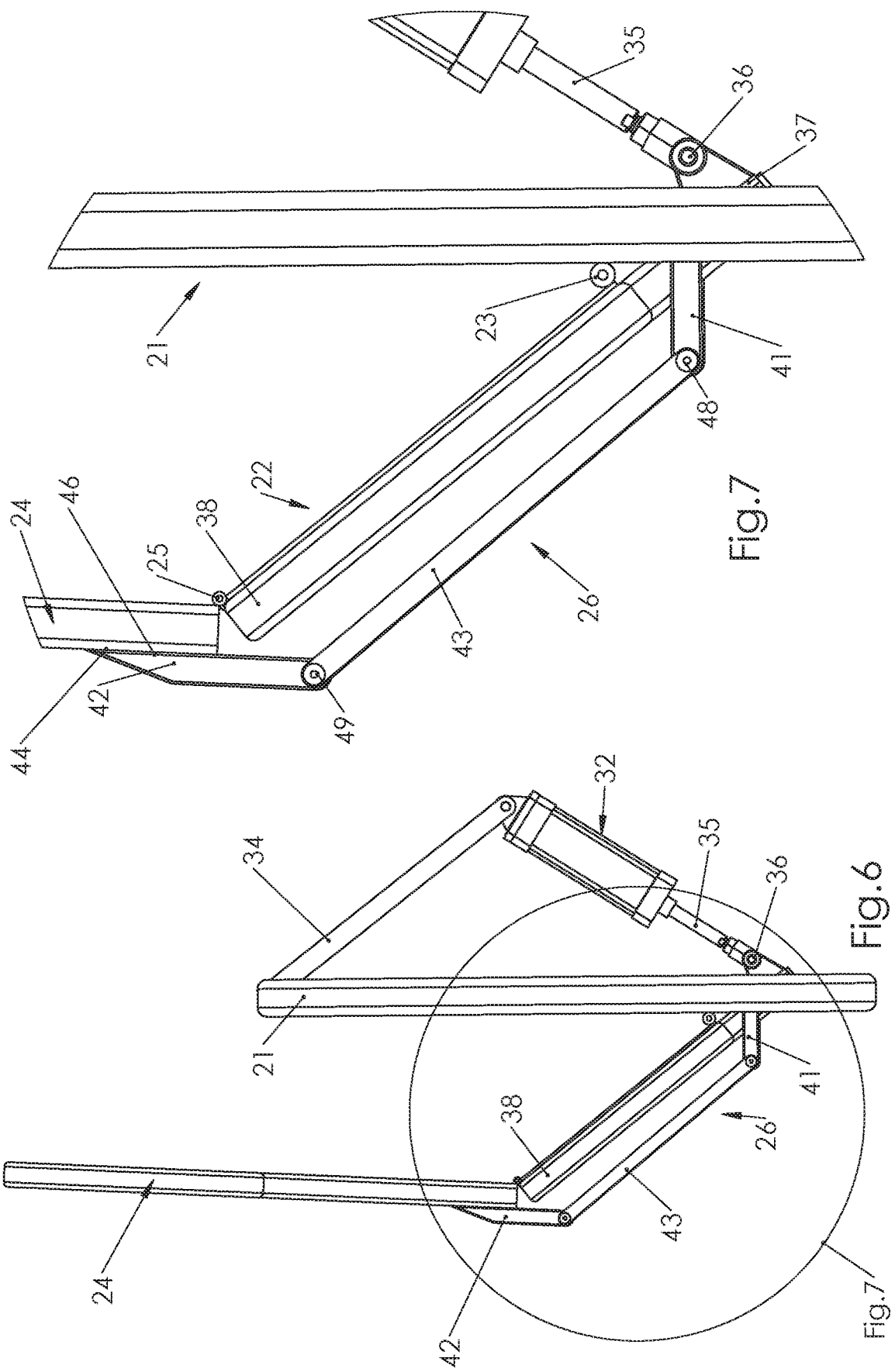

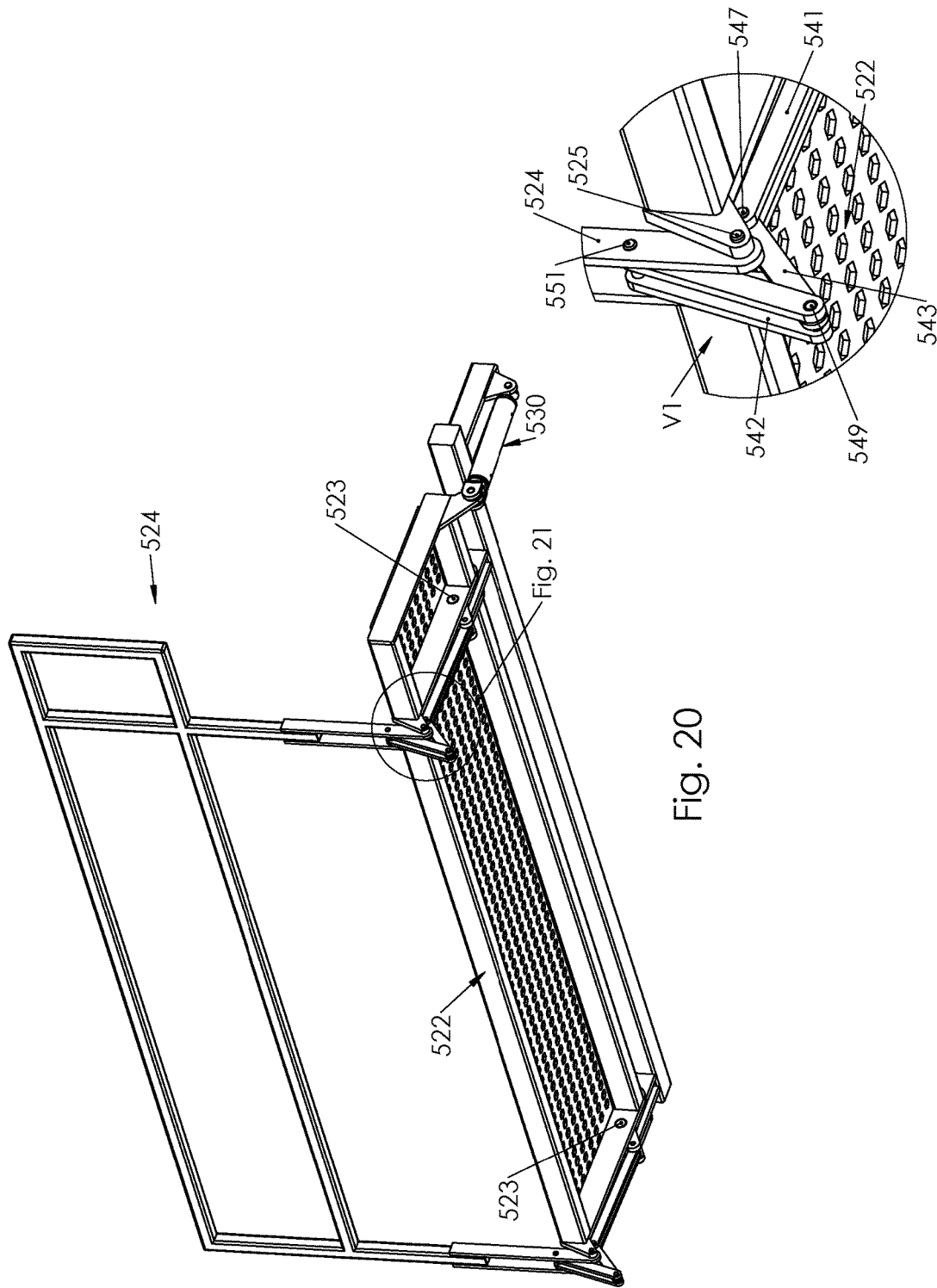

MOUNTED RETRACTABLE CATWALK FOR TRUCKS, UTILITY, CONSTRUCTION, AND INDUSTRIAL VEHICLES AND EQUIPMENT

This application is a continuation-in-part of Non-Provisional application Ser. No. 16/052,572, filed Aug. 1, 2018 and issued as U.S. Pat. No. 10,780,831 on Sep. 22, 2020, which is a continuation-in-part of Non-Provisional application Ser. No. 15/936,973, filed Mar. 27, 2018, which claims benefit of U.S. Provisional Application Ser. No. 62/477,362, filed Mar. 27, 2017, and which also claims priority of Canadian Application No. 2,965,639, filed May 1, 2017, all of which applications are entitled "Mounted Retractable Catwalk for Trucks, Utility, and Industrial Vehicles and Equipment", and wherein the entire disclosures of all the above applications are incorporated herein by this reference.

BACKGROUND

Field of the Invention

The invention relates to catwalks that include an elevated walkway for one or more persons who need to walk or stand in the elevated position on a vehicle or equipment, for example, to work on part of, or on equipment mounted on, a truck or other utility, construction, or industrial vehicles or equipment.

The floor of the catwalk elevates the person, allowing access to the bed of the vehicle and/or vehicle-mounted components therein, while the railing(s) allow(s) for hands-free movement by preventing the person from falling off of the catwalk platform. More specifically, the invention may comprise a foldable/collapsible catwalk for front, side, and/or rear mounting on a vehicle/equipment. The invention may allow particularly effective and efficient movement of the catwalk, between a retracted/stored position (or "configuration") and a deployed/in-use position (or "configuration"), and also effective and safe movement of a user on the catwalk and between multiple catwalks on a vehicle or equipment. In the retracted position, the catwalk is collapsed to a compact form/configuration against the side of the vehicle or equipment for safe and convenient travel of the vehicle or equipment on- or off-road and for secure and convenient storage of the vehicle or equipment.

Related Art

Patent literature discloses railings that may be moved between a compact, stored form and position to an in-use form and position, so that a user may walk/stand on top of a tank trailer ("tanker") and be protected by the railings from falling off the tank. A railing is raised at one or both edges of the top of the tank so that the user may walk/stand on top of said tank. Examples of these tanker safety railings include: Brock U.S. Pat. No. 4,936,407; Lantz U.S. Pat. No. 7,174,933; Poulin U.S. Pat. No. 6,045,157; and Bossman Publication No. 2003/0020253.

Hansen U.S. Pat. No. 6,598,704 discloses a catwalk that is hung/attached to the side of a truck bed. The Hansen device includes a floor and a side-railing and can be folded up along the side of the truck bed. The Hansen device is manually-operated by use of a handle. The Hansen device hangs the deployed floor from two chains, which, by their position and length, prevent the floor from pivoting downward farther than desired. Each chain extends, from near the truck bed, down and outward to the bottom edge of the floor of the catwalk, and the chain length limits the downward pivoting of the floor.

Commercial internet advertising by AQUANEERING™ discloses a catwalk for a fish transport tank, wherein the catwalk is a rigid unit comprising a floor and railing that do not pivot or move relative to each other. The entire catwalk (floor and railing together as a unit) pivots up over the tank for storage/transport, placing the floor against the side of the tank and the railing (still at 90 degrees to the floor) over the top of the tank.

Ono U.S. Pat. No. 6,494,291 discloses a foldable gondola-like scaffold device, which can be hung from a support beam such as an I-beam. The gondola cage has a floor and a railing that are pivotal relative to each other, for being moved from a collapsed form to a deployed form, either manually and/or by the force of the weight of the gondola components. The Ono device hangs the deployed gondola cage from two link members (each made of link plates 10$a$, 10$b$), wherein each link member, by its position and length, prevents the cage from pivoting downward farther than desired. Each link member extends from the top of the cage's rear frame structure, down and outward to the top of the device's front frame structure. The link members support said front frame structure in a position spaced outwardly from said rear frame structure, and the link member length limits the downward pivoting of the cage and floor.

Greenwood U.S. Pat. No. 4,613,155 discloses a safety platform for a sanding truck, the platform having a pivotal floor and a pivotal railing. A piston and cylinder hydraulic actuator has a lower end below the floor that is connected to the sanding truck, and the actuator extends upward from that truck-connection to the floor. An upper end of the actuator connects to the floor at a floor-connection that is located outside (away from the sanding truck) relative to the pivotal connection of the floor to the truck. The Greenwood actuator lengthens/extends to push the platform up into, and to maintain the platform in, a deployed position for use. The Greenwood actuator shortens/retracts to pull the platform down to a retracted/collapsed position for storage. The Greenwood safety platform has a configuration and a center of gravity that assist in shortening/retracting the actuator and retracting/collapsing the safety platform. The weight of the floor and railing, and any person or other weight on the floor, assist retraction of the actuator and assist retraction/collapse of the platform.

In Greenwood U.S. Pat. No. 4,613,155, the retracted/collapsed floor extends down substantially vertically from its pivotal connection to the truck, placing the outer end/edge of the floor at the bottom end of the retracted/collapsed platform. Thus, the outer end/edge of the in-use floor becomes the bottom end of the in-storage floor. The retracted/collapsed railing extends up from said bottom end of the floor and along-side the floor.

There is still a need for an improved catwalk that provides a walkway at an elevated position beside the bed or platform of utility, construction, and industrial vehicles or equipment, for safe work or monitoring of the equipment on the bed or platform. Certain embodiments of the invented catwalk meet this need, while also providing safety features during use, and a small-footprint when retracted for storage or travel.

SUMMARY OF THE INVENTION

The invention comprises a catwalk or elevated walkway device and methods of using the device. The catwalk/walkway device comprises a floor and at least one railing that together form the walkway of the catwalk, an actuator system for moving the catwalk enclosure between a retracted position/configuration and a deployed position/configuration; and a guide arm system for guiding/controlling the pivoting of the railing relative to the floor, during movement of the catwalk and when the catwalk is in the deployed and/or retracted positions/configurations. The catwalk device may comprise a mounting frame, or other means of connection to a vehicle or equipment. Certain embodiments of the catwalk device may be adapted for installation and use in various locations on the vehicle/equipment, for example, to serve as front-mounted, left or right side-mounted, and/or rear mounted catwalks.

Certain embodiments of the actuator system and guide arm system of the catwalk or elevated walkway device (hereafter, simply "catwalk") are specially-adapted to provide a sleek design combined with effective operation. The actuator system may comprise a hydraulic or pneumatic cylinder(s) and actuator linkage(s) that are provided substantially or entirely outside of the walkway, for example, substantially or entirely between the walkway and the vehicle/equipment. Furthermore, the guide arm system may be provided substantially or entirely below and/or outside the floor and outer surface of the railing. Thus, preferably no portion of the actuator system or guide arm system protrudes into or across the walkway or the walkway ends. For example, there are preferably no bars or protrusions that the user must walk over or around when moving from one end of the walkway to another. For example, there are preferably no obstructions or protrusions bars, chains, link members, or other barriers protruding into or extending across the open ends of the catwalk walkway.

Therefore, certain embodiments of the catwalk may be described as "supported catwalks" that are supported in both deployed and retracted positions/configurations, and during transition between these positions/configurations, by guide arm and/or actuator systems that are substantially or entirely below and/or outside the walkway of the catwalk. These supported catwalks may be differentiated from suspended catwalks that hang the catwalk floor(s) and/or outer railing(s) from chains and/or other linkages. As in Hansen U.S. Pat. No. 6,598,704 and Ono U.S. Pat. No. 6,494,291, for example, a suspended catwalk/cage device typically comprises chains or other linkages anchored at their upper ends to member(s)/structure above the catwalk floor and extending down from the anchor points to connect at their lower ends to the catwalk floor or outer railing.

The supported-catwalk design of certain embodiments results in a lack of barriers/obstruction at the ends of the walkway, which may provide one or more of the benefits of: easy access to the walkway at one or both ends, for example, from a ladder(s) and/or from a cab or other platform of the vehicle/equipment; obstacle- and barrier-free passage from one catwalk to another on the same vehicle/equipment. For example, said obstacle- and barrier-free passage may be between a left-side and/or right-side mounted catwalk and a front-side and/or rear-side mounted catwalk of the same or similar construction and operation. In other words, access points may be at one or both ends of each catwalk, and/or the user may walk easily between adjacent catwalks provided on multiple sides (left, right, rear, or even front end) of the vehicle/equipment.

Preferred embodiments enhance safety by hindering or preventing the catwalk from retracting when a person is on the catwalk. This is preferably accomplished by designing and tuning the actuator system so that it is not capable of retracting the catwalk when a person is on the catwalk. The catwalk is deployed when the hydraulic and/or pneumatic cylinder(s) are in a retracted condition, and the cylinder(s) must extend/lengthen in order to retract the catwalk. Thus, when no pressure is applied to the cylinder(s), the catwalk remains in a fail-safe, deployed positions/configurations. When pressure is supplied to the cylinder(s), the pressure determines/controls the lift capacity of the cylinder(s), and the preferred embodiments limit the maximum pressure so that the cylinder(s) do not have the capacity/capability to retract the catwalk when occupied. The pressure of the preferred catwalk actuator system is pre-set by tuning the hydraulic valve that supplies the cylinder to ensure it has enough pressure to operate the cylinder and lift (retract) the catwalk, but not enough to overcome the added weight of a person on the catwalk. This safety feature is therefore accomplished automatically by tuning the cylinder to an account for the minimum expected weight of a person, before or during installation of the catwalk, so that accidental or even purposeful actuation of the cylinder will not cause or allow the catwalk to retract while a person is using the catwalk. This safety feature is therefore provided without the implementation or required use of complex controls, safety switches, or locks that must be remembered and properly operated by personnel. The chance of improper use, damage, or tampering with this safety feature is minute to non-existent.

Additional and alternative features of the invention will be apparent from the following description and the drawings.

BRIEF DESCRIPTION OF THE DRAWINGS

Regarding the drawings, the terms "right", "left", "front", and "rear" are used from the perspective of a driver of the vehicle/equipment to which the catwalk is typically attached.

FIG. 2 is a left-side, bottom perspective view of another embodiment of the invented catwalk, in deployed position, wherein this catwalk is longer from end to end, but of about the same height and width as the catwalk in FIG. 1, and wherein the vehicle/equipment to which the catwalk would typically be connected during use is not shown.

FIG. 3 is an enlarged view of a detail circled in FIG. 2.

FIG. 6 is a rear end view of the embodiment of FIG. 2, wherein the catwalk is being retracted so that it is part-way between the deployed position, and the retracted (or "collapsed" or "lifted") position.

FIG. 7 is an enlarged view of the detail circled in FIG. 6.

FIG. 11 is a rear perspective view of a left-side-mounted catwalk and a rear-side-mounted catwalk, according to certain embodiments of the invention, operatively connected to a cable reel truck and in deployed position.

FIG. 12 is a rear perspective view of the left-side-mounted catwalk and rear-side-mounted catwalk of FIG. 11, both partially retracted, for example, in "half-stroke" position due to the cylinders of their respective actuator systems being approximately half-extended.

FIG. 13 is a rear perspective view of the two catwalks of FIGS. 11 and 12 in fully-retracted position.

FIG. 14 is a right perspective view of the rear ends of the cable reel truck and left-side and rear-side catwalks of FIGS. 11-13, plus an embodiment of a right-side-mounted catwalk according to the invention, wherein all three catwalks are in deployed position/configuration.

FIG. 15 is a right perspective view of the rear ends of the truck and catwalks of FIG. 14, wherein all three catwalks are partially retracted, for example, in "half-stroke" position.

FIG. 16 is a right perspective view of the rear end of the truck and the catwalks of FIGS. 14 and 15, wherein all three catwalks are fully-retracted.

FIG. 17 is a rear view of the vehicle and catwalks of FIGS. 11-16, wherein all three catwalks are fully-extended.

FIG. 18 is a left perspective view of the vehicle and catwalks of FIGS. 11-17, wherein all three catwalks are fully-extended.

FIG. 20 is an outer perspective view of the catwalk embodiment of FIG. 19, in deployed position.

FIG. 21 is an enlarged view of a detail circled in FIG. 20.

FIG. 30 is an outer side perspective view of the catwalk embodiment of FIG. 19 installed on the exemplary vehicle and in the deployed position.

FIG. 31 is an outer side perspective view of embodiment of FIG. 30, with the catwalk retracted to the half-stroke position.

FIG. 32 is an outer side perspective view of the embodiment of FIG. 30, with the catwalk fully-retracted for travel or parking/storage of the vehicle and catwalk combination.

FIG. 33 is a rear view of left-side-mounted and rear-side-mounted catwalks according to the embodiment of FIG. 19, both in deployed position on the exemplary vehicle.

FIG. 34 is a rear view of the embodiment of FIG. 33, with both catwalks partially-retracted.

FIG. 35 is a rear view of the embodiment of FIG. 33, with both catwalks fully-retracted.

FIG. 36 is a top perspective view of the embodiment of FIGS. 33-35, with both catwalks in the deployed position.

FIG. 52 is an outer side perspective view of the catwalk embodiment of FIG. 37 installed on the exemplary vehicle and in the deployed position.

FIG. 53 is an outer side perspective view of the embodiment of FIG. 52, with the catwalk partially-retracted.

FIG. 54 is an outer side perspective view of the embodiment of FIG. 52, with the catwalk fully-retracted for travel or parking/storage of the vehicle and catwalk combination.

FIG. 55 is a rear view of left-side-mounted and rear-side-mounted catwalks according to the catwalk embodiment of FIG. 37, both catwalks in deployed position on the exemplary vehicle.

FIG. 56 is a rear view of the embodiment of FIG. 55, with both catwalks partially-retracted.

FIG. 57 is a rear view of the embodiment of FIG. 55, with both catwalks fully-retracted.

FIG. 58 is a top perspective view of the embodiment of FIGS. 55-57, with both catwalks in the deployed position.

DETAILED DESCRIPTION OF PREFERRED EMBODIMENTS

Referring to the Figures, there are shown several, but not the only, embodiments of a retractable catwalk, such as may be mounted on and used on various vehicles and/or equipment. For example, the catwalk may be mounted on a truck, trailer, utility vehicle and/or a construction vehicle. The preferred embodiments meet OSHA safety requirements while embodying an effective, efficient, and sleek design that provides a walkway with few to no obstacles or trip-hazards when deployed and that retracts to a very compact, vertical profile with a small footprint.

Certain embodiments of the catwalk are adapted for mounting on one or more sides, and/or on any side, of the vehicle/equipment, for example, to the right, left, rear, and/or front side of a vehicle/equipment bed/platform is that is hard or impossible to reach unless the person is elevated above the road/ground. Typically, the catwalk is connected to a structure at or near an outer side of the vehicle/equipment at least several feet above the road/ground, either by connection of a mounting frame of/for the catwalk to the vehicle/equipment, or by direct connection of the catwalk to the vehicle/equipment without the use of a mounting frame. Typically the catwalk is not mounted above and does not extend up above the top extremity horizontal plane of the vehicle/equipment, which is one of several ways that the catwalk is differentiated from railings provided on top of a tanker.

Therefore, the preferred embodiments provide safe access to much or all of the vehicle/equipment from positions at or near the upper and side perimeters of said vehicle/equipment. The preferred embodiments increase the ease and safety of work, monitoring and maintaining of equipment, and movement between areas of the truck/equipment. These benefits are accomplished without affecting, or, at most only very minimally affecting, the outside dimensions of the vehicle/equipment on which the catwalk is installed.

Catwalk Embodiments of FIGS. 1-18

Figure 1:
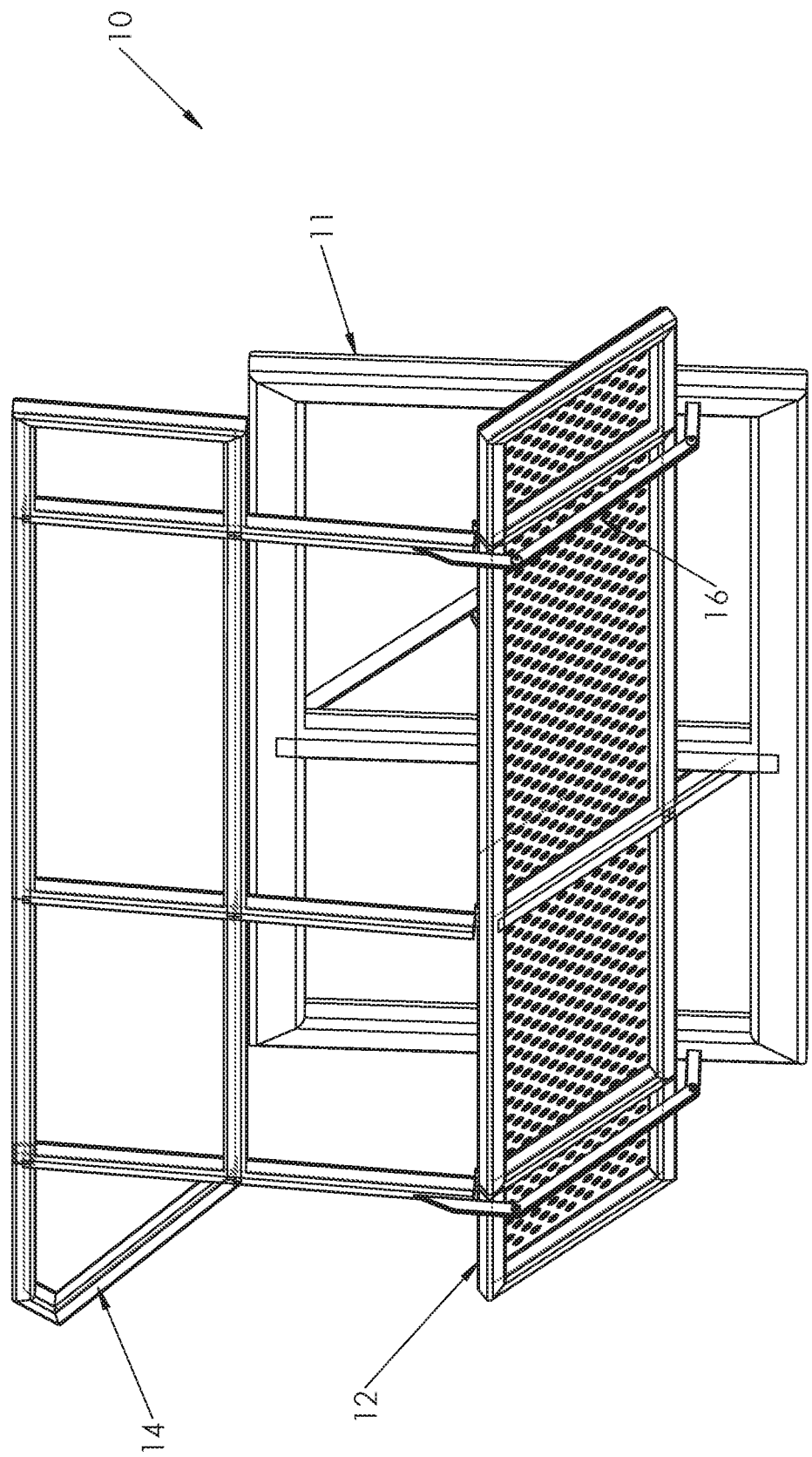
FIG. 1 is a left-side, bottom perspective view of one embodiment of the invented catwalk, in a partially deployed (or "partially extended" or "partially lowered") position/configuration, for example, about half way between the deployed and retracted positions/configurations, wherein the vehicle/equipment to which the catwalk would typically be connected during use is not shown.

A catwalk 10 according to certain embodiments of the technology is shown in FIG. 1. The catwalk 10 may be described as comprising, or being connected to, a mounting frame 11 for connection to the vehicle/equipment (hereafter "vehicle") and preferably for providing a hand-hold and/or barrier to prevent the user from falling off the catwalk toward/onto equipment in/on the vehicle, that is, in a direction opposite the catwalk outer railing. Further, the catwalk 10 comprises a floor 12 and at least one railing 14 that, together with the mounting frame 11, form/define the walkway of the catwalk. Further, the catwalk 10 comprises a hydraulic or pneumatic actuator system (not visible in FIG. 1) for moving the catwalk between a retracted configuration and position and a deployed configuration and position. Further, the catwalk 10 comprises a guide arm system 16 for guiding/controlling the pivoting of the railing 14 relative to the floor 12, and therefore the pivoting of the railing 14 relative to the mounting frame 11 and the vehicle/equipment, during said moving and when the catwalk is in both the retracted and the deployed positions. The catwalk 10 in FIG. 1 is about midway between the retracted and deployed positions, so that the floor 12 (or "main plane of the floor") is at about 45 degrees from horizontal. When the catwalk is in this midway position, each of the inner portion/end and the outer portion/end of the guide arm 16 are at obtuse angle(s) to the middle portion/arm of the guide arm 16, for example, at about 135 degrees to the middle portion/arm.

Figure 4:
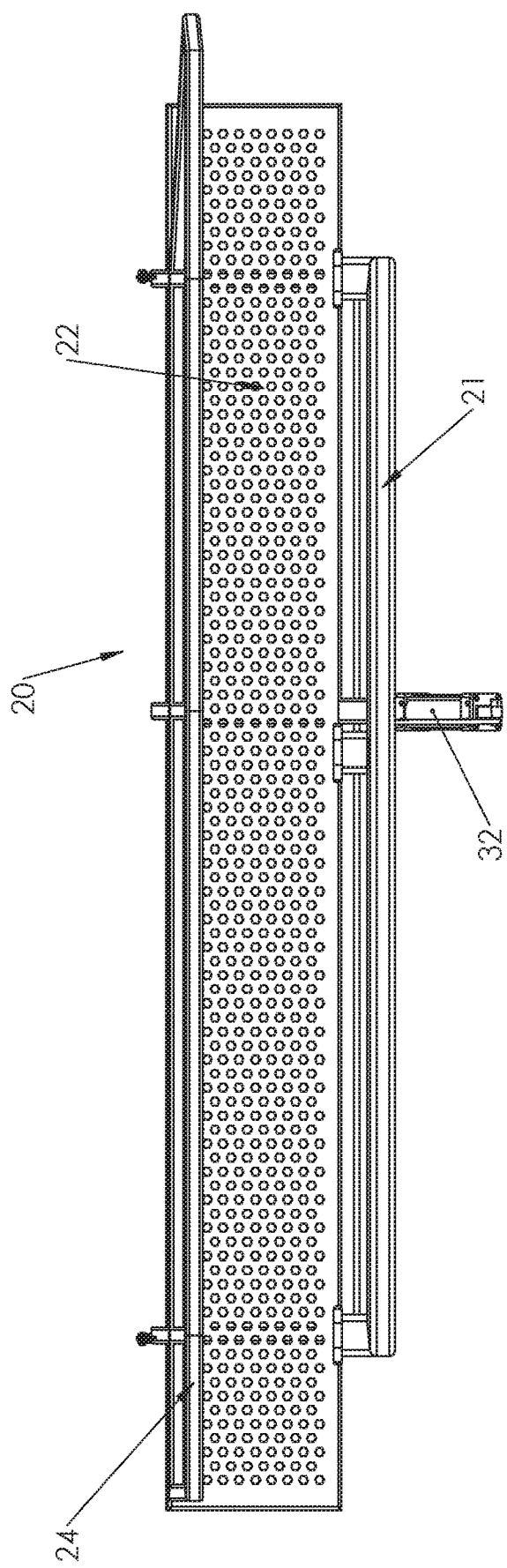
FIG. 4 is a top view of the embodiment of FIG. 2, which is still in the deployed condition.
Figure 10:
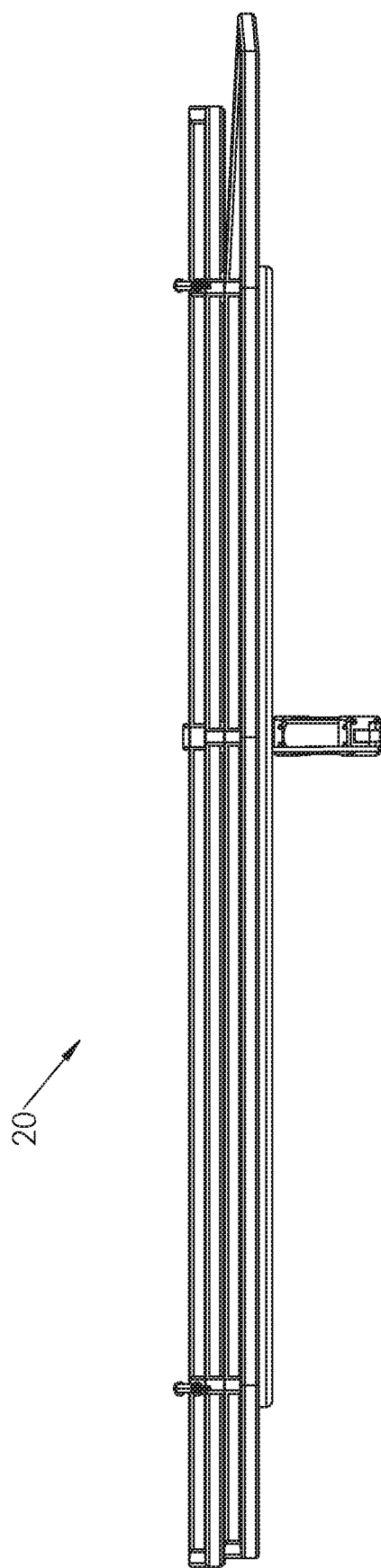
FIG. 10 is a top view of the catwalk of FIG. 2, when in the fully-retracted position of FIGS. 8 and 9.

FIGS. 2-9 portray an alternative catwalk 20 that is longer from front to rear compared to catwalk 10 of FIG. 1, but otherwise is similar in function and operation compared to catwalk 10. FIG. 2 (with detail FIG. 3) and FIG. 4 illustrate a left-side perspective view and a top view of the deployed catwalk, respectively. FIGS. 5-8, which are end views, show to best advantage the pivotal connections between the frame 21 and the floor 22, between the railing 14 and the floor 22, and between the three portions 41, 42, and 43 of the guide arm system 26. Throughout this document, the term "pivotal connection" is used to denote hinges, pivot/rotation axles, and/or other connecting structure that allows members to pivot or rotate at least to some extent relative to each other. In certain embodiments, pivot pins or axles may extend through holes at one or more locations on two members to allow said relative pivoting. While the term "pivotal connection" may be written in the singular in this document, it will be understood from the drawings that multiple pivotal connections may be provided to accomplish said relative pivoting/rotation, for example, in the case of an elongated catwalk that requires or is best manufactured or operated with multiple pivot connections performing the same function in locations near two ends of the catwalk or otherwise-spaced along the catwalk FIGS. 5-8 also show to best advantage the relationships and movement of these structures, as the catwalk 20 moves from the deployed position (FIG. 5) toward (FIGS. 6 and 7) and then into (FIG. 8) the retracted position. One may see that the piston rod 35 of the cylinder is fully-retracted/shortened in FIG. 5, partially-extended in a "half-stroke" position in FIGS. 6 and 7, and then fully-extended in a "full-stroke" position in FIG. 8. Thus, as discussed above in the Summary, supply of pressure to the cylinder, and consequent extension of the piston rod, is required to retract the catwalk 20. In the deployed position of FIG. 5, the floor 22 is horizontal or generally horizontal, and the railing 24 is vertical or generally vertical. In the "half stroke" position of FIGS. 6 and 7, the floor 22 is about 45 degrees from horizontal and the railing 24 is still vertical or generally vertical. In the "full-stroke" position of FIG. 8, the floor 22 and the railing 24 both are vertical or generally vertical, and are preferably parallel to each other and co-planar. The end view of FIG. 8, the side perspective view of FIG. 9, and the top view of FIG. 10 illustrate the compact, vertical configuration and the thin/small footprint of the retracted catwalk 20. "Generally vertical" and "generally horizontal" mean within 10 degrees of vertical and horizontal, respectively.

Figure 5:
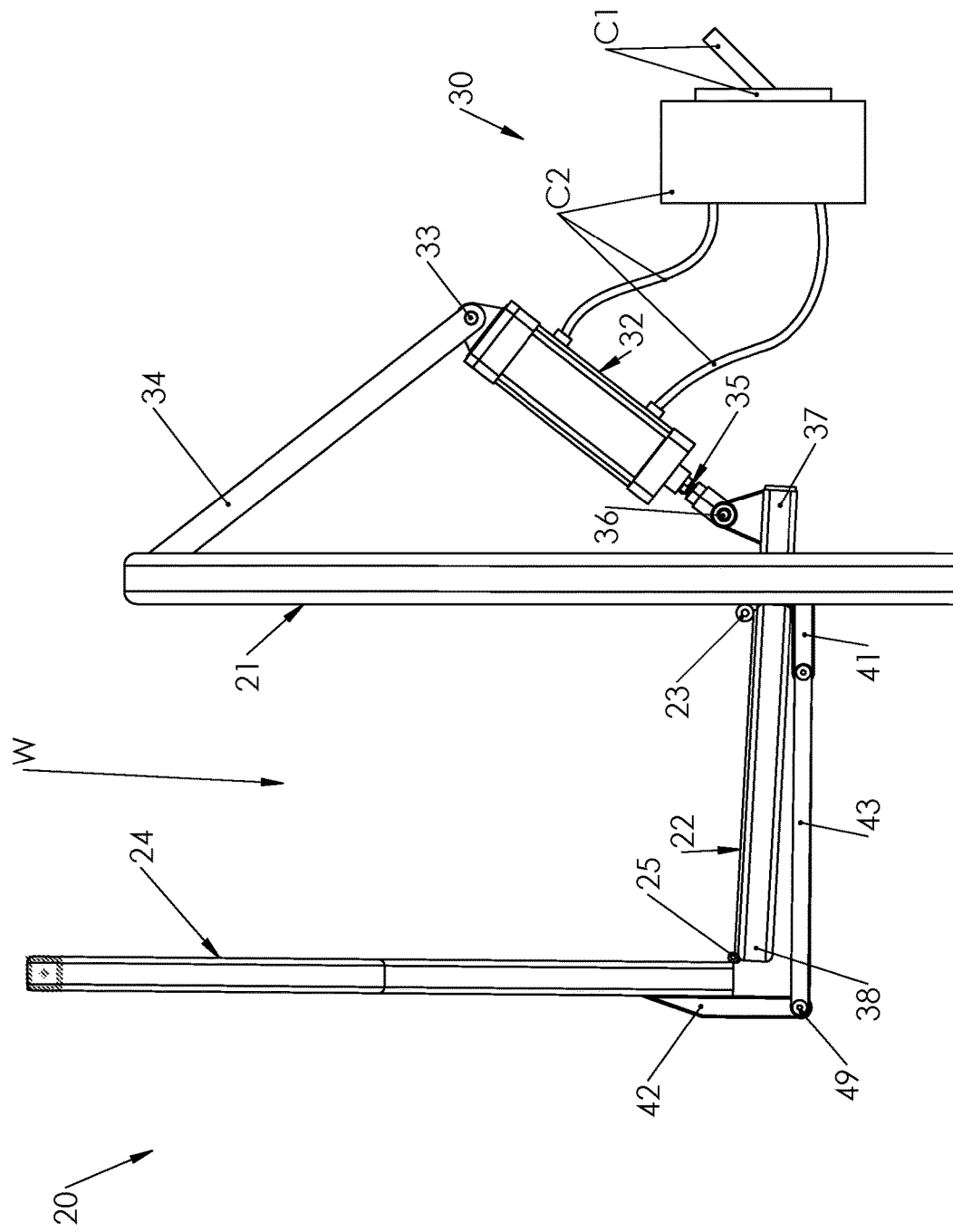
FIG. 5 is a rear end view of the embodiment of FIG. 2, still in the deployed condition.

The mounting frame 21 of catwalk 20 preferably extends along most of the length of the catwalk, for example, along 70-100 percent of the length of the catwalk. This way, the frame 21 may provide an inner hand-railing along most of the catwalk, and/or may provide multiple, longitudinally-spaced pivotal mounting points for the floor 22 and longitudinally-spaced mounting points for multiple guide arm systems 26. The mounting frame 21 is preferably elongated and rectangular or generally rectangular, to provide said inner hand-rail and to provide said longitudinally-spaced mounting points, but it may be shaped otherwise in certain embodiments. The floor 22, is pivotally connected to the mounting frame 21 at hinge(s) 23. The railing 24 is pivotally connected to the floor 22 at hinge(s) 25. FIGS. 5 and 7 illustrate to best advantage end views of one hinge 23 and one hinge 25.

Figure 23:
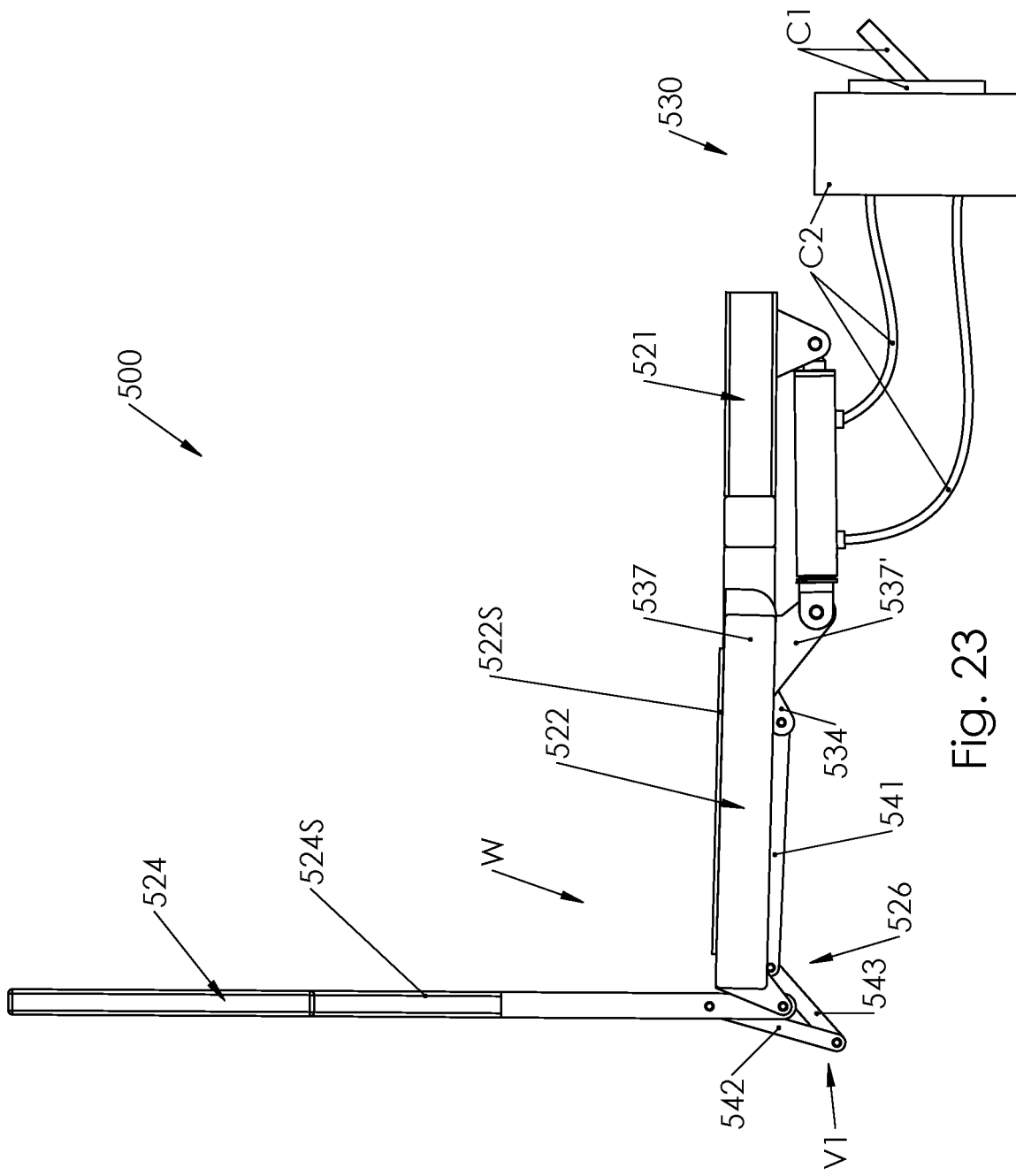
FIG. 23 is an end view of the catwalk embodiment of FIG. 19 in the deployed position.

The actuator system 30 comprises a hydraulic or pneumatic cylinder 32 having a cylinder housing pivotally mounted at a first end connection 33 to a rigid, fixed bar/bracket member 34 that is fixed to, and does not pivot or move relative to, the mounting frame 21. The piston rod 35 of the cylinder 32 is pivotally connected at second end connection 36 to the inner edge 37 of the floor 22. Therefore, extension of the piston rod 35 from the cylinder will force the floor 22 to pivot (at 23) clockwise in FIGS. 5-7, moving the inner edge 37 of the floor downward and the outer edge 38 of the floor upward. Certain embodiments of the actuator system 30 may be described as comprising actuator control(s) C1, for example an operator/user's switch/lever/button in the cab of a truck/vehicle controlling hydraulic or pneumatic valve(s); hydraulic or pneumatic pump/equipment and/or controllers/electronics, and associated fluid lines, wiring or wireless-equipment C2, wherein C1 and C2 cooperate/control the catwalk as described herein, for example, upon the operator actuating said switch/lever/button. In some embodiments, actuator system 30 may further comprise monitors, status-indicators, and/or alarms, which may be a part of control(s) C1 for example. Controls, hydraulics or pneumatics, controllers/electronics/programming, wiring/wireless-equipment, monitor(s), status indicator(s) and/or alarms will be understood by those of skill in the art after reading and viewing this document and the drawings. See schematic, exemplary structures C1, C2 in FIGS. 5, 23, and 43.

As retraction of the catwalk continues by extension of the piston rod 35, the floor 22 moves toward and into a vertical orientation, and the railing 24 pivots relative to the floor 22 also toward and into a vertical orientation. By the time of full retraction (full piston rod extension), the floor 22 and railing 24 are generally or entirely coplanar with each other and parallel to the vertical mounting frame 21, with the railing 24 substantially or entirely above the floor 22, as shown to best advantage in FIG. 8. "Generally coplanar" means within 10 degrees of being coplanar.

The frame 21 is rigid and is typically installed and secured to beam(s), brace(s), chassis component(s), or other rigid and strong member(s) on the vehicle/equipment that are not part of the moving equipment of, or on, the vehicle/equipment. Said installation and securement may be done by bolts, welding, or other fastenings means, in order to place the frame 21 in a vertical or generally vertical orientation on the side of the vehicle or equipment, for example, with the catwalk floor, railing, and actuator already fixed to the frame 21. This way, the frame 21 and the other catwalk components may be installed as a single unit by "hanging" the frame 21 on the vehicle/equipment. This way, in the retracted position, both the catwalk floor and railing are compactly placed against the side of the frame 21, which is itself compact and narrow-in-width. Thus, the frame and the catwalk fill minimum horizontal space, when installed and collapsed against the side of the vehicle, for travel on public roads and for compact storage of the vehicle when not in use. See FIGS. 8-10. For example, certain embodiments of the catwalk, when installed and collapsed against the right or left side of the vehicle in the retracted configuration/position, may add 0-12 inches, 0-9 inches, or 0-3 inches to the total width of the vehicle/equipment. For example, certain embodiments of two catwalks, when installed and collapsed against the right and left side of the vehicle in the retracted configuration/position, may add 0-24 inches, 0-18 inches, or 0-6 inches to the total width of the vehicle/equipment. For example, certain embodiments installed and collapsed against the rear or front side of the vehicle in the retracted configuration/position may add 0-12 inches, 0-9 inches, or 0-3 inches to the total length of the vehicle/equipment, or two catwalks installed and collapsed against the rear and front side of the vehicle in the retracted configuration/position, may add 0-24 inches, 0-18 inches, or 0-6 inches to the total length of the vehicle/equipment.

Referring to the catwalk embodiments 10, 20 of FIGS. 1-10, the guide arm system 16, 26 is used to guide/control movement of the railing 14, 24 relative to the floor 12, 22 and hence relative to the mounting frame 11, 21 and the vehicle/equipment on which the frame 21 and catwalk 10, 20 are mounted. Referring especially to the catwalk 20 of FIGS. 2 and 5-8, guide arm system 26 comprises multiple portions, that is, a guide arm inner end 41, an outer end 42, and a middle arm 43. Guard arm inner end 41 is rigid and rigidly-fixed to the mounting frame 21 so that the inner end 41 does not pivot or move relative to the frame 21. The guide arm outer end 42 is rigid and its inner surface 46 is rigidly-fixed to the railing 24, at the lower outer surface 44 of the rigid railing 24. This way, the outer end 42 does not pivot, slide, or otherwise move relative to said lower outer surface 44 or relative to any portion of the railing 24. Between said inner end 41 and outer end 42, the guide arm comprises a rigid middle arm 43 pivotally connected at pivotal connections 48 and 49, to the inner end 41 and outer end 42, respectively.

The entire guide arm 26 (41, 42, 43 collectively guide arm/system 26) may be described as outside of the walkway W of the catwalk 20, because it is located below and/or out from the outer surfaces of the railing 24 and the floor 22, that is, below and/or toward the left on the drawing sheets relative the floor and railing in FIGS. 5-8. None of the guide arm system 26 is fastened directly to or contacting the floor 22, and the middle arm 43 does not fasten directly to, or contact any of, the mounting frame 21, floor 22, or railing 24. The floor 22 is moveable relative to the guide arm 26.

Figure 8:
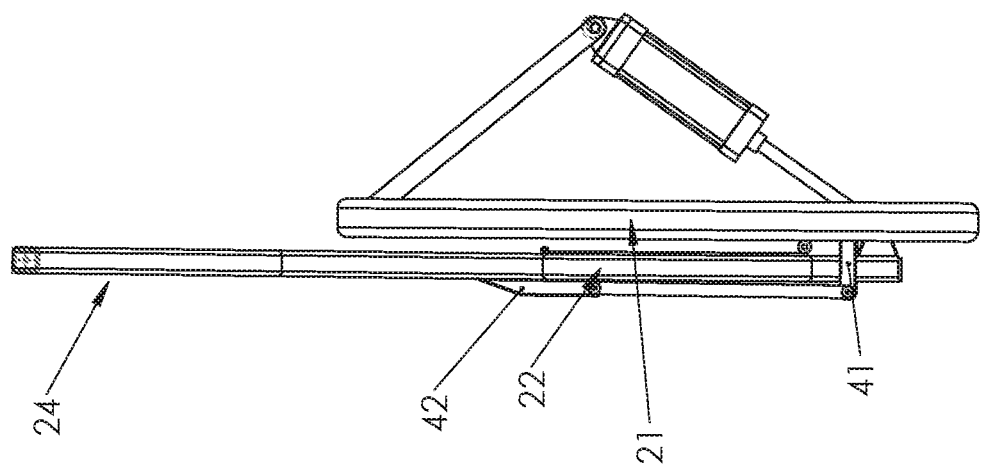
FIG. 8 is a rear end view of the catwalk of FIG. 2 in a fully-retracted position.
Figure 9:
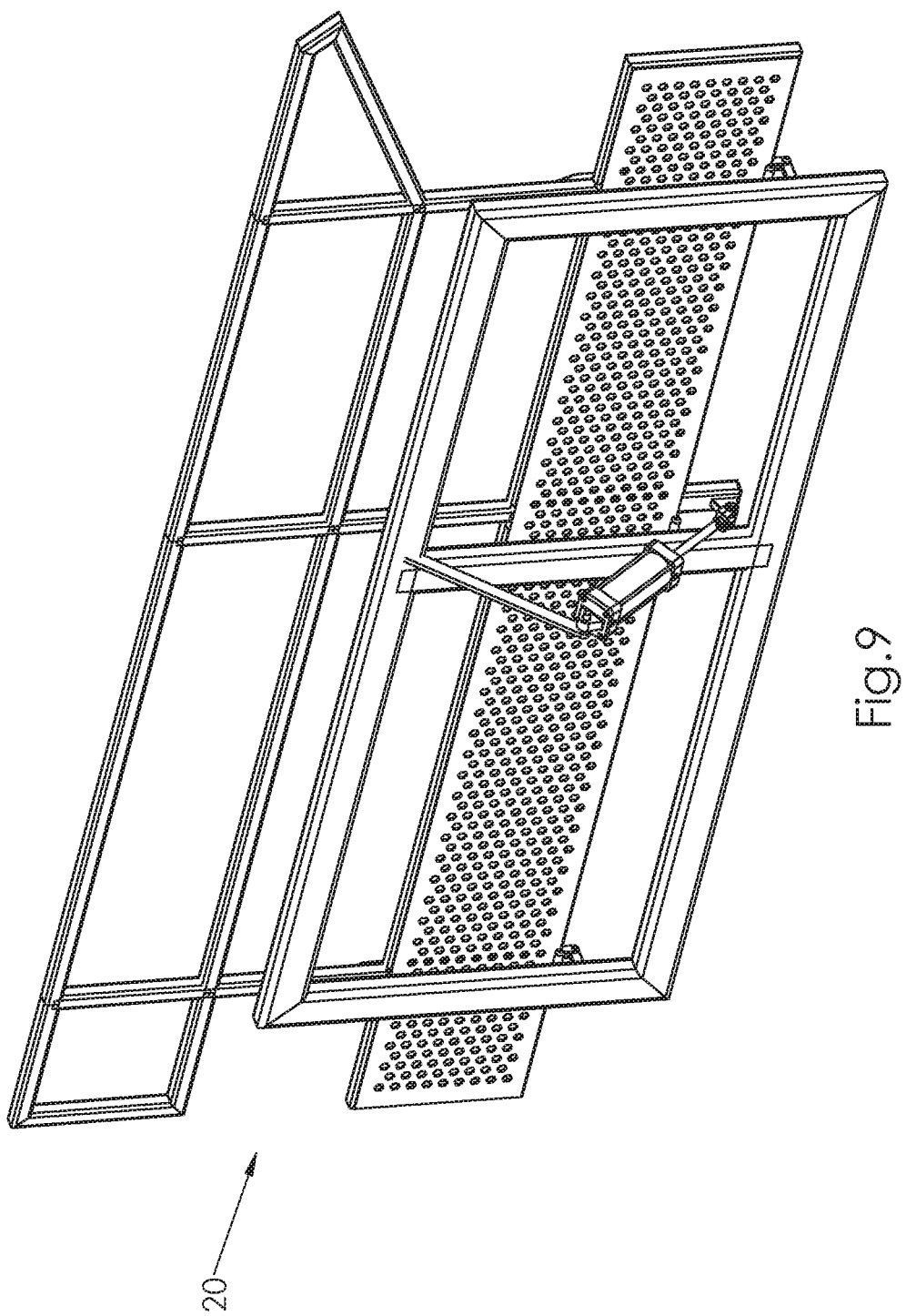
FIG. 9 is a right-side perspective view of the catwalk of FIG. 2, in the fully-retracted position.

By viewing the transition from FIG. 5, to FIGS. 6 and 7, and finally to FIG. 8, it will be understood that the guide arm system 26, by means of its structure, placement and geometry, continues to guide/control the railing 24 relative to the floor 22, and therefore relative to the frame 21 and vehicle/equipment, throughout the retraction process, throughout the deployment process that is the reverse process of FIGS. 5-8, and while the catwalk is stationary in the retracted position and the deployed position. The preferred guide arm system does not power retraction or deployment, but guides/controls the railing 24 orientation during retraction and deployment that are both powered by the actuator system 30. For example, the relative lengths of each of inner end 41, outer end 42, and middle arm 43, and the relative location of the pivot axis (25) of the railing 24 relative to the floor 22, and the pivot axis (49) of the outer end 42 relative to the middle arm 43, the guide arm 26, serve to control the movement of the railing 24 relative to the floor 22. To illustrate this, see the catwalk element positions and relationship in FIG. 5, as follows. When the cylinder 32 is fully shortened (piston rod 35 fully retracted), the floor 22 will be generally horizontal and will pivot no further than its position in FIG. 5. The railing 24 is generally perpendicular to the floor 22, with the floor 22 and pivot 25 spaced from the middle arm 43 and pivot 49, respectively. The inner end 41 and middle arm 43 are parallel to each other and horizontal. The outer end 42 is perpendicular or generally perpendicular to the middle arm 43. Thus, in the position in FIG. 5, given that the floor 22 is retained in its position by the cylinder piston rod 35 and that the railing 24 is fixed to the outer end 42, one may see that the railing 24 cannot continue to pivot in either a counter-clockwise or clockwise direction. "Generally horizontal" and "generally perpendicular" mean within 10 degrees of horizontal and perpendicular, respectively.

Further illustrating the preferred structure and function of the guide arm system, it may be noted that, if the outer end 42 where slidable relative to the outer surface 44 of the railing (instead of being fixed to the railing), the railing could continue to pivot in either direction (counterclockwise or clockwise) independently of the outer end 42. Furthermore, in this scenario, the outer end 42 could also pivot independently of the railing because the inner surface 46 of the outer end 42 and the outer surface 44 of the railing 24 could move/slide relative to each other during that continued independent pivoting.

The actuator system is adapted to enhance safety. The hydraulic and/or pneumatic cylinder(s) is/are in a retracted condition when the catwalk is deployed. Therefore, the cylinder(s) must extend/lengthen in order to retract the catwalk and the preferred actuator system is designed/tuned to ensure that the catwalk does not retract and trap a user on the catwalk. The lift capacity of the cylinder is controlled/tuned so that the cylinder does not have the capacity/capability to retract the catwalk when occupied. For example, the lift capacity of the hydraulic cylinder is controlled by the pressure of the hydraulic fluid applied to the cylinder. The pressure of the preferred catwalk actuator system is pre-set by tuning the hydraulic valve that supplies the cylinder so that it has enough applied pressure to operate the cylinder and lift the catwalk but not enough to overcome the added weight of a person on the catwalk. Said tuning can be done to account for the minimum expected adult worker's weight, for example, an additional 90 pounds. This safety feature is therefore accomplished automatically after the cylinder has been tuned before or during installation of the catwalk, so that accidental actuation of the cylinder will not cause the catwalk to retract. This safety feature is therefore provided without complex controls, safety switches, or locks that must be remembered and properly operated by personnel. The chance of improper use, damage, or tampering with this safety feature is very small or non-existent.

FIGS. 11-18 illustrate catwalk embodiments 200, 300, 400 according to the invention that are mounted on the right side, left side, and rear side of a cable reel truck 100. This way, user(s) may safely work on any or all three catwalks and may walk easily between the catwalks. The catwalks 200, 300, and/or 400 of FIGS. 11-18 may have many or all of the elements, functions, and benefits described above regarding the embodiments of FIGS. 1-10, even though an alternative means for connecting the catwalks to the vehicle/equipment is used, that is, direct connection to rigid and strong member(s) of the vehicle/equipment. Also, the three catwalks 200, 300, 400 may all share similar or the same elements, functions, and benefits, so that certain embodiments may be interchangeably installed on various sides/locations of the vehicle/equipment. The main differences between embodiments 200, 300, 400 may be: a) different lengths, for example, left- and right-mounted embodiments being longer than front- or rear-mounted embodiments, and/or b) railings modified in shape, for example, to include an extension such as the generally triangular extension shown to best advantage in FIGS. 1, 2, 9, and 18.

Instead of the catwalk comprising a frame that is secured to the vehicle/equipment ("indirect connection" to the vehicle/equipment), the catwalks of FIGS. 11-18 are connected directly (or "attached directly") to beam(s), brace(s), chassis component(s), or other rigid and strong member(s) on the vehicle/equipment (hereafter called "rigid chassis member") that are not part of the moving equipment of the vehicle or on the bad/platform. This is done by pivotally connecting the portions of the catwalk that are shown and described above as being connected to frame 11, 21 or the fixed bar/bracket member 34 of the frame, instead, to the rigid chassis member(s). Specifically, the top (housing) end of the actuator cylinder(s), the floor, and the guide arm(s) are each pivotally connected to one or more rigid chassis members, in other words, to portions of the vehicle/equipment frame/chassis instead of to a mounting frame 11, 21 that is added to the vehicle/equipment. One may understand that this direct-connection option may be workable in many embodiments, but that using an intermediate frame 11, 21 with bar/bracket member 34 may increase the ease and vehicle-to-vehicle consistency of retrofitting an existing vehicle with one or more catwalks.

Figure 11:
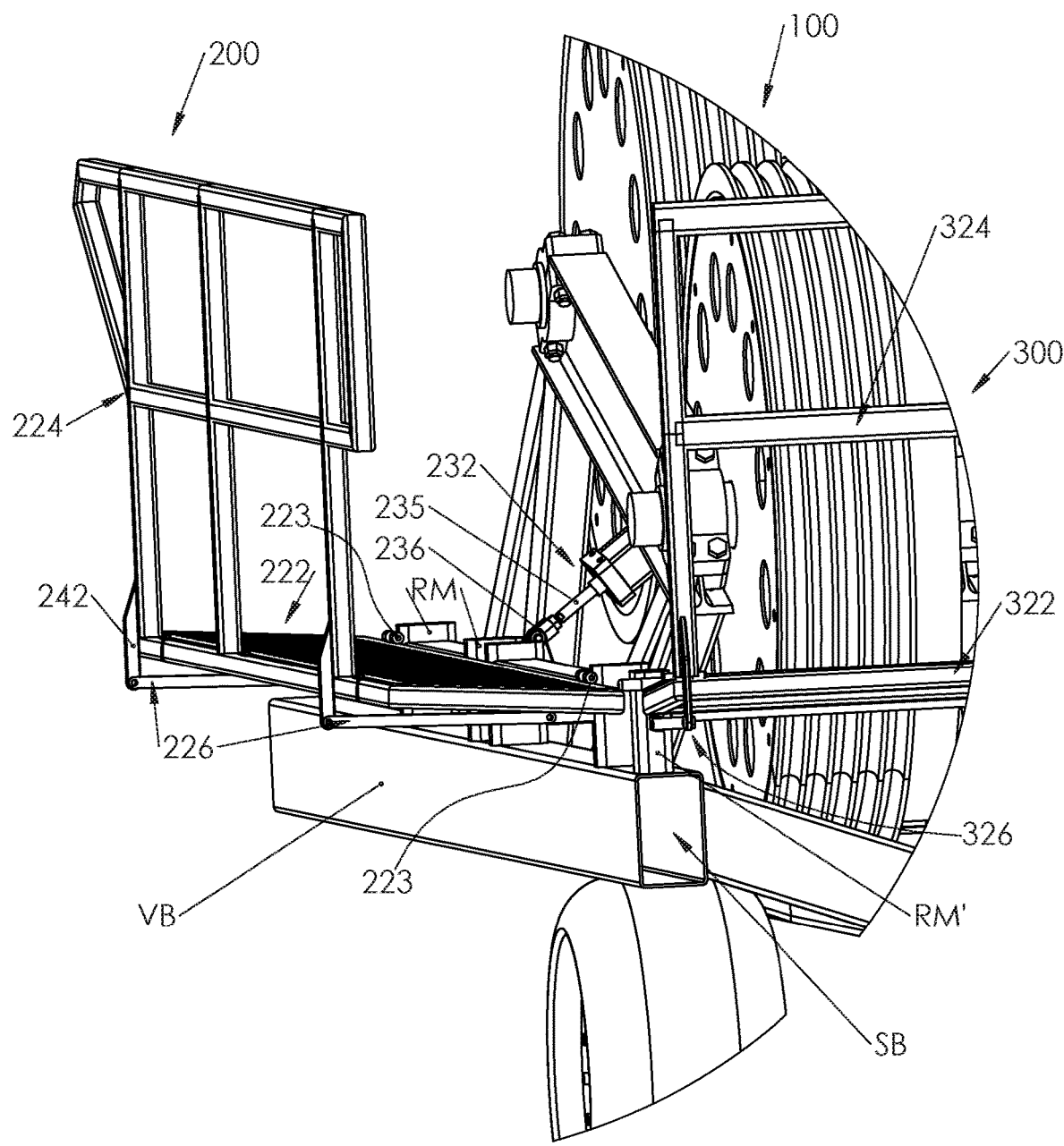
FIGS. 11-18 illustrate certain embodiments of the invented catwalk connected to an exemplary vehicle for use, specifically, a cable reel truck.
Figure 12:
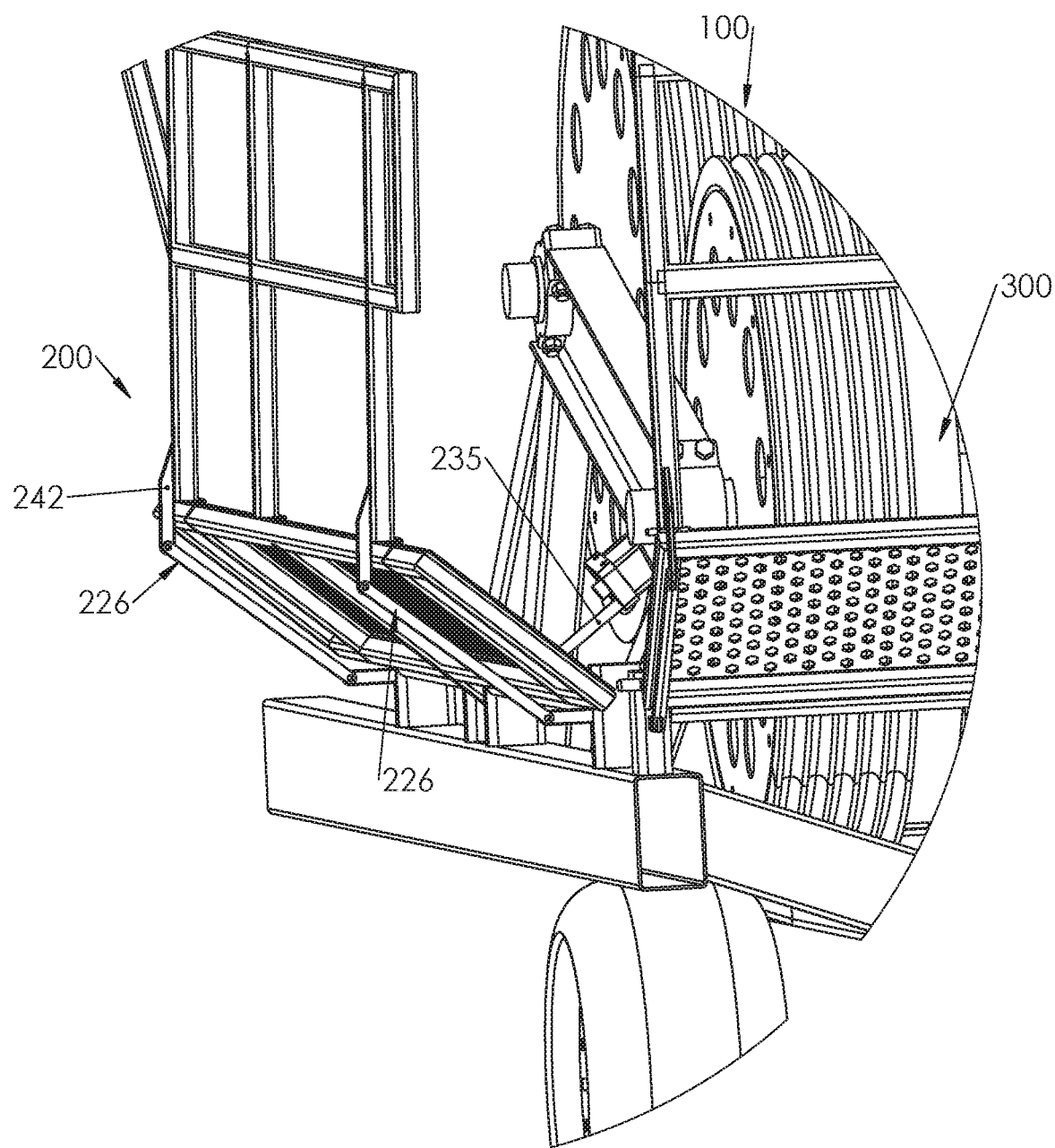
Figure 13:
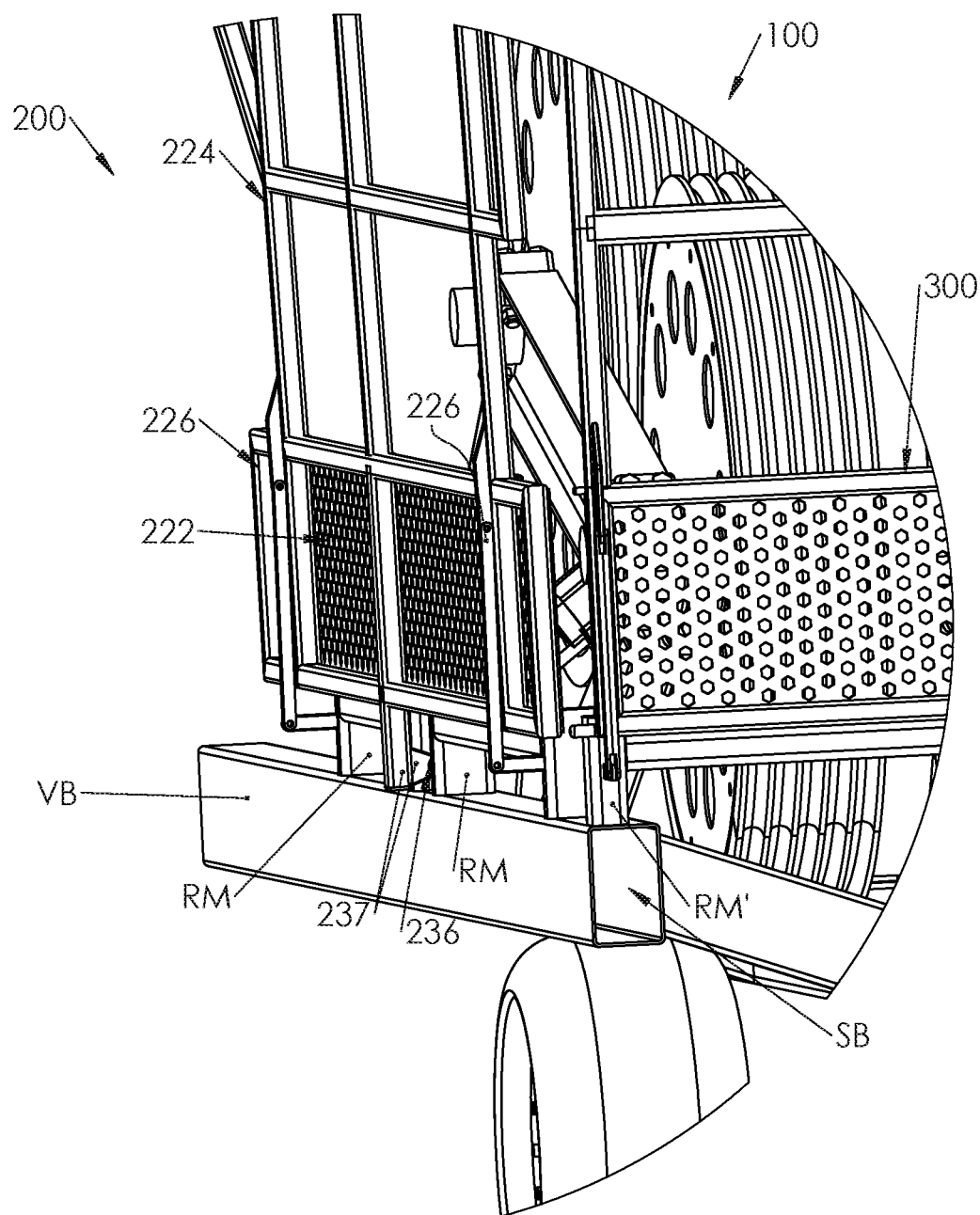
Figure 14:
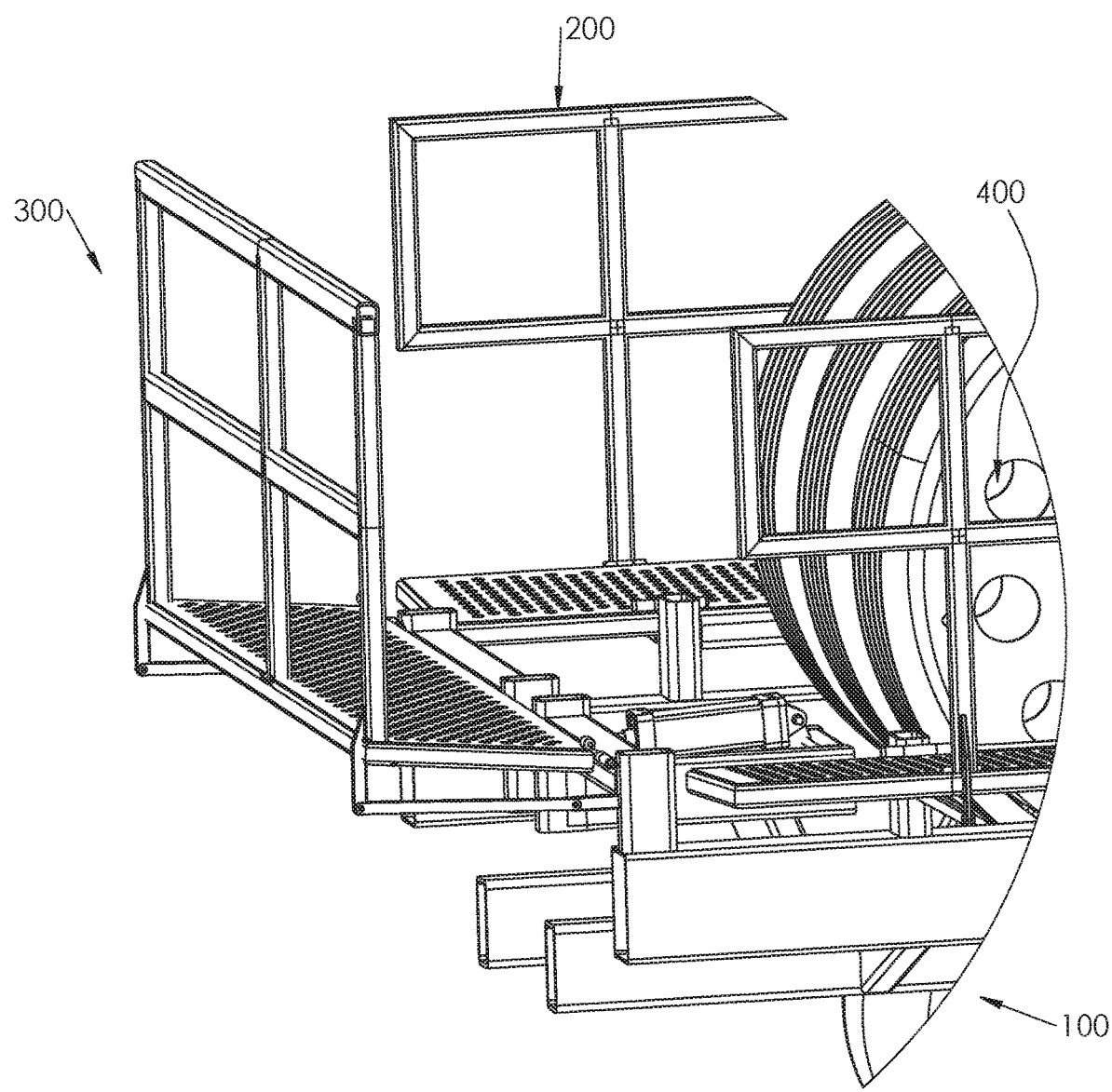
Figure 15:
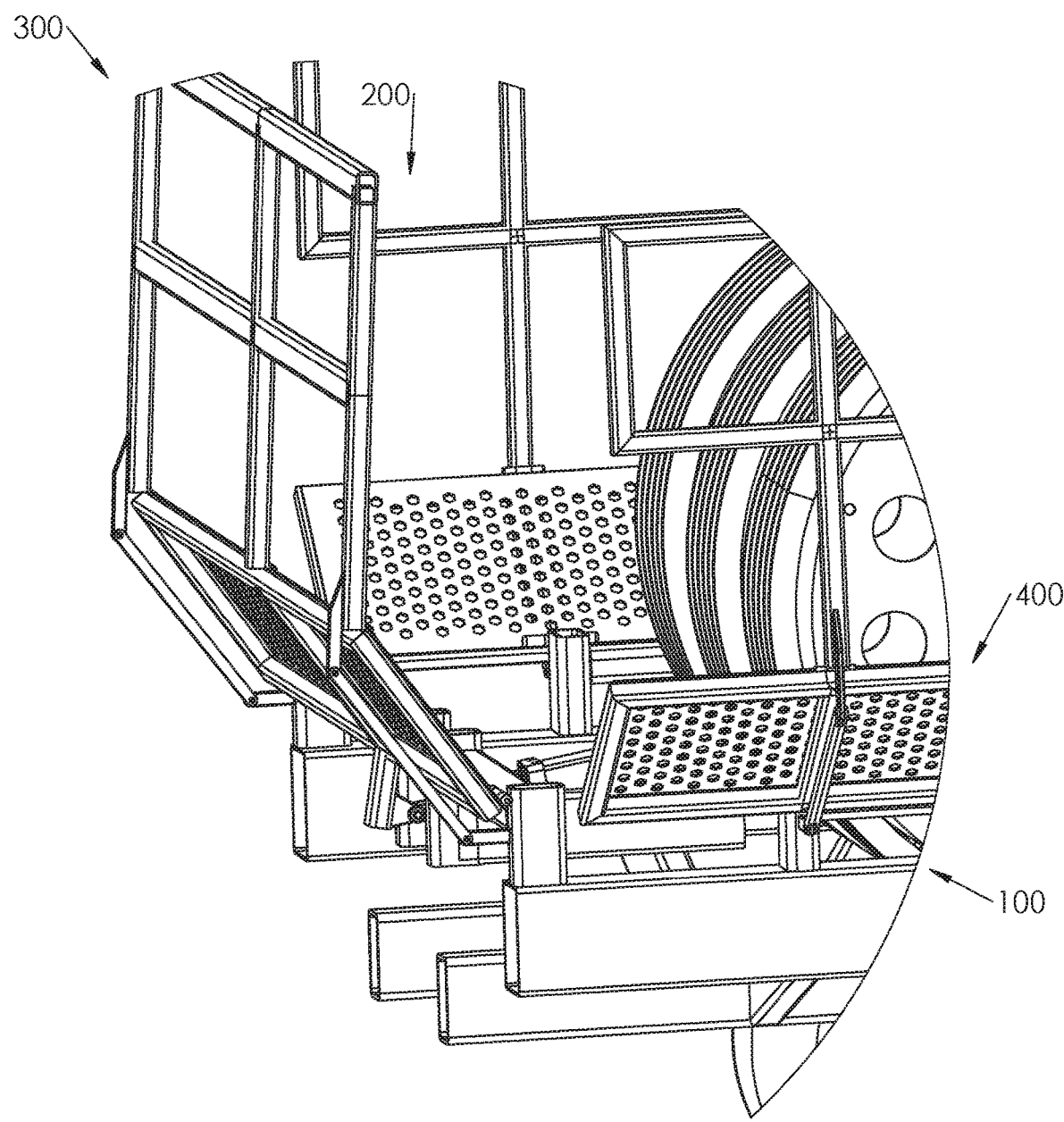
Figure 16:
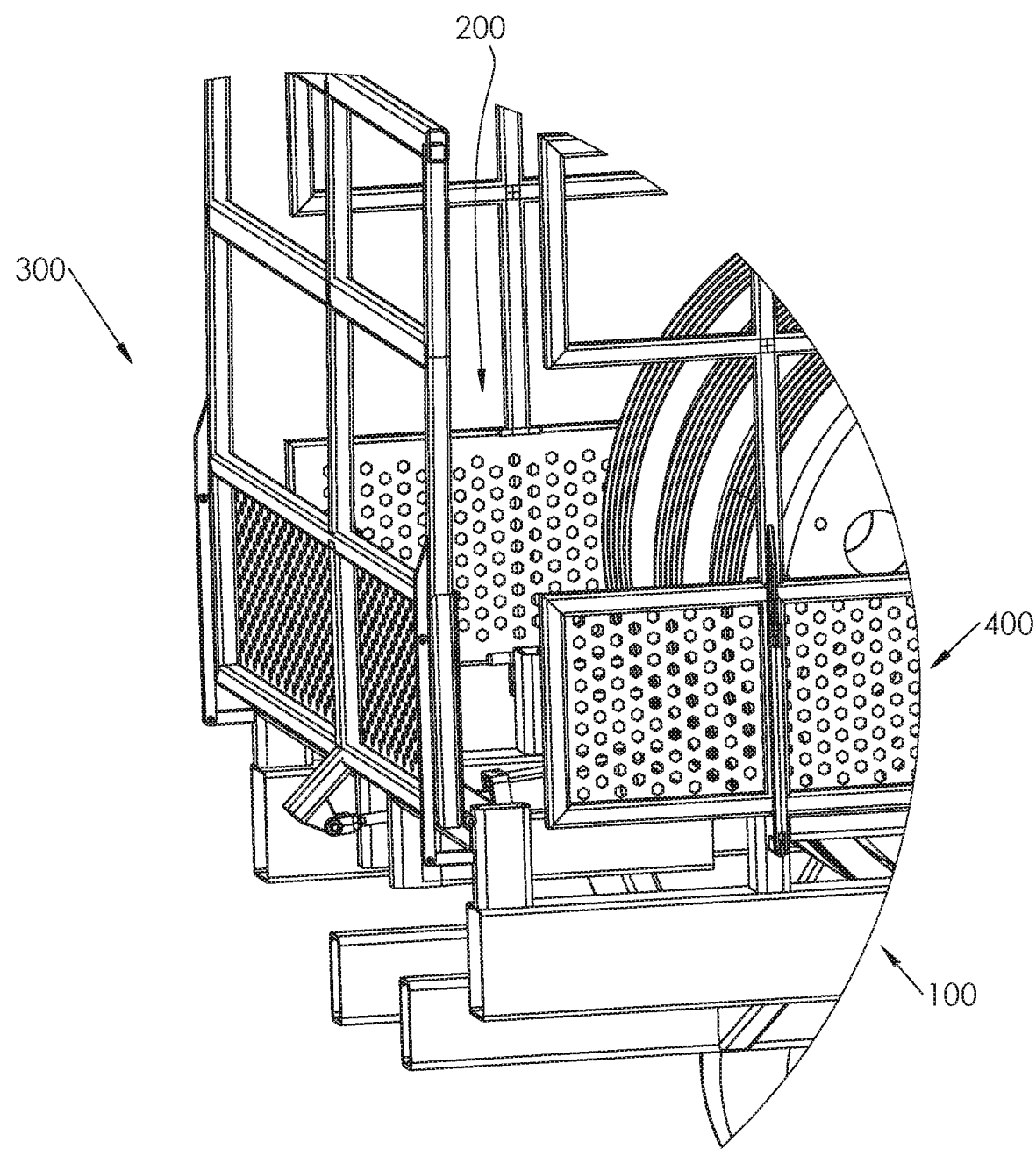

A catwalk 200 is mounted on the left side of a cable reel truck 100, and is shown in deployed position in FIG. 11, partially retracted or "half-stroke" position in FIG. 12, and retracted position in FIG. 13. The cylinder 232 is installed on the vehicle 100 by pivotally connecting the top end of the cylinder housing to a rigid chassis member (not visible in FIGS. 11-13), and pivotally connecting the second end of the piston 235, via second end connection 236, to the inner edge 237 of the floor 222. Inner edge 237, visible in FIG. 13, is an extension bar/member extending from the main body of the floor 222 that fits and pivots in between multiple rigid chassis members RM. The main body of the floor 222 is pivotally connected to rigid chassis members RM at hinges 223, as best seen in FIG. 11.

As discussed above for catwalks 10 and 20, the railing 224 pivots relative to the floor 222, and is guided/controlled by guide arm system 226, which is structured and operates similarly or the same as guide arm system 26, as will be understood by one of skill in the art after reading this document and viewing the figures. Similarly as discussed above, the railing 224 remains perpendicular or generally perpendicular to the floor 222 in the deployed position (FIG. 11), due to the structure, placement, and geometry of the guide arm system 226 and the fixed connection of its outer end 242 to the railing 224. During retraction, again due to said structure, placement, and geometry, the railing 224 is then guided/controlled by said guide arm and its outer end 242, into the fully retracted position shown in FIG. 13, where the railing 224 is vertical or generally vertical, and parallel or generally parallel to, and preferably co-planar or generally co-planar to, the main plane of the floor 222. "Generally perpendicular", "generally vertical", "generally parallel" and "generally co-planar" mean within 10 degrees of perpendicular, vertical, parallel, and co-planar, respectively.

A catwalk 300 is mounted on the rear side of the cable reel truck 100, and, like catwalk 200, is shown in deployed position in FIG. 11, partially retracted or "half-stroke" position in FIG. 12, and retracted position in FIG. 13. Like catwalk 200, catwalk 300 has a floor pivotally connected to rigid chassis members RM', and a guide arm system 326 for guiding and controlling the pivoting and position of the 324 relative to the floor 322. The cylinder, piston, and connections of the actuator system of catwalk 300 are not visible in FIGS. 11-13, but will be understood to preferably be similar or the same as those discussed above.

Figure 17:
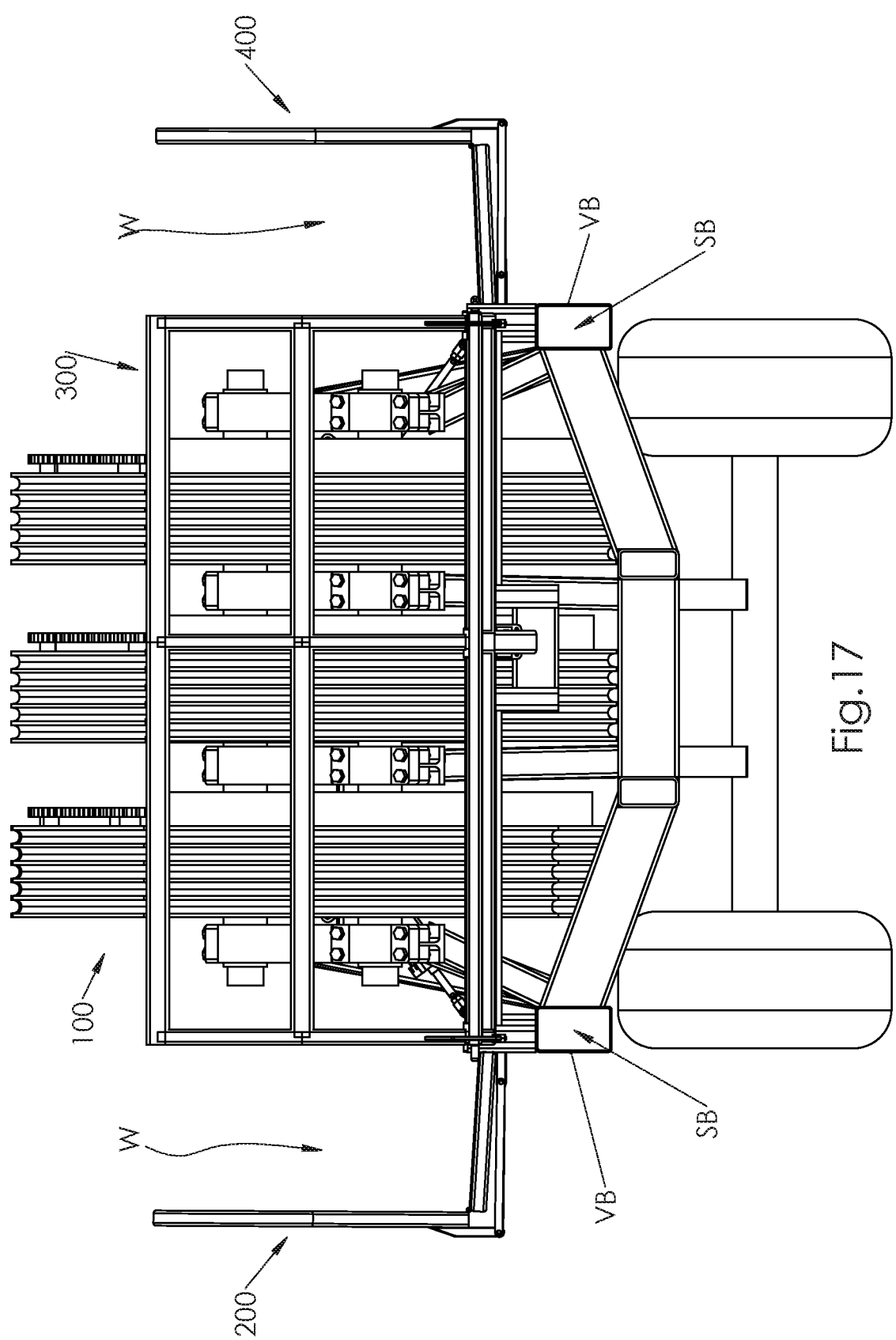
Figure 18:
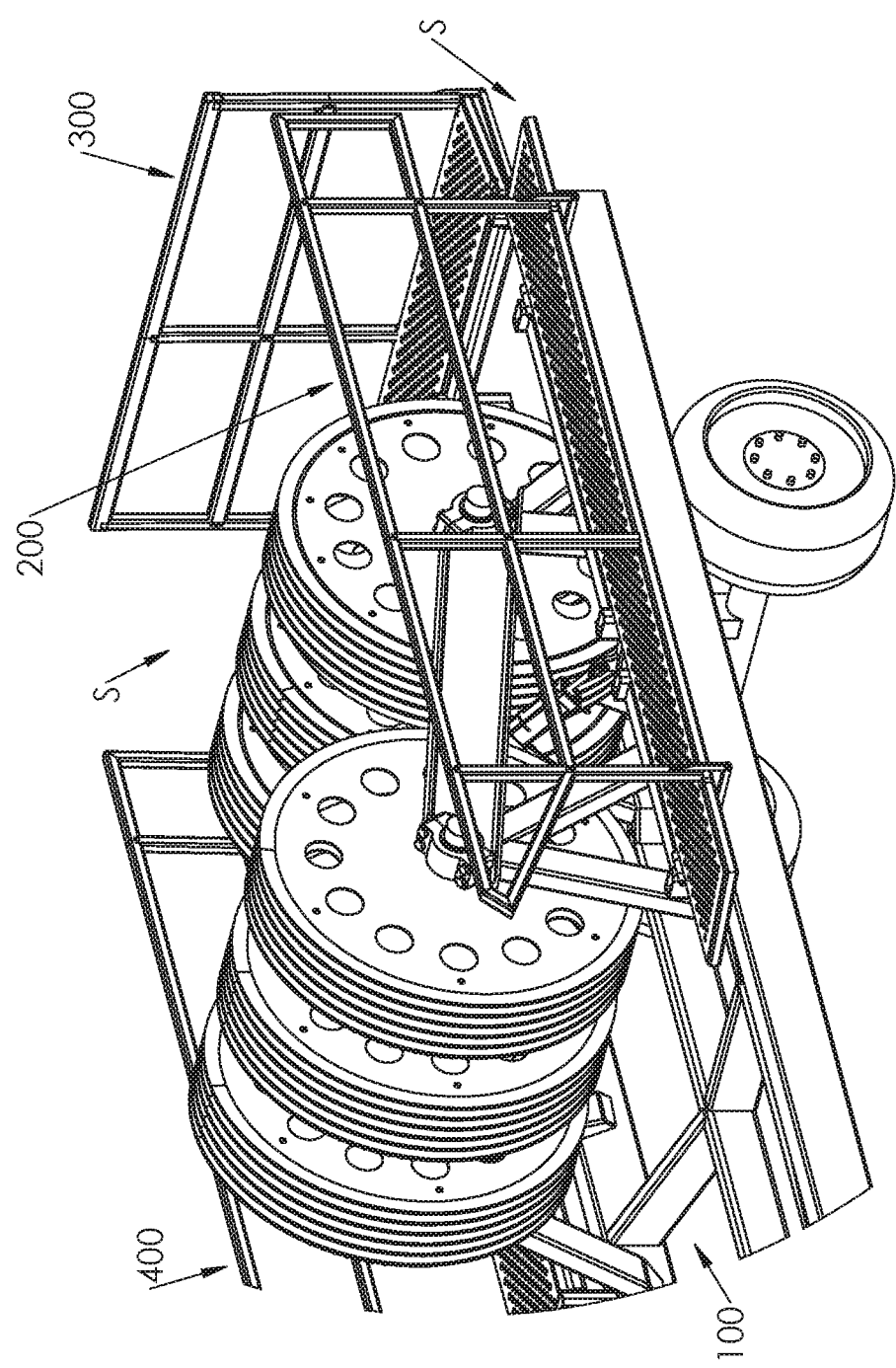

By viewing FIGS. 12, 13, and 17, it may be seen that catwalk 200 in the deployed and the retracted positions is entirely above the side beams SB, which are the outermost right and left structures of truck 100. Further, in the retracted position, catwalk 200 does not extend horizontally out past the outer, vertical side surface VB of the side beam SB. Therefore, in such embodiments, the retracted catwalk 200 does not add any width, or any significant width, to the width of the vehicle 100. For example, the retracted catwalk 200 adds only 0-1 inch of width on each side of the vehicle, so that that the vehicle width is not increased, or increased only a very minimal amount, for travel and storage.

FIGS. 14-18 show an embodiment wherein three catwalks are provided on the cable reel truck 100. In addition to catwalks 200 and 300 being installed on the reel truck 100, catwalk 400 is installed on the right side of the reel truck 100. Catwalk 400 may be structured and may function similarly to the other catwalks, and preferably is a mirror image of catwalk 200. This way, one or more users can access and work on three sides of the reels or other equipment on the truck 100, by walking along each catwalk and stepping from catwalk to catwalk over the relatively small spaces S between the right and left catwalks and the rear catwalk. While the three-catwalk system shown in FIGS. 14-18, or a four-catwalk system for all four sides of vehicle/equipment, may be particularly beneficial for excellent access to the vehicle bed and equipment, one may understand that one catwalk, or multiple catwalks on any combination of sides, may significantly improve access and safety. By providing at least one of a left- or right-side catwalk, plus at least one of a rear-side or a front-side catwalk, walkways W are provided for convenient movement along the entire or substantially the entire length and width of the vehicle/equipment.

Therefore, the preferred catwalks and their actuator system and guide arm systems are specially-adapted to provide sleek design and effective operation that can be applied to many different vehicles and pieces of equipment where the user needs to be safely elevated alongside the vehicle/equipment. The hydraulic or pneumatic cylinder(s) and associated connections and apparatus of the actuator system are provided substantially or entirely outside of the walkway space W. Furthermore, the guide arm system is also provided substantially or entirely outside of the walkway. For example, the guide arm system may be provided below the floor and out away from the outer surface of the railing. Thus, preferably no portion of the actuator system or guide arm system protrudes into, or obstructs, the walkway W or the walkway open ends. For example, there are no bars or protrusions that the user must walk over or around when moving from one end of the walkway to another. For example, there are preferably no obstructions or protrusions such as bars, chains, link members or other barriers protruding into or extending across the open ends of the catwalk walkway. Further, the catwalks preferably are arranged and sized so that at least one end of each catwalk is near (for example, within 3 feet or less of) the end of another catwalk, so a user can step just a few feet (the length or less than the length of a typical worker's stride) over the spaces S between the catwalks, and thus walk along multiple or all the catwalks without climbing down from a catwalk to climb up onto another.

Further, these above benefits are accomplished by the preferred catwalk without the retracted catwalk affecting, or, at most only very minimally affecting, the outside dimensions, and hence the normal footprint, of the vehicle/equipment on which the catwalk is installed. Thus, a vehicle built to satisfy size regulations should not be adversely affected by the addition/retrofit of the catwalk(s) onto the vehicle.

One may understand from the drawings and this document that, depending on the length of the catwalk and the location/structure available for attachment of the frame 11, 21 or for the direct attachment to rigid chassis members RM, RM', multiple actuation systems, cylinders, pivotal hinges/connections, and/or guide arms, spaced along the length of the catwalk, may be used to strengthen, stabilize, and/or effectively operate each catwalk and/or to effectively connect the catwalk to the vehicle/equipment.

Certain embodiments may be described as comprising, consisting essentially of, or consisting of: a catwalk having an inner side for connection to a side of a vehicle/equipment and an outer side facing away from the side of the vehicle/equipment, the catwalk comprising: a floor that is pivotal relative to the vehicle/equipment, a railing that is pivotally connected to the floor, an actuator system that moves the floor and the railing from a deployed position wherein the floor is generally horizontal (0-10 degrees from horizontal, or "within 10 degrees of horizontal") and the railing is generally vertical (0-10 degrees from vertical or "within 10 degrees of vertical") to a retracted position wherein both the floor and railing are generally vertical (0-10 degrees from vertical or "within 10 degrees of vertical") and close to the side of the vehicle/equipment with the railing above the floor, and a guide arm adapted to maintain the railing generally perpendicular (0-10 degrees from perpendicular or "within 10 degrees of perpendicular" or "at 80-100 degrees from each other") to the floor in the deployed position and generally parallel (0-10 from each other or "within 10 degrees of each other") to the floor the retracted position. The railing and the floor in the retracted position may be vertical and co-planar. In the deployed position, the floor may have a bottom side and the railing may have an outer side facing away from the vehicle/equipment, and the guide arm extends along said bottom side of the floor and up along said outer side of the railing. The actuator system may comprise a hydraulic or pneumatic cylinder that has an upper, inner end near said inner side for pivotal connection to the vehicle/equipment, and a lower, outer end that is pivotally connected to an inner edge of the floor, wherein extension of the cylinder pivots the floor from the deployed position to the retracted position. For safety purposes in certain embodiments, a maximum pressure may be supplied to the cylinder that is sufficient to retract the catwalk only if a person is not on the catwalk. For example, a maximum pressure may be supplied to the cylinder that is sufficient to retract the catwalk plus a weight on the floor of the catwalk of no more than 90 pounds. In certain embodiments, the guide arm has an inner end for connection to the side of the vehicle/equipment, a middle arm, and an outer end fixed and immovable relative to the railing, wherein none of the guide arm is attached to the floor and/or none of the guide arm contacts the floor. Said middle arm may be pivotally connected to the inner end of the guide arm, and the outer end of the guide arm may be pivotally connected to the middle arm.

In certain indirect connection embodiments of the catwalk in the paragraph immediately above, the catwalk further comprises a frame at an inner side of the catwalk for connection to the vehicle/equipment, wherein an inner edge of the floor, an inner end of the guide arm, and a top end of the actuator system, are connected to said frame. In certain of these indirect connection embodiments, the frame, and the floor and the railing in the deployed position, define a walkway above the floor between the frame and the railing, and no portion of the actuator system extends into the walkway, and no portion of the guide arm extends into the walkway. In certain direct connection embodiments of the catwalk that is described in the paragraph immediately above, the catwalk is connected to the side of the vehicle/equipment by direct connection of the floor, guide arm, and actuator system, to rigid chassis members of the vehicle/equipment. In certain direct connection embodiments, the side of the vehicle/equipment, and the floor and the railing in the deployed position, may define a walkway above the floor between the side of the vehicle-equipment and the railing, wherein no portion of the actuator system extends into the walkway, and no portion of the guide arm extends into the walkway. In certain of these direct connection embodiments, the actuator system extends outward only as far as an inner edge of the floor, and no portion of the guide arm extends above the floor.

A catwalk system may comprise a plurality of catwalks to the two paragraphs immediately above. The system may comprise a first catwalk and a second catwalk, wherein the first catwalk is for connection to a right or left side of the vehicle/equipment, the second catwalk is for connection to a rear side or front side of the vehicle/equipment, wherein the floor of the first catwalk has a length and the floor of the second catwalk has a length that is perpendicular to the length of the first catwalk. The first catwalk may have an open end, and the second catwalk may have an open end near the open end of the first catwalk, for access between the first and second catwalks by a user stepping through the opens ends from the first catwalk floor to the second catwalk floor and from the second catwalk floor to the first catwalk floor. The railing and the floor of the first catwalk in the retracted position may be vertical and co-planar. The railing and the floor of the second catwalk in the retracted position may be vertical and co-planar. Preferably, for safety purposes, each of the first and second catwalks is adapted to not retract if a person is on the catwalk. The guide arm of the first catwalk may have an inner end for connection to the right or left side of the vehicle/equipment, a middle arm, and an outer end fixed and immovable relative to the railing of the first catwalk, wherein none of the guide arm of the first catwalk is attached to (and/or none of the guide arm contacts) the floor of the first catwalk. The guide arm of the second catwalk may have an inner end for connection to the rear side or front side of the vehicle/equipment, a middle arm, and an outer end fixed and immovable relative to the railing of the second catwalk, wherein none of the guide arm of the second catwalk is attached to (and/or none of the guide arm contacts) the floor of the second catwalk.

Certain embodiments may be described as a catwalk having an inner side for connection to a side of a vehicle/equipment and an outer side for facing away from the side of the vehicle/equipment, the catwalk comprising, consisting essentially of, or consisting of: a floor that is pivotal relative to the vehicle/equipment; a railing that is pivotally connected to the floor; an actuator system that moves catwalk between a retracted position for storage and travel and a deployed position for use; wherein, in the retracted position, both the floor and railing are close to the side of the vehicle/equipment with the railing above the floor; wherein, in the deployed position, the floor is pivoted down for use as a walkway and the railing upends at or near an outer edge of the floor; and wherein the catwalk further comprises a guide arm that controls pivoting of the railing relative to the floor in, and during movement between, the deployed position and the retracted position. The railing and the floor in the retracted position may be vertical and co-planar. The floor in the deployed position may be pivoted to within 10 degrees of horizontal. The floor in the deployed position has a bottom side and the railing in the deployed position has an outer side facing away from the vehicle/equipment, and the guide arm in deployed positon may extend along said bottom side of the floor and up along said outer side of the railing. The actuator system may comprise a hydraulic or pneumatic cylinder that has an upper, inner end near said inner side for pivotal connection to the vehicle/equipment, and a lower, outer end that is pivotally connected to an inner edge of the floor, wherein shortening of the cylinder pivots the floor from the retracted position to the deployed position, and lengthening of the cylinder pivots the floor from the deployed position to the retracted position. In certain embodiments, for safety purposes, a maximum pressure supplied to the cylinder may be only sufficient to retract the catwalk plus a weight on the floor of the catwalk of no more than 90 pounds.

Especially-Preferred Embodiments

Catwalk Embodiment of FIGS. 19-36

FIGS. 19-36 illustrate another catwalk 500 and methods of using the catwalk 500. When installed and used on a truck or utility, construction or industrial vehicle/equipment, such as a reel truck 100, catwalk 500 shares many of the structural and operational features and benefits of previously-discussed embodiments, as will be apparent from FIGS. 19-36 and/or the following description. Further, additional or alternative structures and features of catwalk 500 that are modified/enhanced compared to the previously-discussed catwalks also will be apparent from the drawings and/or the following description.

Catwalk 500 comprises a floor 522 and at least one railing 524 that together form the walkway of the catwalk; an actuator system 530 for actuating/controlling the catwalk to move between a retracted position/configuration and a deployed position/configuration; and a guide arm system for guiding/controlling the pivoting of the railing relative to the floor, during movement of the catwalk and also when the catwalk is in the deployed and/or retracted positions/configurations. Certain embodiments of the actuator system 530 may be as described regarding C1 and C2, above, with an example schematically portrayed in FIG. 23. The catwalk 500 may comprise a mounting frame, or other means of connection to a vehicle or equipment. Certain embodiments of the catwalk 500 may be adapted for installation and use in various locations on the vehicle/equipment, for example, to serve as front-mounted, left or right side-mounted, and/or rear mounted catwalks. The railing may be generally rectangular or other shapes, for example, including generally triangular extension(s) or other extension(s) to assist a user with safe movement on the catwalk and/or between catwalks.

The actuator system 530 and guide arm system 526 of the catwalk 500 are specially-adapted to provide a sleek design combined with effective operation. A hydraulic or pneumatic cylinder(s) and actuator linkage(s) are provided substantially or entirely outside of the walkway. Furthermore, the guide arm system is provided substantially or entirely outside of the walkway, for example, substantially or entirely below and/or outside the floor and the railing. Thus, preferably no portion of the actuator system or guide arm system of catwalk 500 protrudes into or across the walkway or the walkway ends. For example, there are preferably no bars or protrusions that the user must walk over or around when moving from one end of the walkway to another. For example, there are preferably no obstructions or protrusions bars, chains, link members, or other barriers protruding into or extending across the open ends of the catwalk walkway. Therefore, catwalk 500 may be described as "a supported catwalk" that is supported in both deployed and retracted positions/configurations, and during transition between these positions/configurations, by guide arm and/or actuator systems that are substantially or entirely below and/or outside the walkway of the catwalk.

Catwalk 500 preferably lacks barriers/obstruction at the ends of the walkway and therefore provides one or more of the benefits described above regarding such barrier-free walkways. Catwalk 500 preferably hinders or prevents the catwalk from retracting when a person is on the catwalk, as discussed for embodiments above, by means of designing and tuning the actuator system so that it is not capable of retracting the catwalk when a person is on the catwalk.

Catwalk 500 features an alternative embodiment of the railing 524 and the guard arm system 526 for guiding/controlling pivoting of the railing 524 relative to the floor 522. In the deployed position of FIGS. 20-23, 30, 33, and 34, the floor 522 is horizontal or generally horizontal, and the railing 524 is vertical or generally vertical. In the "half stroke" position of FIGS. 19, 25, 31, and 35, the floor 522 has pivoted on pivotal connection 523 (FIG. 20) to be about 40 degrees from horizontal and the railing 524 is about horizontal. In the "full-stroke" position of FIGS. 27, 28, 29, 32, and 36, the floor 522 and the railing 524 both are vertical or generally vertical and are preferably parallel to each other and side-by-side rather than co-planar.

Figure 27:
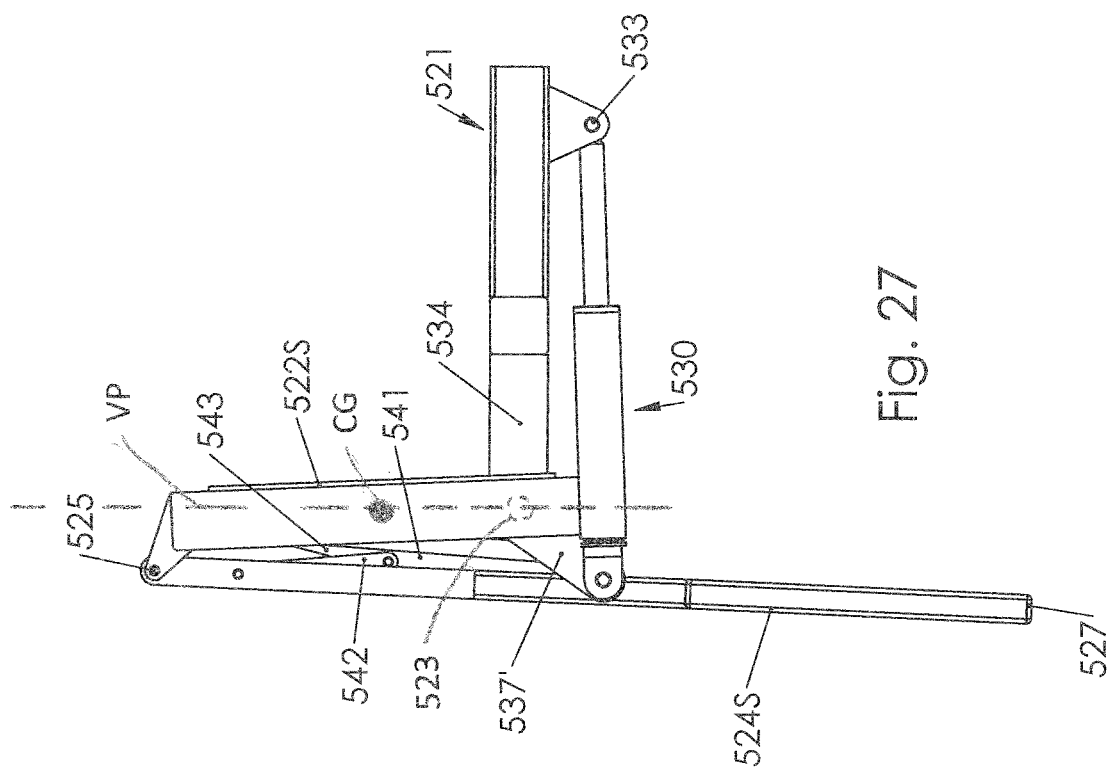
FIG. 27 is an end view of the catwalk embodiment of FIG. 19, wherein retraction has continued from the position in FIG. 26 to the fully-retracted position.
Figure 28:
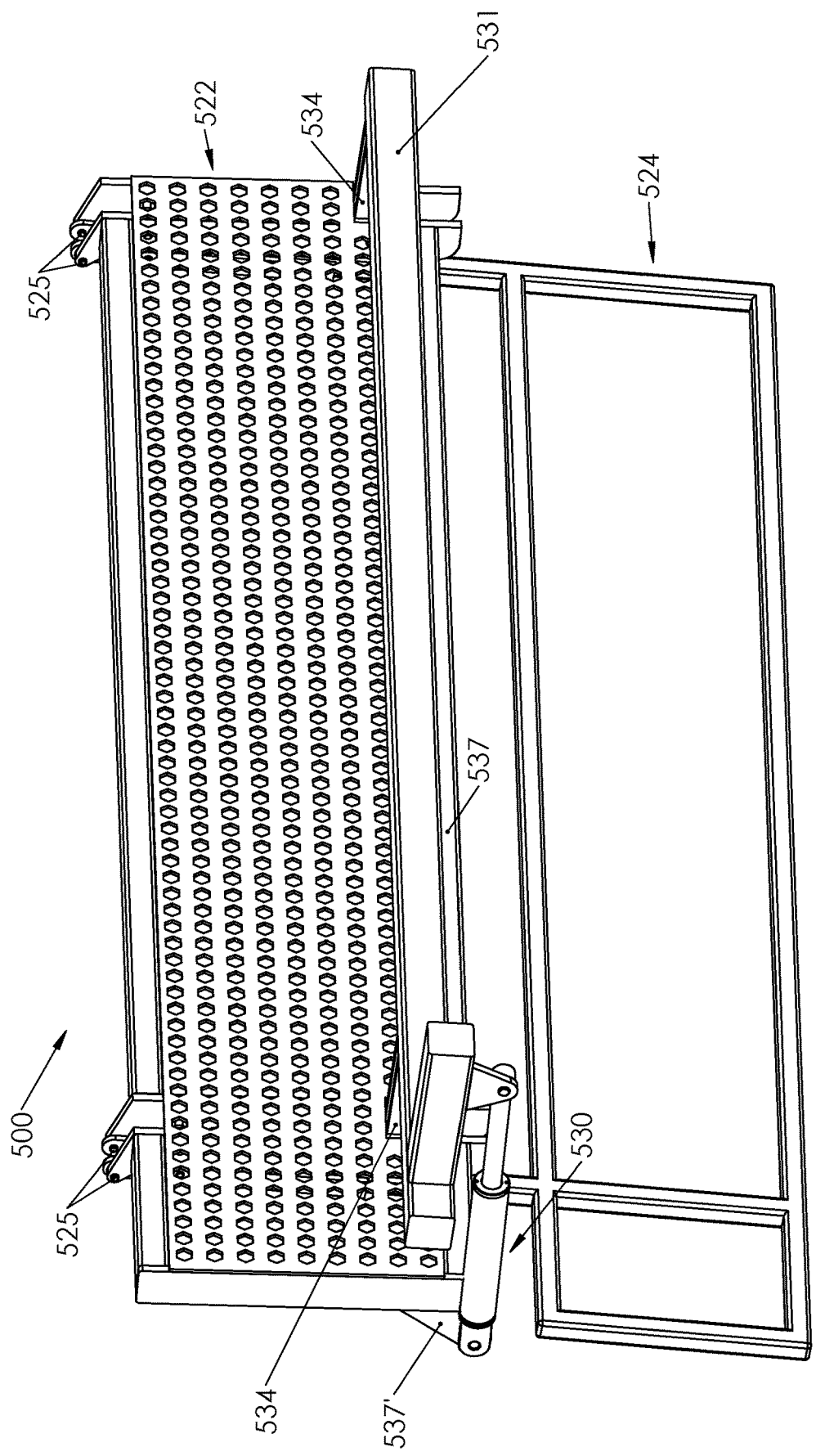
FIG. 28 is an inner side view of the catwalk embodiment of FIG. 19 in the fully-retracted position of FIG. 27.
Figure 29:
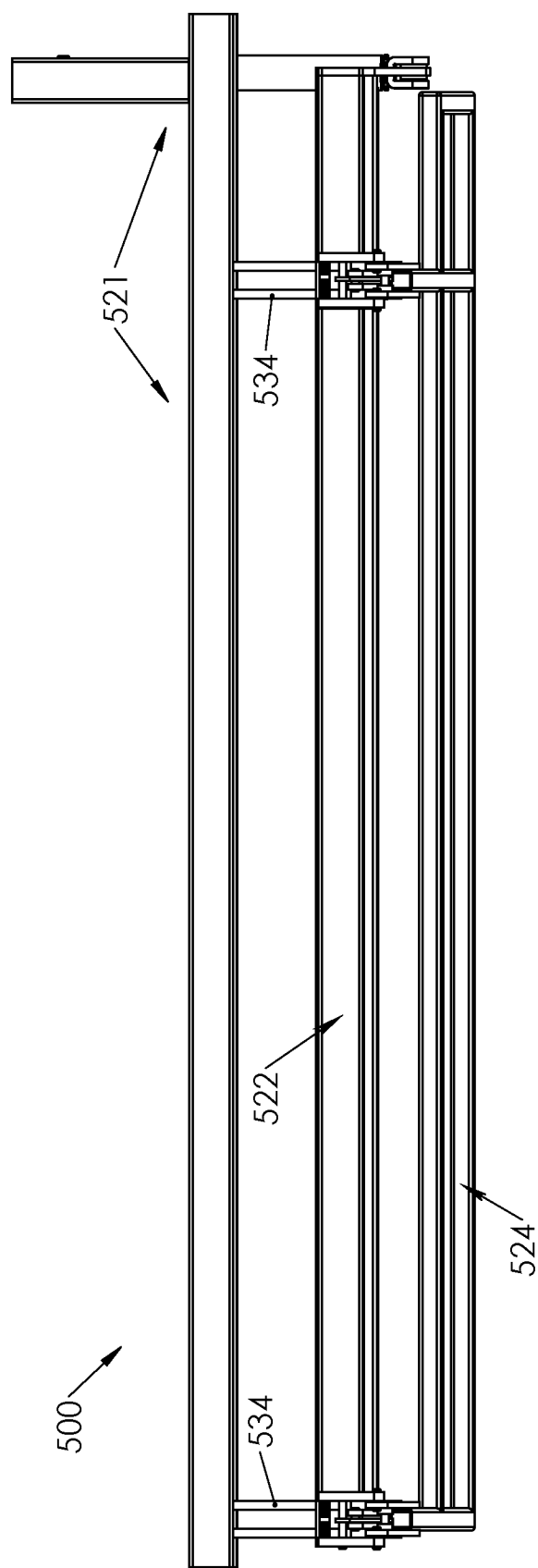
FIG. 29 is a top view of the catwalk embodiment of FIG. 19 in the fully-retracted position of FIG. 27.

The end view of FIG. 27 and the top view of FIG. 29 illustrate the compact, side-by-side configuration and the thin/small footprint of the retracted catwalk 500. In the retracted position, the floor 522 (both the "main plane" of the floor and the floor walking surface 522S) and the railing 524 (both the "main plane" of the railing and the railing inner surface 524S) are typically in the range of 0-10 degrees from each other, and more preferably 3-7 degrees from each other. The retracted guide arm system 526 is folded/collapsed entirely or substantially between the floor 522 and the railing 524, as shown to best advantage in FIGS. 27 and 36 where arms 541, 542, and 543 are between the floor 522 and the railing 524 and mostly hidden by end members of the floor and railing.

Figure 30:
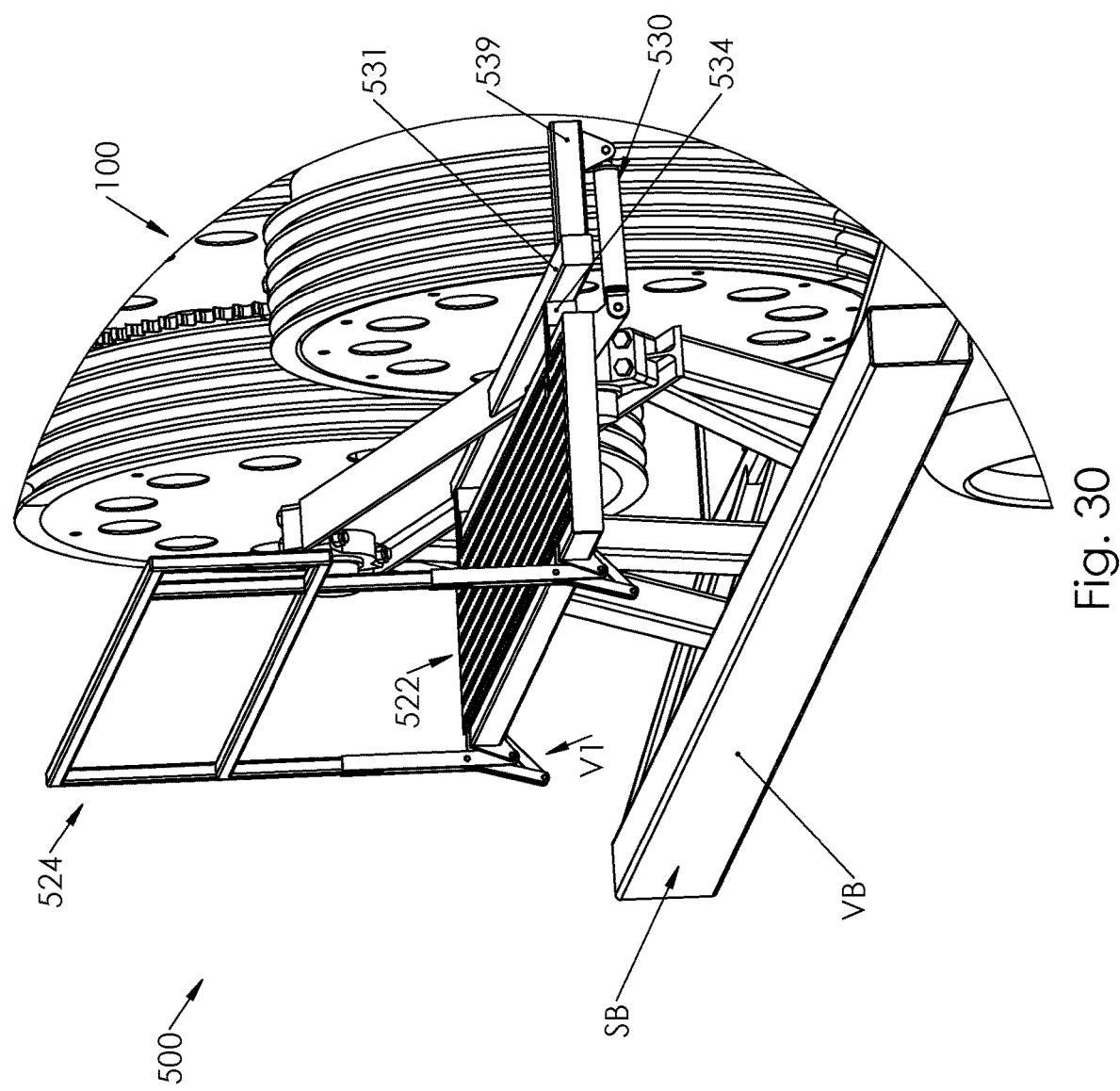
FIGS. 30-36 illustrate one or more of the catwalks of FIG. 19 connected to an exemplary vehicle for use, specifically, a cable reel truck.
Figure 32:
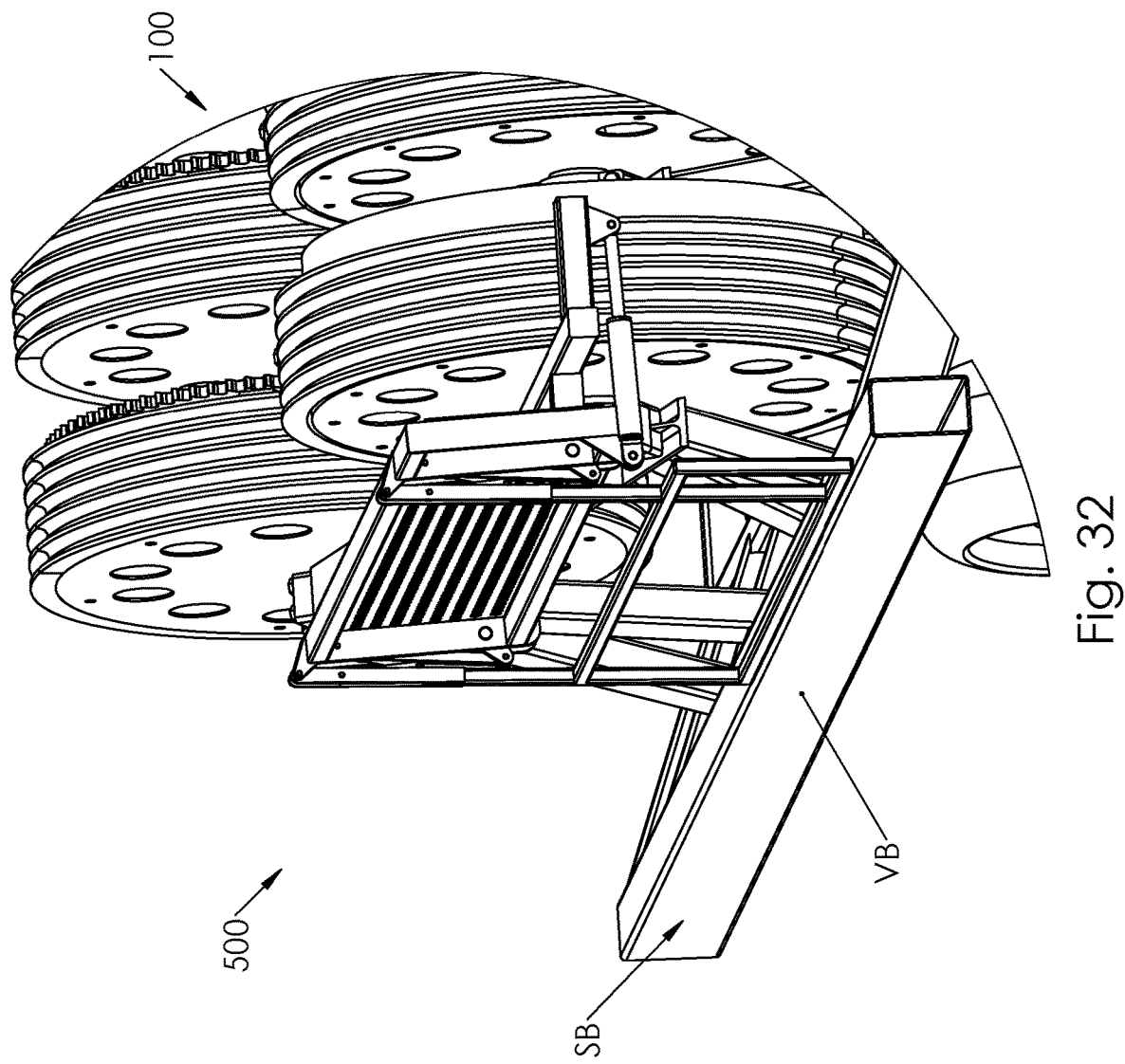
Figure 35:
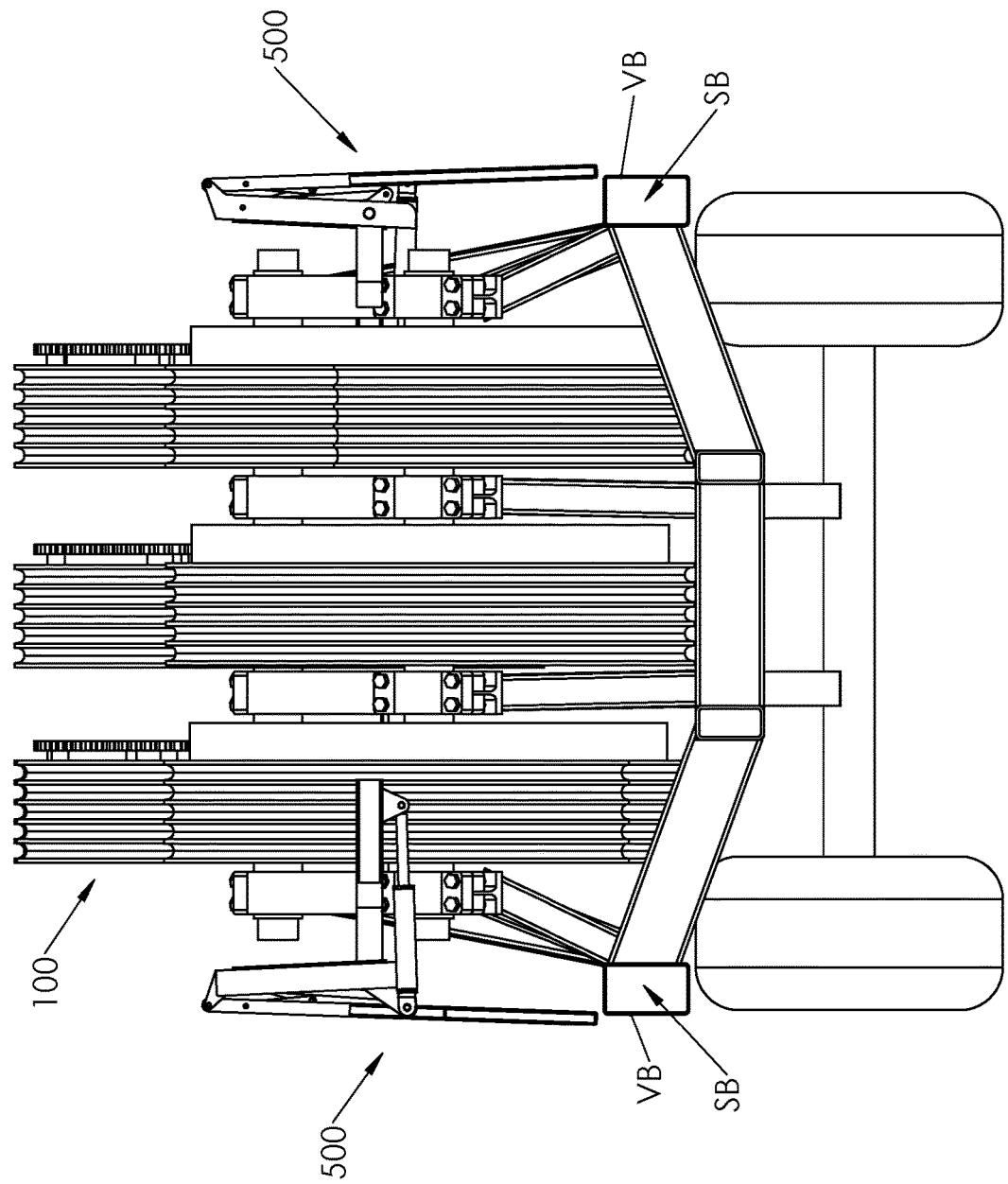

The footprint of the retracted catwalk 500 is not as thin/small as that of retracted catwalks 10, 20, 200, 300, and 400 in which the retracted railing is vertical and above the floor. Still, for example, the retracted catwalk 500 footprint may be in a range of about 6-15 inches, or 6-12 inches, or 6-10 inches. FIGS. 30, 32, and 35 illustrate that catwalk 500 may be mounted on the vehicle 100 so that, in the deployed and the retracted positions, catwalk 500 is entirely above the side beams SB, which are the outermost right and left structures of truck 100. Further, in the retracted position, catwalk 500 may be seen to extend only 0-2 inches horizontally out past the outer, vertical side surface VB of the side beam SB. Thus, the retracted catwalk 500 adds only 0-2 inches of width on each side of the vehicle, so that that the vehicle width is not increased, or increased only a minimal amount, for travel and storage. It will be understood from the Figures showing the retracted catwalk 500, for example FIGS. 29, 32 and 35, that the railing 524 is the outermost extremity of the retracted catwalk.

Figure 36:
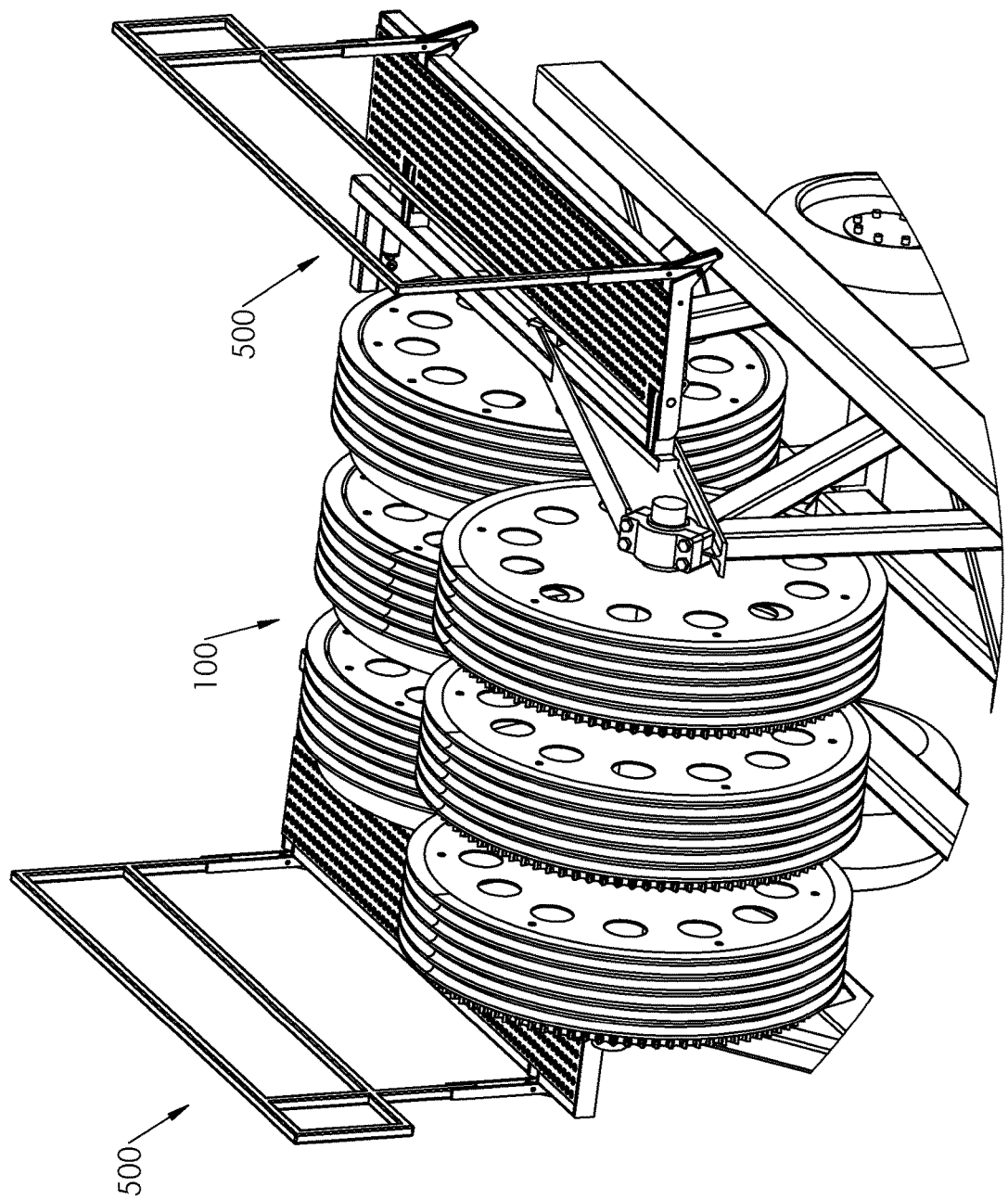
Figure 37:
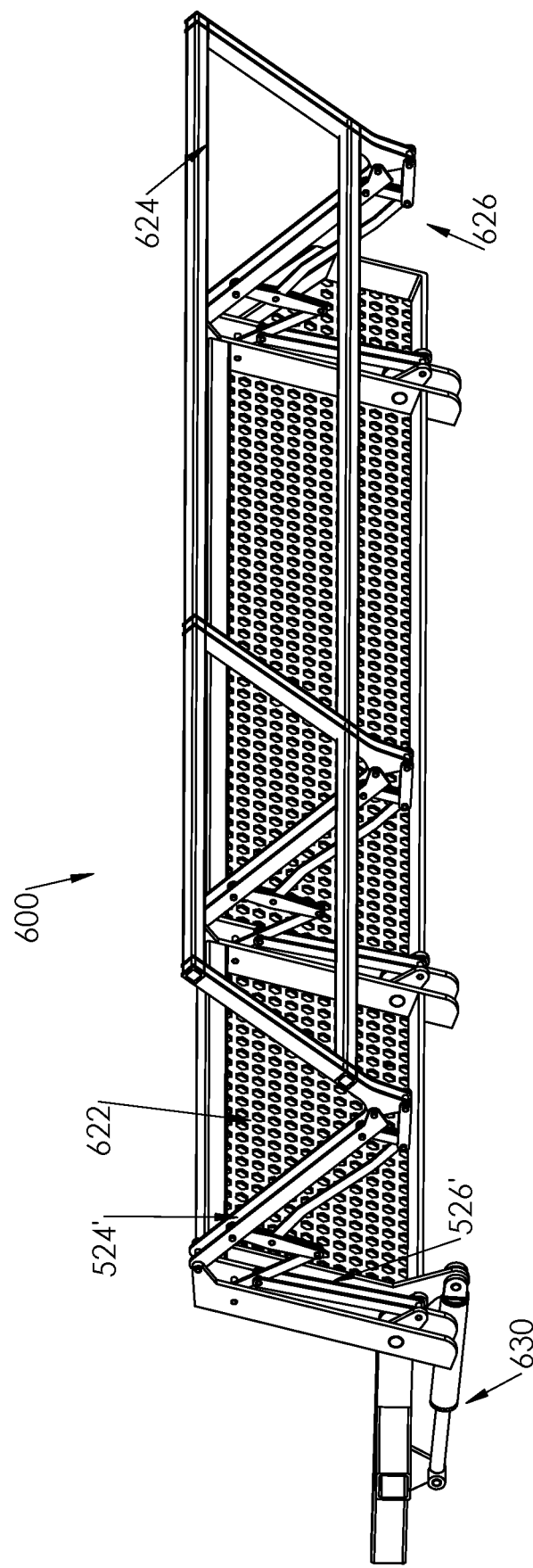
FIG. 37 is an outer perspective view of another embodiment of the invented catwalk, in a partially deployed (or "partially extended") position/configuration, wherein the vehicle/equipment to which the catwalk would typically be connected during use is not shown.
Figure 38:
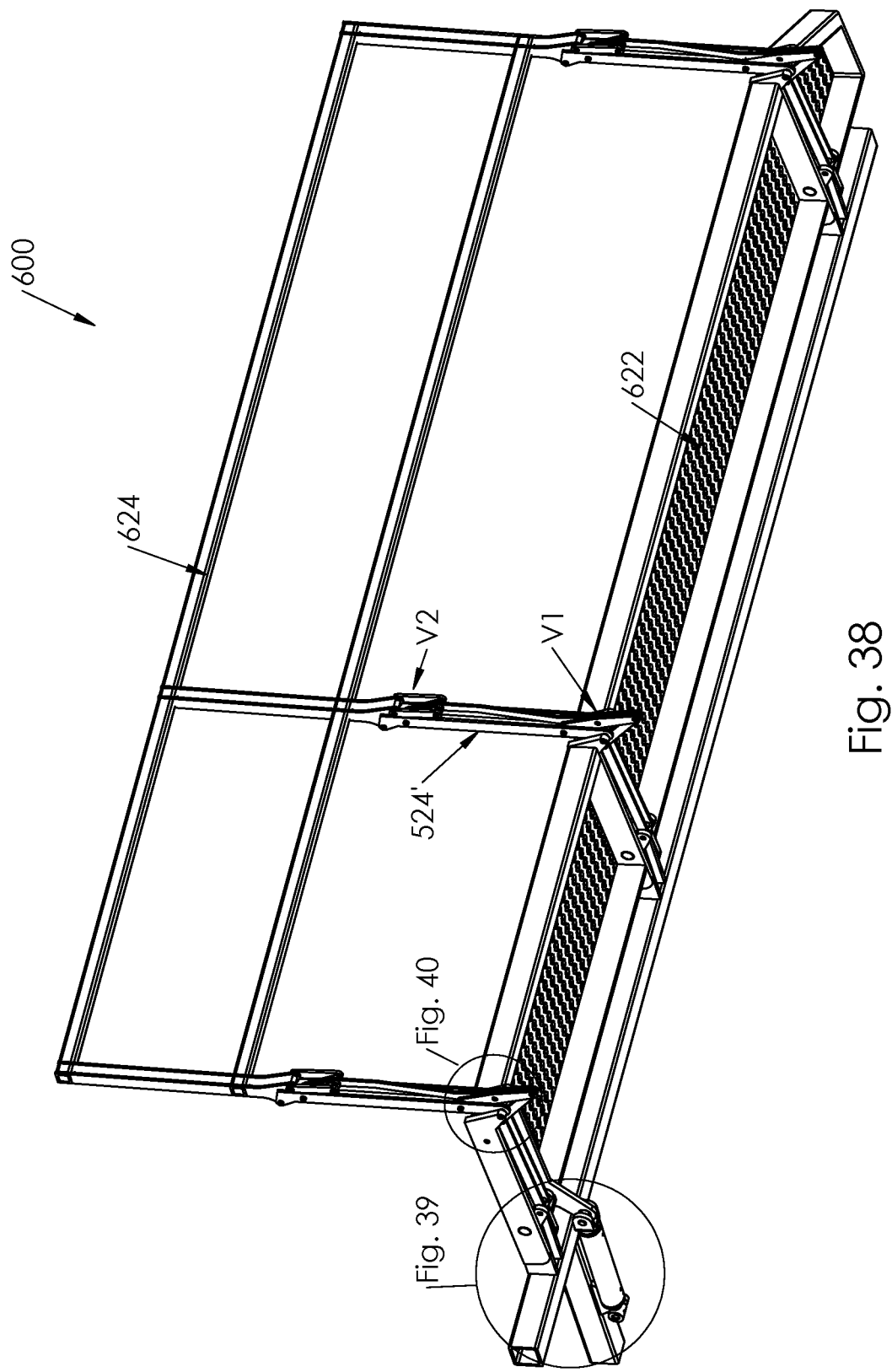
FIG. 38 is an outer perspective view of the catwalk embodiment of FIG. 37, in deployed position.
Figure 40:
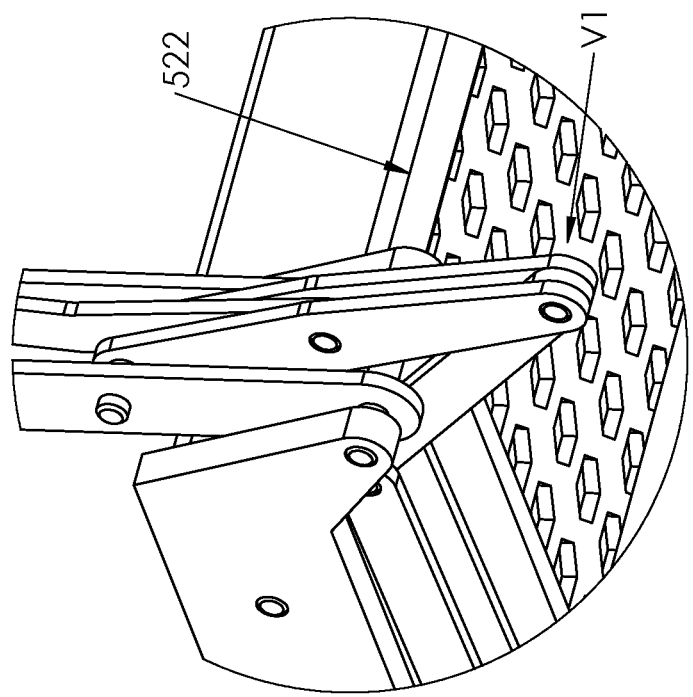
FIG. 40 is an enlarged view of a detail circled in FIG. 38.
Figure 39:
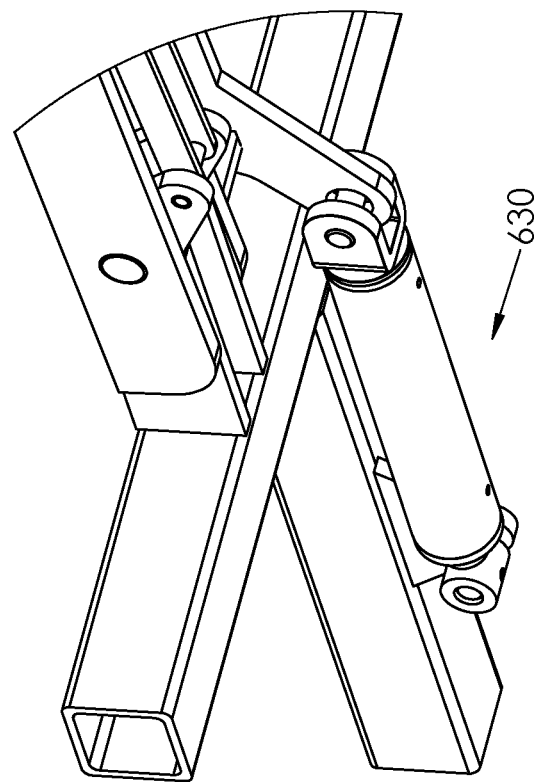
FIG. 39 is an enlarged view of a detail circled in FIG. 38.
Figure 41:
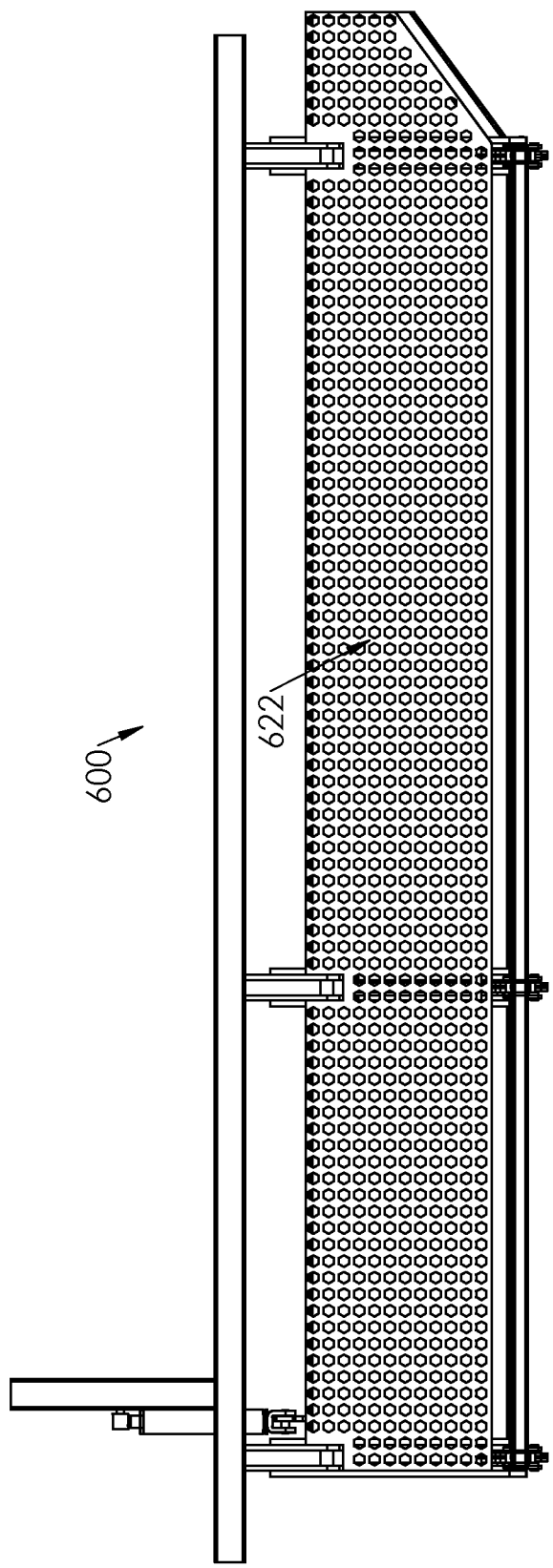
FIG. 41 is a top view of the catwalk embodiment of FIG. 37 in the deployed position.
Figure 42:
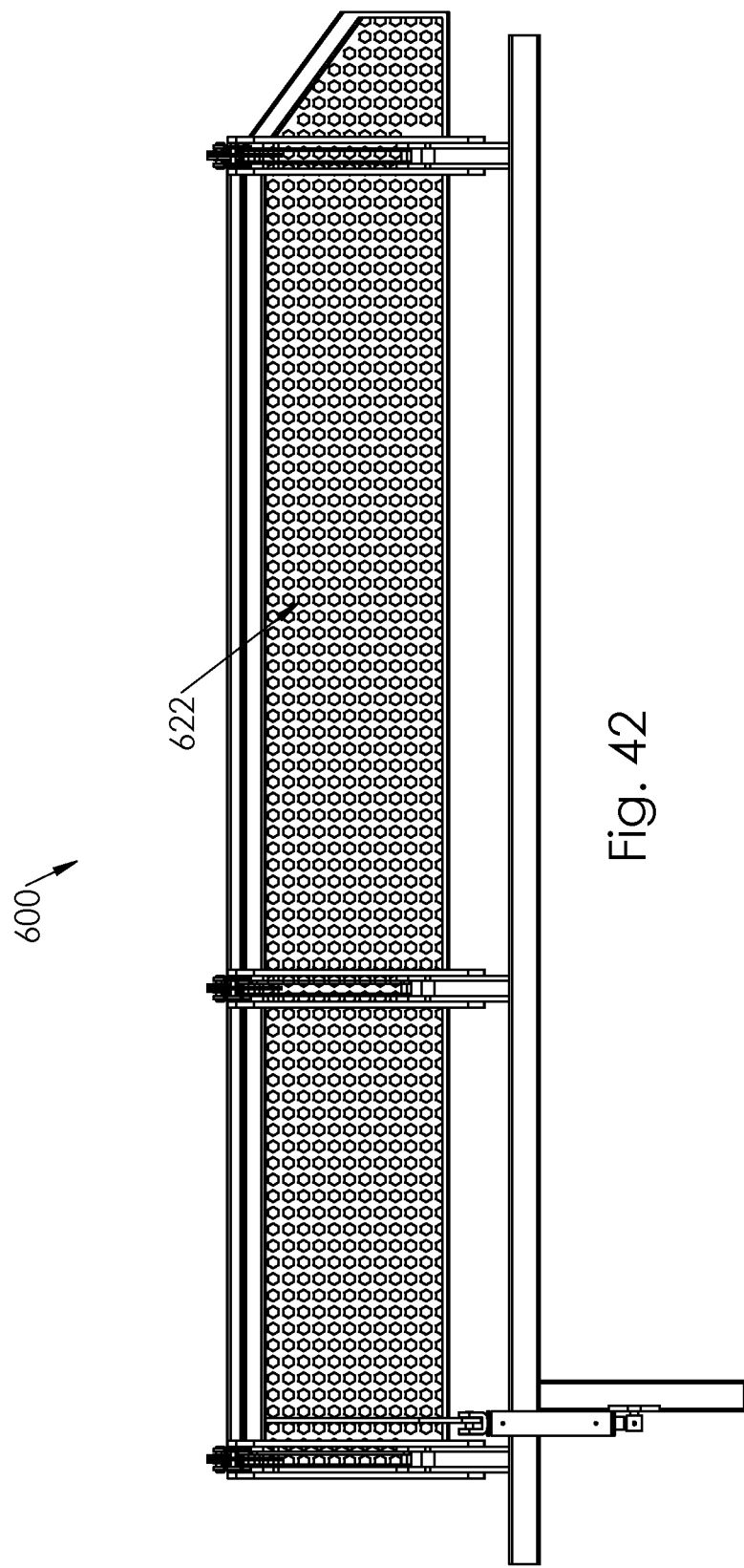
FIG. 42 is a bottom view of the catwalk embodiment of FIG. 37 in the deployed position.

The retraction of catwalk 500 may be described as the pivoting of the floor upward to a vertical or generally vertical position and the "folding" of the railing 524 down to be vertical or generally vertical near/against the bottom side of the floor 522, as shown in FIGS. 27, 32, and 36. This side-by-side, parallel or nearly parallel relationship of the floor 522 and the railing 524 provides the thin/small footprint, and minimizes the height of the retracted catwalk 500 to store the floor and the railing lower than the top of the equipment on the truck/vehicle. As evident in FIG. 27, the top extremity of retracted catwalk 500 is the pivotal connection 525 joining the railing 524 to the floor 522. The bottom extremity of the retracted catwalk 500 is the retracted railing's handrail 527. When certain embodiments of the catwalk 500 move from the deployed position to the retracted position: A) the floor 522 pivots from horizontal or generally horizontal, to vertical or generally vertical, or, in other words, pivoting 70 to 110 degrees or more preferably 80-100 degrees, and B) the railing pivots from upending vertically or generally vertically from the floor, to depend from a pivotal connection 525 at or near the outer edge 538 of the floor, in other words, pivoting 160-200 degrees, or more preferably 170-190 degrees. Also, by comparing FIG. 23 (deployed) to FIG. 27 (retracted) and viewing FIGS. 24-26 that represent the transition from FIG. 23 to FIG. 27, it will be understood that the railing 524 pivots, relative to the floor 522 that is also pivoting in FIGS. 23-27 (as opposed to the amount of railing pivot relative to the ground or relative to plumb), greater than 180 degrees, and, in the embodiment of FIGS. 23-27, almost 270 degrees.

The guide arm system 526 comprises multiple rigid arms. Upon actuation of retraction, the guide arm system 526 automatically pivots the railing 524 down to its retracted position. This is accomplished by means of the structure, placement and geometry of the multiple arms, and the pivotal connections of the multiple arms of the guide arm system 526 to each other and to the floor 522 and railing 524, as will be further described below. The actuation system, and especially said one or more cylinders, accomplish this by powering movement of the floor 522, without contacting or directly powering any part of the railing 524 or the guide arm system 526.

Figure 19:
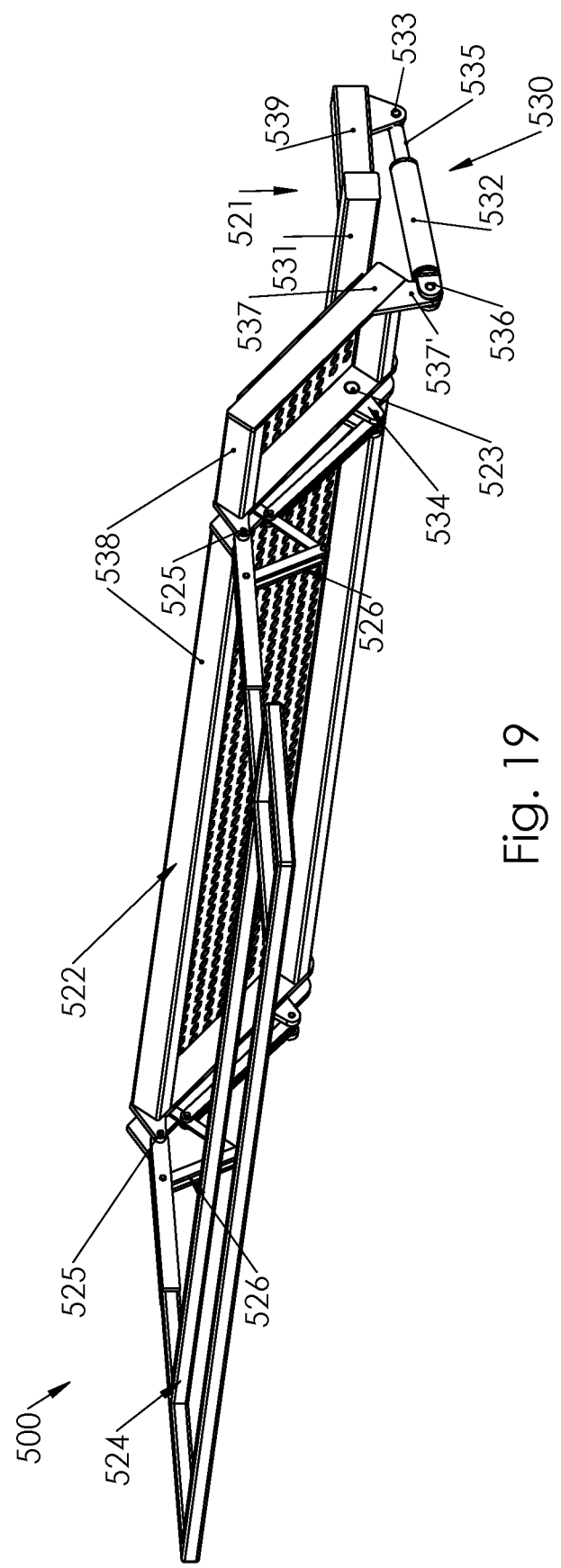
FIG. 19 is an outer perspective view of another embodiment of the invented catwalk, in a partially deployed (or "partially extended") position/configuration, for example, about half way between the deployed and retracted positions/configurations so at about "half-stroke", wherein the vehicle/equipment to which the catwalk would typically be connected during use is not shown.
Figure 22:
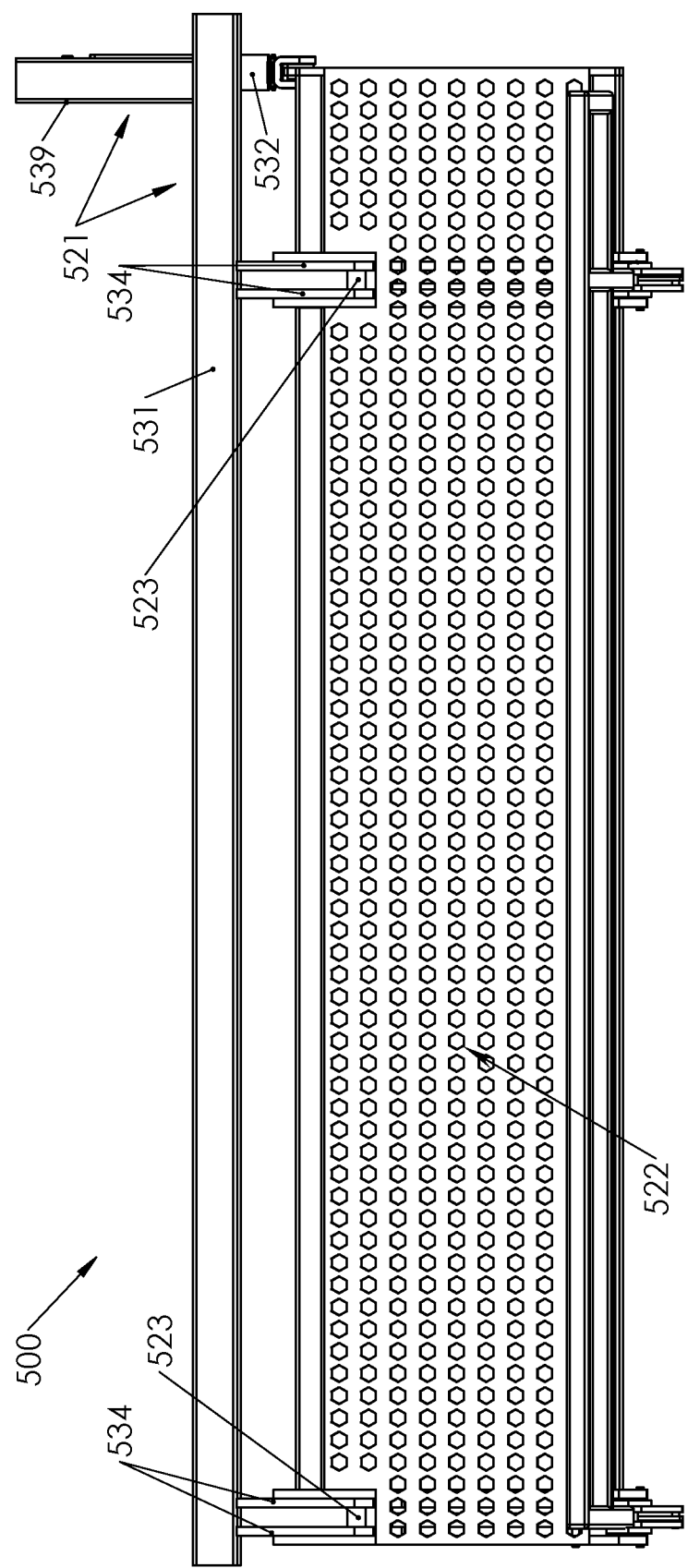
FIG. 22 is a top view of the catwalk embodiment of FIG. 19 in the deployed position.
Figure 24:
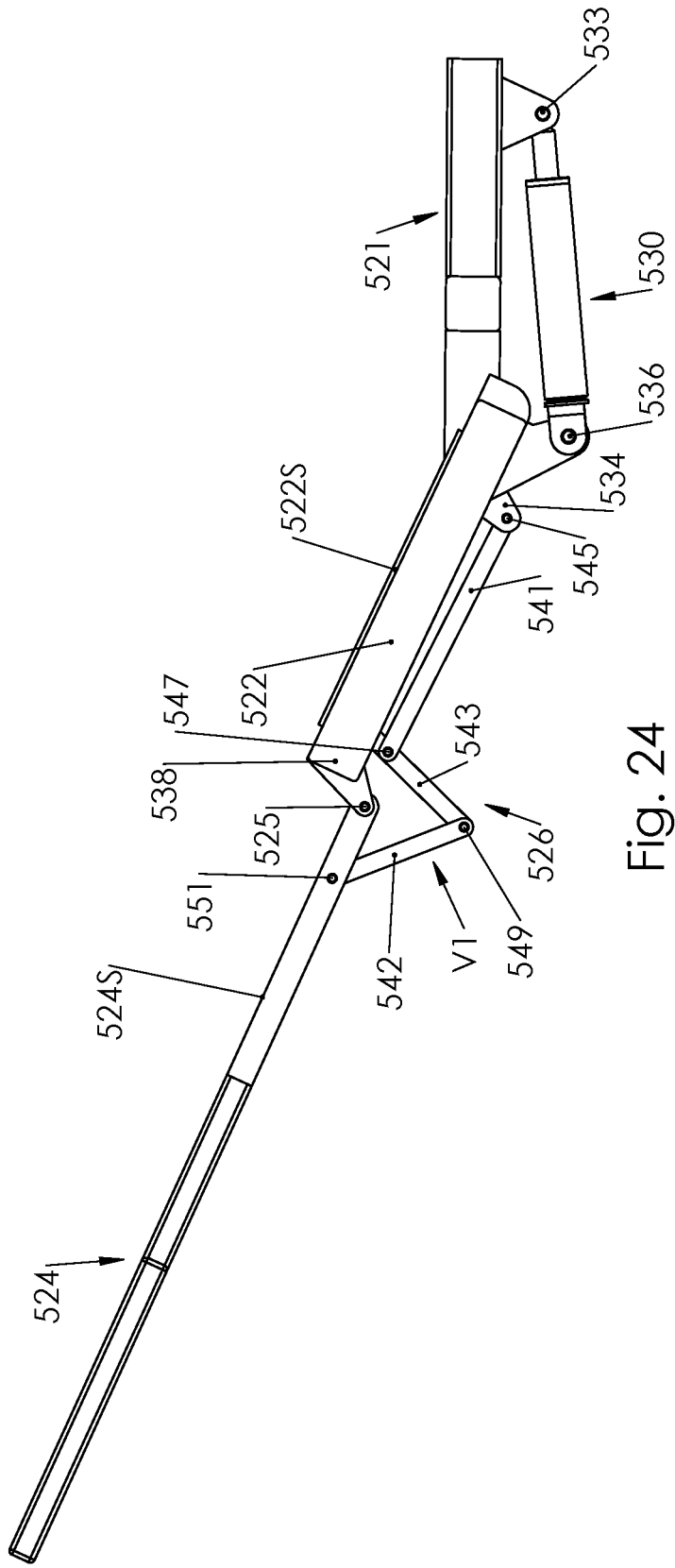
FIG. 24 is an end view of the catwalk embodiment of FIG. 19, wherein the catwalk has been retracted to part-way between the deployed position and the half-stroke position.
Figure 25:
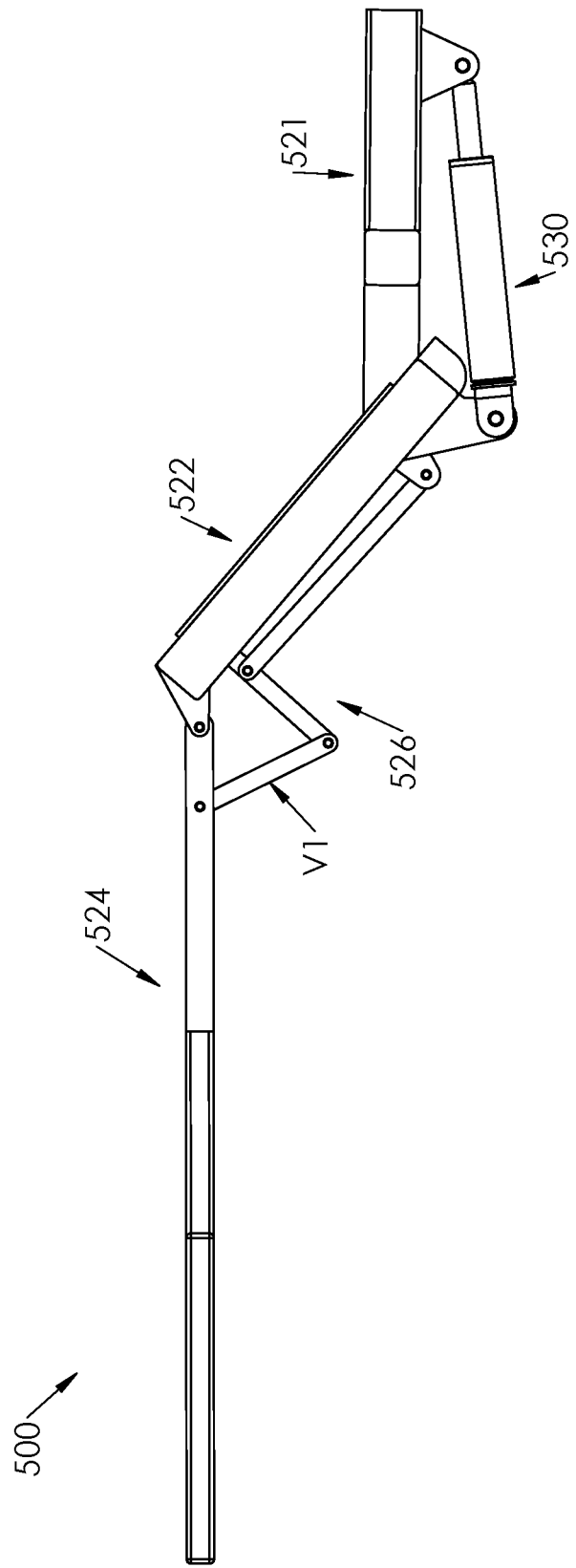
FIG. 25 is an end view of the catwalk embodiment of FIG. 19, wherein retraction has continued from the position in FIG. 24 to the half-stroke position.
Figure 26:
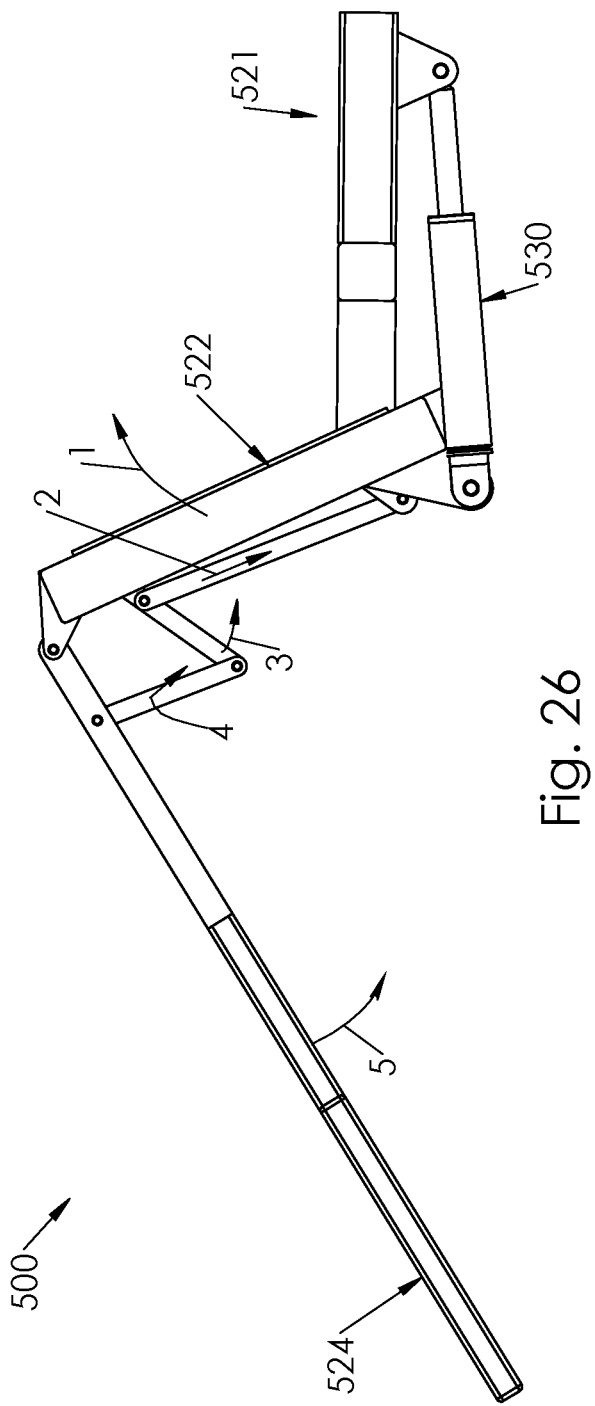
FIG. 26 is an end view of the catwalk embodiment of FIG. 19, wherein retraction has continued from the position in FIG. 25 to part-way between the half-stroke and the fully-retracted position.

Referring specifically to the Figures, FIG. 19 shows catwalk 500 in half-stroke position. FIGS. 20-23 show catwalk 500 in its deployed position. FIGS. 24-26 show catwalk 500 moving toward the fully-retracted position of FIG. 27. One may note in the sequence of FIGS. 23-27 that the railing 524 is a single, rigid railing portion that does not itself bend or fold, but instead pivots, on its pivotal connection 525 with the floor 522, from an upending position standing up from the deployed floor (FIG. 23), to a depending position extending down along and below the retracted floor (FIG. 27). FIG. 27 shows how the retracted railing 524 depends a substantial distance, for example, 1-3 feet, below the floor of the retracted catwalk 500. For example, as shown in FIGS. 32 and 36, retracted railing 524 tends to extend down along the side of the vehicle upon which it is mounted but not along-side the vehicle tires. FIG. 29 shows a top view of the retracted catwalk 500 that illustrates that folding the railing to be side-by-side with the floor adds several inches of width compared to catwalks 10, 20, 200, 300, and 400 in which the retracted railing is vertical and above the floor. For example, the railing 524 folded side-by-side with the floor adds 2-6 inches to the footprint of certain embodiments of the retracted catwalk, but not enough added inches/width to be problematic for travel or parking. Compare catwalk 500 in FIG. 29 to catwalk 20 in FIG. 10.

Figure 31:
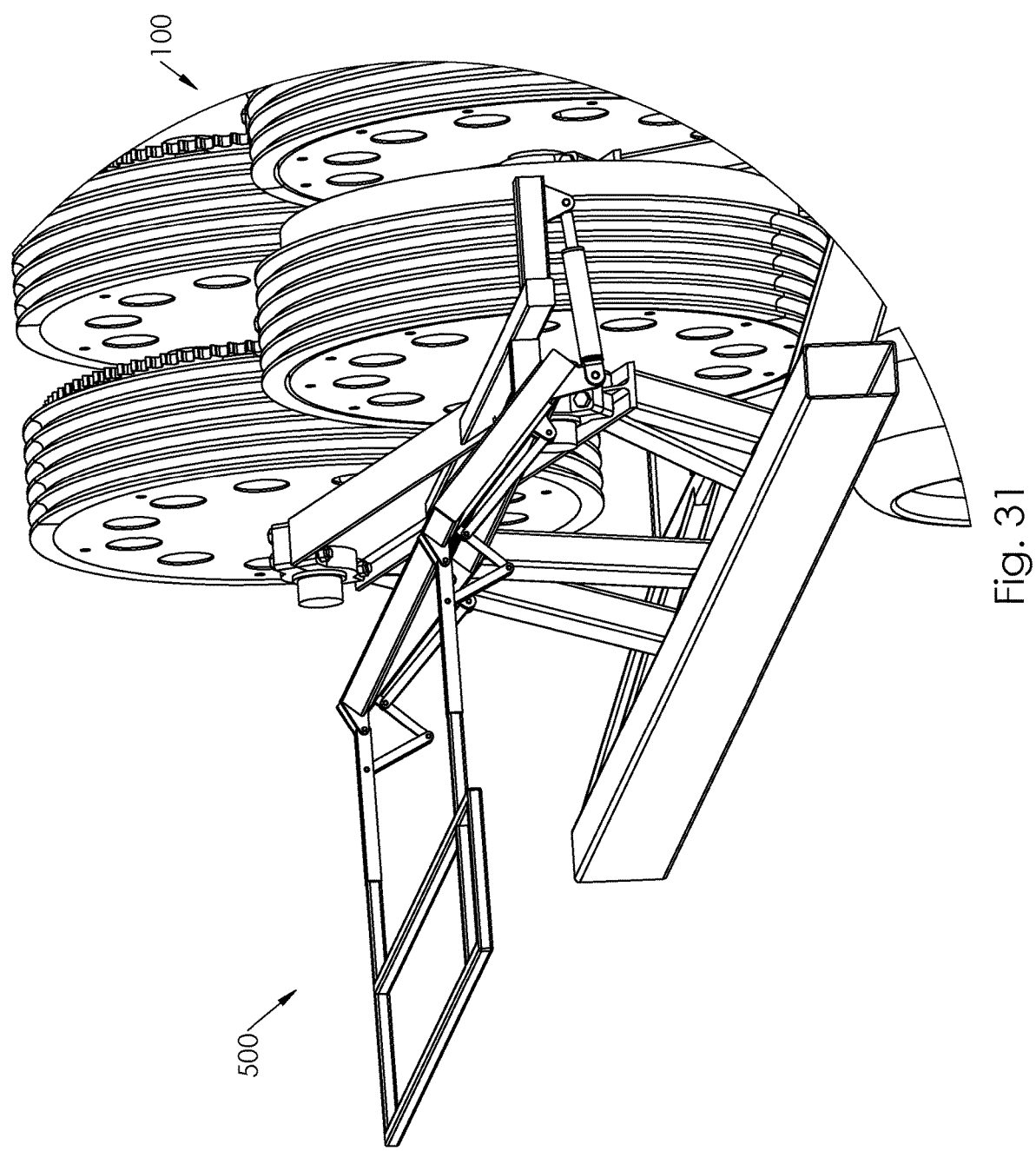
Figure 33:
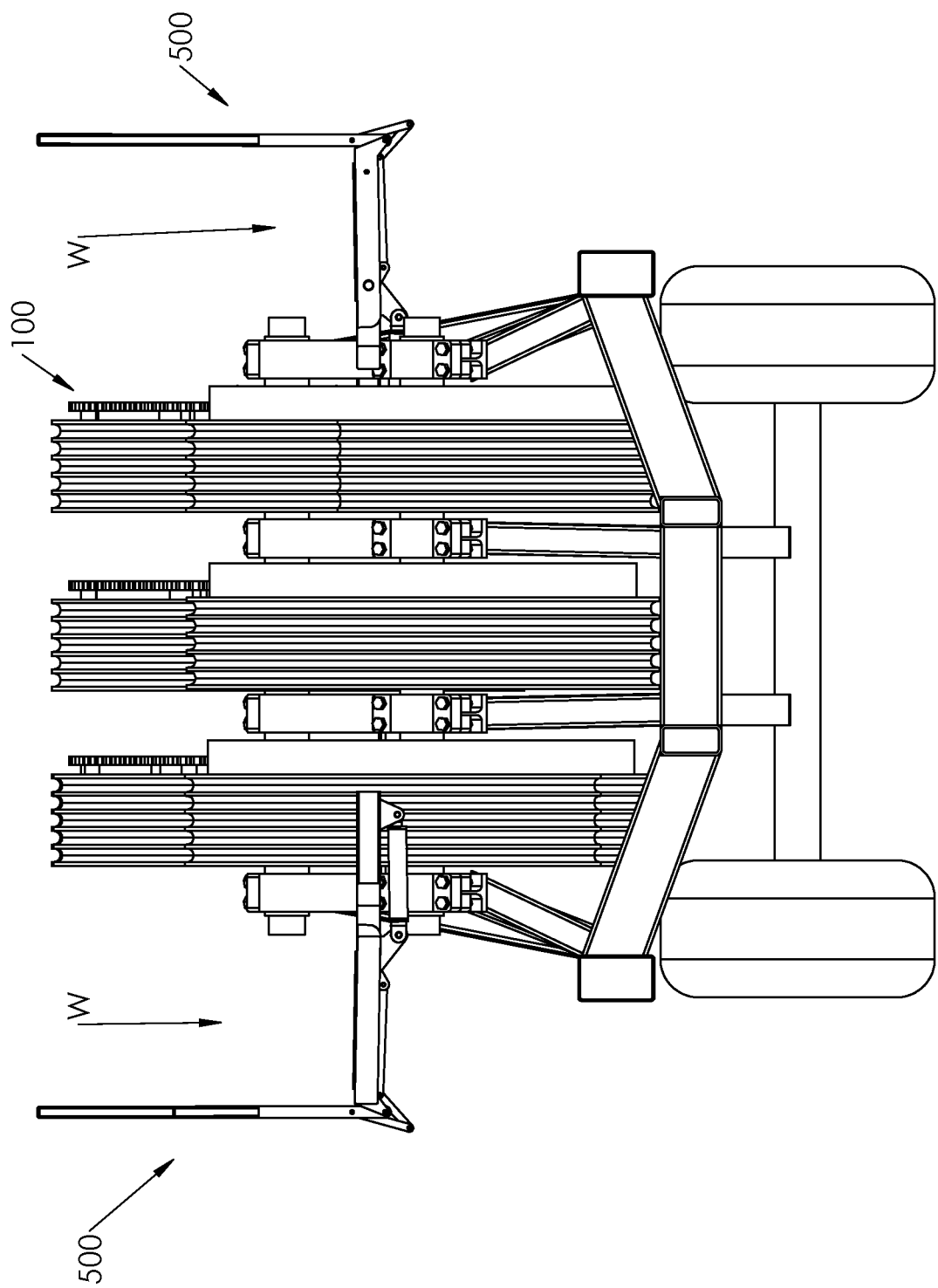
Figure 34:
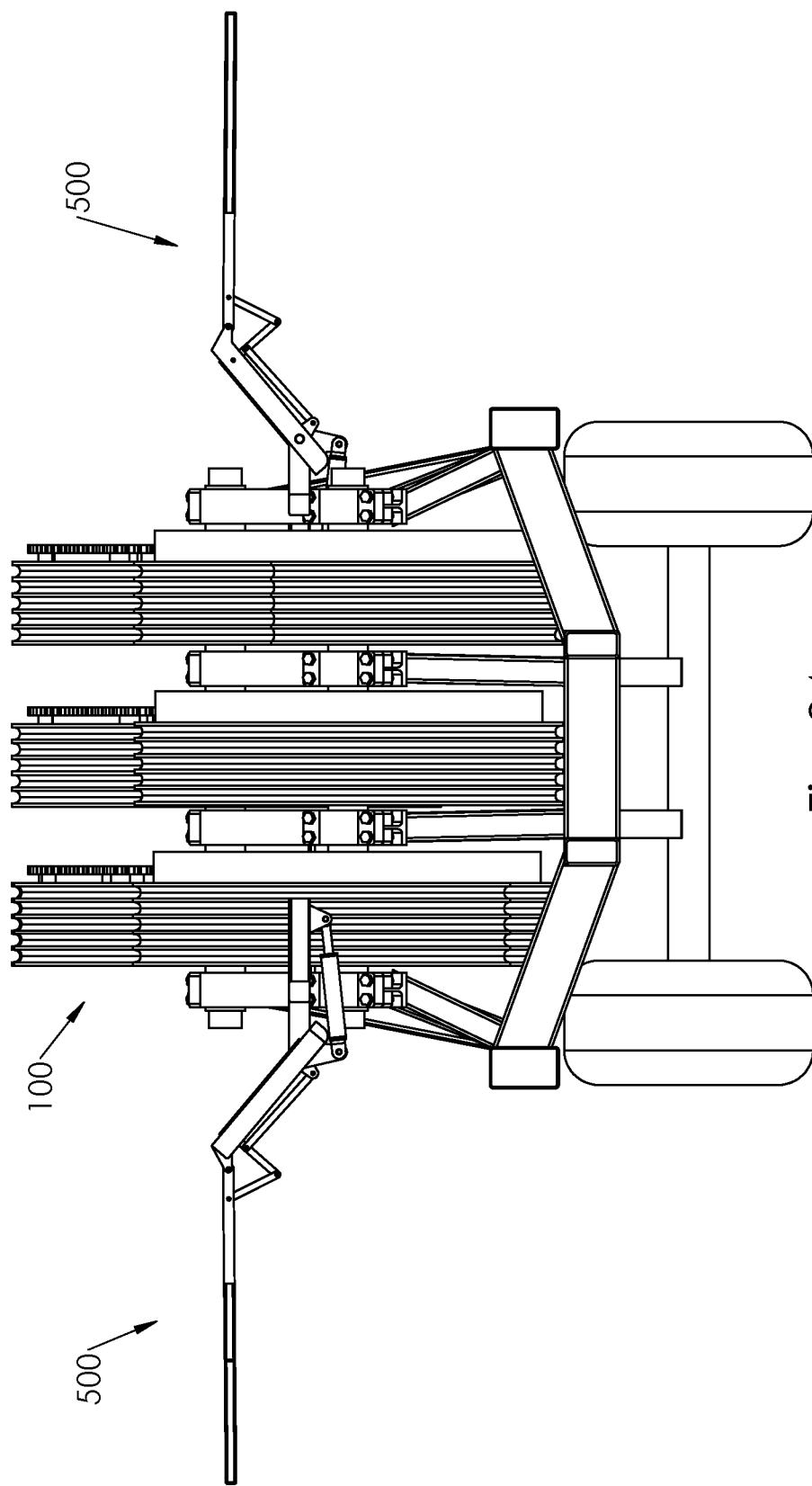

FIGS. 30-32 are perspective views showing catwalk 500 installed on an exemplary reel truck 100 and moving from the deployed position to the retracted position. FIG. 33 is a perspective view showing two catwalks 500 installed on the right and left sides of the exemplary reel truck 100. FIGS. 34-36 are rear views of two catwalks 500 installed on exemplary reel truck 100 and moving from the deployed positon to the retracted position.

A rigid mounting frame 521 is an example of various mounting structure/methods that may be used to install the catwalk 500 to the vehicle such as a reel truck 100. Mounting frame 521 comprises a rigid main member 531 parallel to the length of the truck 100 for securement to the truck 100, and rigid perpendicular extension members 534 extending from the main member 531 toward and through slots in the floor 522, to provide pivotal connections (or "hinges") 523 for pivotally connecting the floor 522 to the extension member(s) 534 extending from the mounting frame 521. The mounting frame 521 further comprises rigid perpendicular extension member 539 extending toward the vehicle 100 to provide first end pivotal connection 533 for the piston rod 535 of hydraulic or pneumatic cylinder 532 of actuator system 530. The opposing end of the cylinder 532 comprises a housing pivotally connected, at second end connection 536, to the inner edge 537 (or a rigid extension 537' therefrom) of the floor 522. Therefore, lengthening of the cylinder, by extension of piston rod 535 from the housing, will force the floor 522 to pivot relative to the mounting frame 521 at pivotal connection 523, clockwise in FIGS. 23-27. This pivoting of the floor serves to move the inner edge 537 of the floor downward and the outer edge 538 of the floor upward, and continues until the floor reaches its fully-retracted position in FIG. 27.

During, and as a consequence of, the floor' movement from the deployed to the retracted position, the guide arm system 526 automatically pivots the railing 524 from its deployed to its retracted position. The guide arm system 526 comprises a combination of multiple arms that are pivotally connected to each other and to the floor 522 and the railing 524, that, as a result of the floor pivoting, force the railing to pivot relative to the floor in an opposite direction and a greater amount/degrees than the floor's pivoting.

The guard arm system 526 comprises three elongated rigid arms, namely inner arm 541, outer arm 542, and middle arm 543, wherein connections of these arms to each other, railing(s), floor, and/or the mounting frame 521 are labeled with reference numbers in FIGS. 19, 21, 22, 24 and/or 51. The guide arm system 526 may be described as articulating, in response to the floor pivoting, to push and pull the railing 524 into its deployed and retracted positions, respectively.

Figure 51:
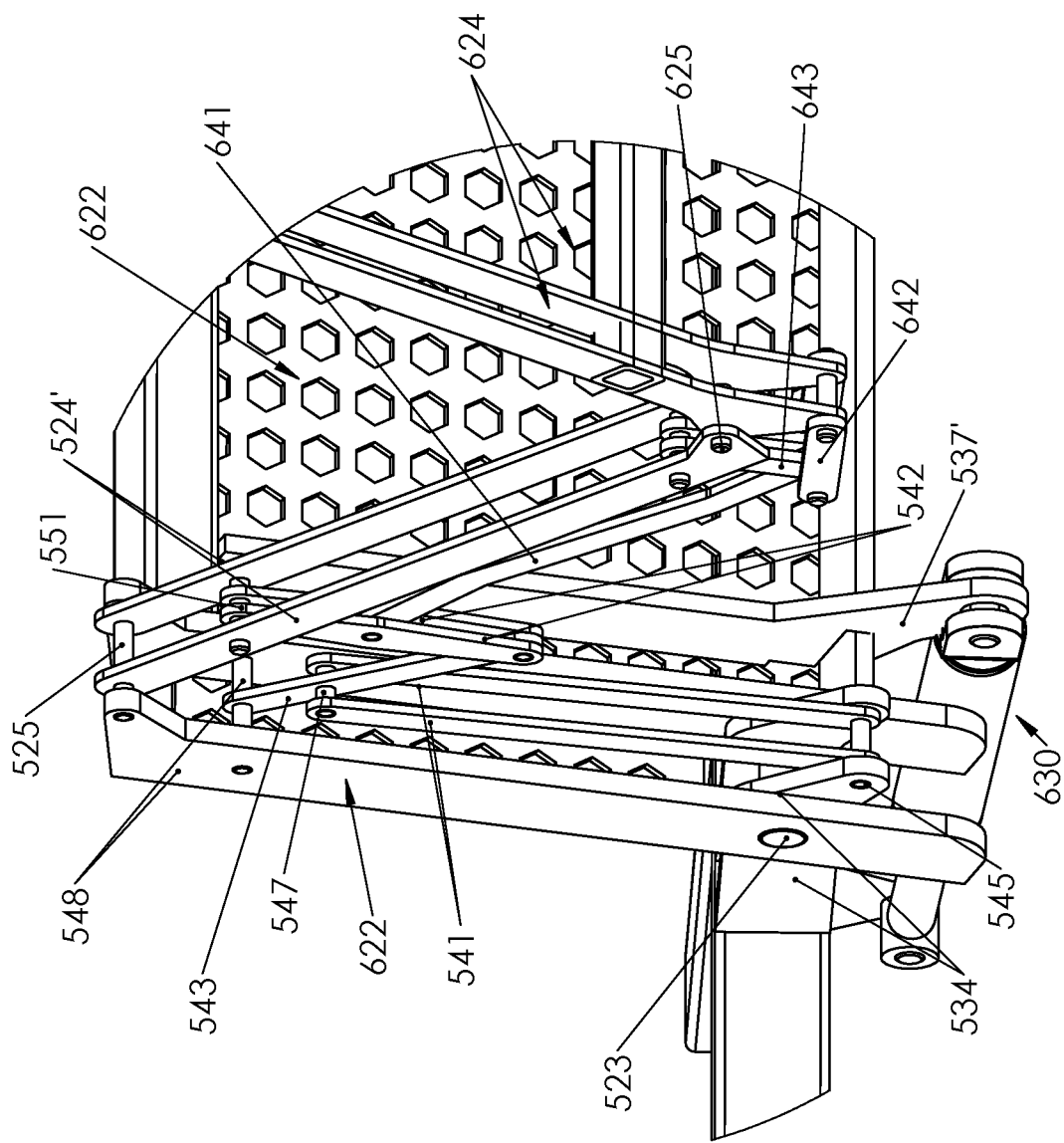
FIG. 51 is an outer perspective view of an end region of the catwalk embodiment of FIG. 37 in a partially-retracted position, showing to best advantage the guide arm system that guides/controls the two railing portions of this embodiment.
Figure 52:
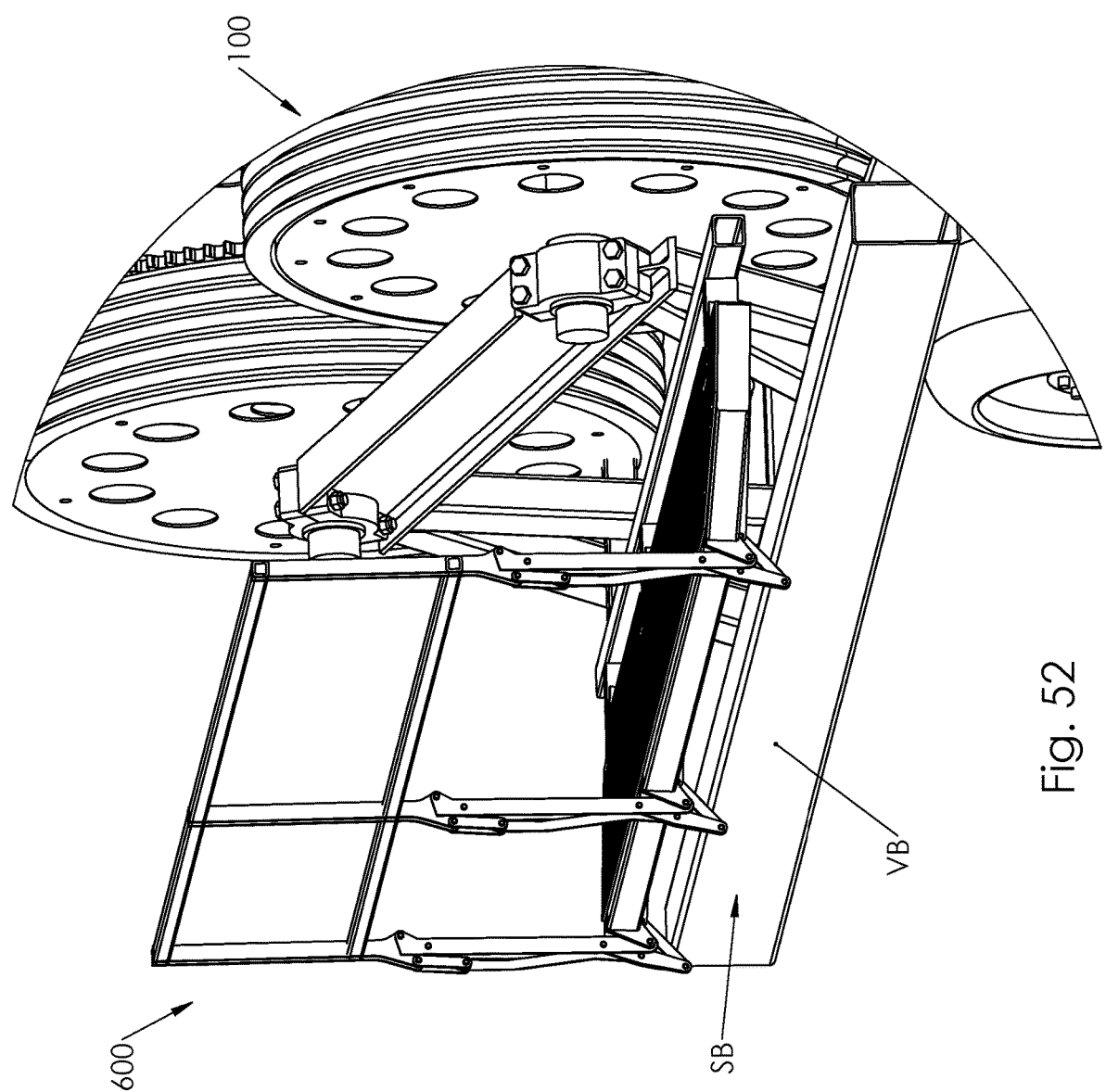
FIGS. 52-58 illustrate one or more of the catwalks of FIG. 37 connected to an exemplary vehicle for use, specifically, a cable reel truck.
Figure 53:
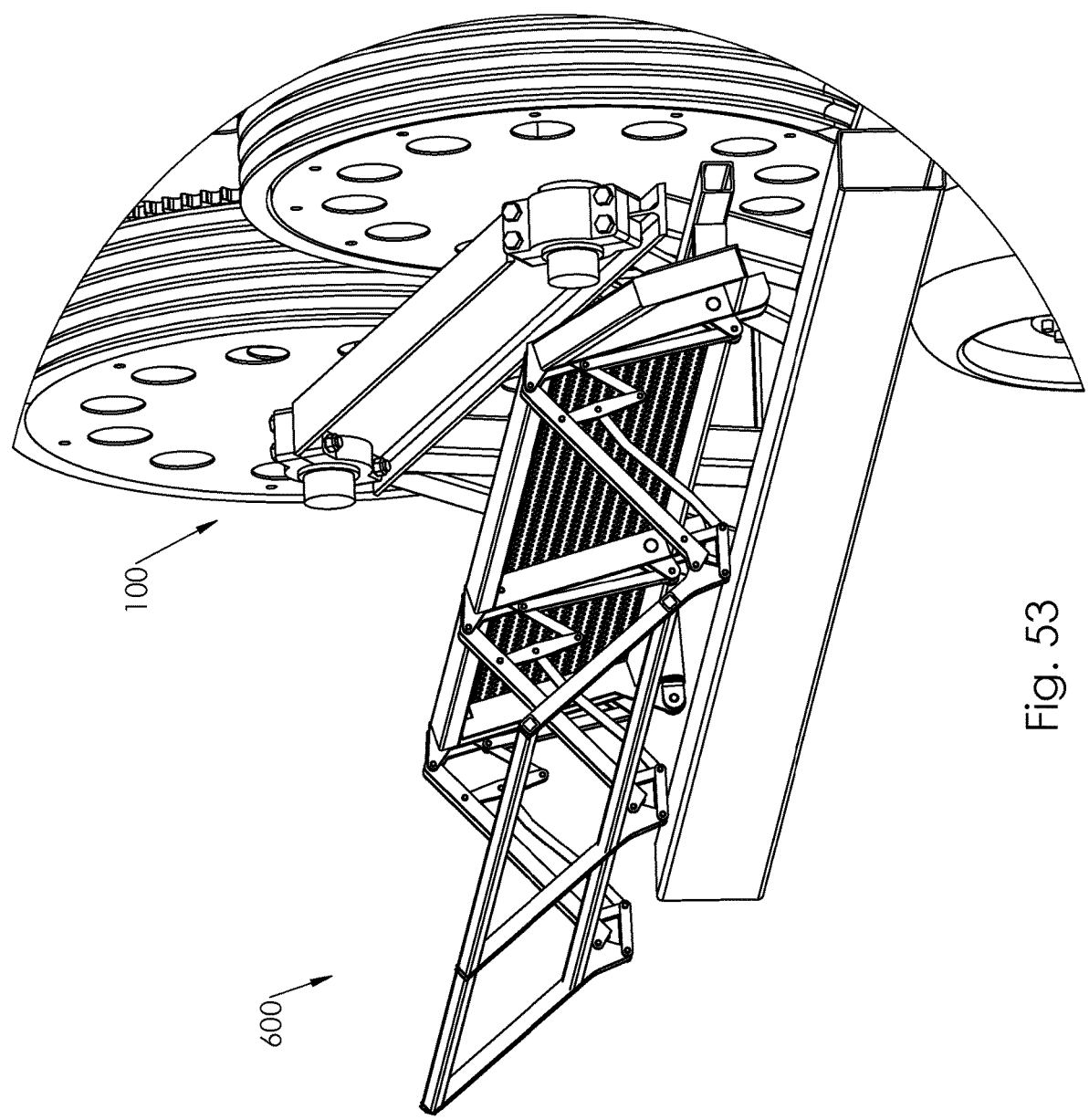

Inner arm 541 has an inner end pivotally connected to extension member 534 at pivotal connection 545 that is spaced from the floor's pivotal connection 523 (see FIGS. 19 and 22) to the extension member(s) 534. Inner arm 541 extends generally parallel to but spaced from the floor, to a pivotal connection 547 that is generally centrally located on middle arm 543. An inner end of middle arm 543 is pivotally connected to the floor 522, near the outer edge 538 of the floor, at pivotal connection 548 (hidden in space within/under the floor structure in FIGS. 19, 21, 22, and 24, but visible in FIG. 51) that is between the pivotal connection 525 of the railing to the floor and the pivotal connection 523 of the floor 522 to the extension member(s) 534 extending from the mounting frame 521. The opposing end of middle arm 543 is pivotally connected at pivotal connection 549 to a first end of outer arm 542. The opposing, second end of outer arm 542 is pivotally connected to the railing 524 at a pivotal connection 551 that is spaced from pivotal connection 525 connecting the railing to the floor. Therefore, middle and outer arms 542 and 543 form a V-shaped portion V1 of the guide arm 526 connected to both the floor and railing on opposite sides of pivotal connection 525.

Referring specifically to FIGS. 24-26, pivoting of the floor 522 upward relative to the mounting frame 521 (arrow 1) results in relative movement of the floor and the inner arm 541, which may be described as the inner arm 541 moving longitudinally relative to the floor 522 (arrow 2). This relative longitudinal movement of inner arm 541 pulls the middle arm 543 to pivot inward (toward the cylinder, arrow 3), which in turn pulls the outer arm 542 generally in the direction of its longitudinal axis and toward arm 543 (arrow 4), which in turn pivots/swings the railing 524 counterclockwise in FIGS. 24-26 (arrow 5) until the catwalk 500 is in the retracted positon of FIG. 27. In other words, because the inner arm 541 is generally parallel to but spaced from the floor 522, pivoting of the floor 522 changes the position of the inner arm 541 relative to the floor in a way that applies force to the middle arm 543 and the entire V-shaped portion V1 to pivot the railing from the deployed to the retracted position. Upon actuation of the actuator system 530 in the opposite direction (shortening of the cylinder rather than extension of the cylinder), these movements occur in in reverse and move the catwalk 500 components from the retracted position to the deployed position. Therefore, when the floor pivots, the inner arm 541 pulls during retraction (or pushes during deployment) the V shaped portion of the guide arm 526, in turn pulling or pushing the railing so that it pivots relative to the floor. During this process, the V-shaped portion V1 moves from its members 542 and 543 being at angles to each other of about 30-35 degrees in the deployed position of FIG. 23, to about 65-70 degrees in the half-stroke position of FIG. 25, to about 10-15 degrees in the retracted position of FIG. 27.

It may be noted that the entire guide arm system 526 (arms 541, 542, 543) may be described as outside of the walkway W of the catwalk 500, because it is located below and/or out from the railing 524 and the floor 522, for example, below and/or toward the left on the drawing sheets relative the floor walking surface 522S and railing inner surface 524S in FIGS. 23-26.

It may be seen to best advantage by viewing the positions and actions of the catwalk of FIGS. 23-27, that lengthening of the actuator 530 retracts/collapses the catwalk 500, shortening of the actuator 530 deploys the catwalk 500, and the actuator 530 remains generally horizontal when in, and during movement between, the retracted/collapsed and deployed positions. Further, the catwalk 500 features configuration and center of gravity that may be described as assisting in shortening the actuator 530 and deploying the catwalk 500, as further described below.

The catwalk configuration results in the retracted/collapsed floor extending vertically or substantially vertically upward from the pivotal connection/axle of the floor to the vehicle/mounting frame/extensions, placing the outer end/edge of the floor at or near the top end of the retracted catwalk. Thus, the outer end/edge of the in-use floor becomes the top end of the in-storage floor. The retracted/collapsed railing extends down from said top end of the floor and along-side the floor. See especially FIG. 27.

The weight of the floor and railing of catwalk 500, and any person or other weight on the floor, may be described as assisting in shortening (or maintaining the shortened condition) of the actuator and, therefore, as assisting in deployment (or maintaining the deployed condition). In FIG. 27, the center of gravity of the retracted/collapsed floor is above the pivotal connection/axle 523 (also "floor pivotal connection"), and is at, or near preferably in the outward direction, the vertical plane VP through the pivotal connection/axle 523. Specifically, center of gravity CG is shown schematically in FIG. 27 as above the pivot connection/axle 523 and outward from the vertical plane VP, for example, 0.25-2 inches or 0.5-1 inches, outward from the vertical plane VP. Further, the center of gravity of the combination of the floor and the railing in FIG. 27 will also be above the pivotal connection/axle 523 and outward from the vertical plane VP.

Therefore, it will be understood, especially in view of the locations of these centers of gravity, that shortening of the actuator may easily and smoothly start and continue pivoting of the floor from the position in FIG. 27 to full deployment. Also, it will be understood that that the maximum pressure set for the actuator system, due to the above-discussed safety considerations, will be sufficient, and, in most embodiments, greater than the minimum required to accomplish the deployment. In many embodiments, this contributes to the safety and reliability of the catwalk, because, as described elsewhere in this document, the pressure supplied to the actuator may be set/controlled to be a maximum amount that is only capable of lengthening the cylinder, and thereby only capable of retracting/collapsing the catwalk, if a person is not on the catwalk.

Catwalk Embodiment of FIGS. 37-58

An alternative embodiment is portrayed in FIGS. 37-58, specifically catwalk 600 and methods of using the catwalk 600. Catwalk 600 shares many of the structural and operational features and benefits of previously-discussed embodiments, particularly of catwalk 500. Alternative/additional structures and features of catwalk 600 comprise, consist essentially of, or consist of, an additional/second railing portion that is pivotally connected to the first railing portion that is pivotally connected to the floor. For example, a railing portion 624 is pivotally connected to a railing portion 524' that is the same or very similar to railing 524 of catwalk 500, for example, substantially the same as railing 524 except shorter so that it upends a smaller distance from the floor in the deployed position/configuration. Details of the second railing portion 624, its pivotal connection to railing portion 524', and the additional guide arm system portion 626 for guiding and controlling railing portion 624 will be apparent from the drawings and/or the following description. Reference numbers in FIGS. 37-58 point out the main differences between catwalk 500 and catwalk 600, but many of the elements of catwalk 600 are the same or very similar to those of catwalk 500 and so are not labeled with reference numbers.

The catwalk 600 is shown detached from any vehicle/equipment in FIGS. 37-51. To illustrate the transition between deployment and retraction, catwalk 600 is shown in its deployed position/configuration in FIG. 43, its retracted position/configuration in FIG. 48, and moving between the deployed and retracted positions/configurations in FIGS. 44-47. The thin/small footprint of the catwalk 600 is especially apparent in FIGS. 49 and 50. The guard arm system 526, 626 that operates the railing portions 524', 624 in an effective and out-of-the-walkway W manner is enlarged in FIG. 51. One or more catwalks 600 are shown installed and operating on an exemplary vehicle, reel truck 100, in FIGS. 52-58.

Catwalk 600 may be described as comprising a floor and at least one railing that together form the walkway W of the catwalk, wherein said at least one railing comprises multiple railing portions 524' and 624. As in previously-discussed catwalks, catwalk 600 further comprises an actuator system for moving the catwalk enclosure between a retracted position/configuration and a deployed position/configuration; and a guide arm system for guiding/controlling the pivoting of the railing portions relative to the floor, during movement of the catwalk and when the catwalk is in the deployed and/or retracted positions/configurations. Certain embodiments of the actuator system 630 may be as described regarding C1 and C2, above, with an example schematically portrayed in FIG. 43. Catwalk 600 may comprise a mounting frame, or other means of connection to a vehicle or equipment. Certain embodiments of the catwalk 600 may be adapted for installation and use in various locations on the vehicle/equipment, for example, to serve as front-mounted, left or right side-mounted, and/or rear mounted catwalks.

The actuator system 630 may be the same or substantially the same as actuator system 530 for catwalk 500. The guard arm system of catwalk 600 is modified compared to that in catwalk 500 to accommodate the two portions 524', 624 of catwalk 600. As in previously-discussed catwalks, the actuator system and guide arm system of catwalk 600 are specially-adapted to be substantially or entirely outside of the walkway. For example, the actuator system or guide arm system of catwalk 600 are substantially or entirely below and outside the floor/walking-surface, and the railing, so that there are preferably no obstructions or protrusions bars, chains, link members, or other barriers protruding into or extending across the open ends of the catwalk walkway. Therefore, catwalk 600 may be described as "a supported catwalk" and includes one or more of the benefits discussed above for previously-discussed catwalks. Also, like previously-discussed catwalks, catwalk 600 is adapted like to hinder or prevent the catwalk from retracting when a person is on the catwalk.

Catwalk 600 features an alternative railing system and a guard arm system specifically adapted for guiding/controlling pivoting of the railing system relative to the floor 622. The floor 622 and the actuator system 630 of catwalk 600 preferably operate and are oriented the same or similarly as floor 522 and actuator system 530 in their deployed and retracted positions, and in-between the deployed and retracted positions, as may be seen in the deployed views of FIGS. 38-43, 52, 55 and 58, partially-retracted views of FIGS. 37, 44-47, 53, and 56, and the fully-retracted views of FIGS. 48-50, 54, and 57. One may see in the deployed views, that railing portion 624 is vertical or generally vertical and above railing 524', preferably coplanar or coplanar with railing 524'.

Figure 48:
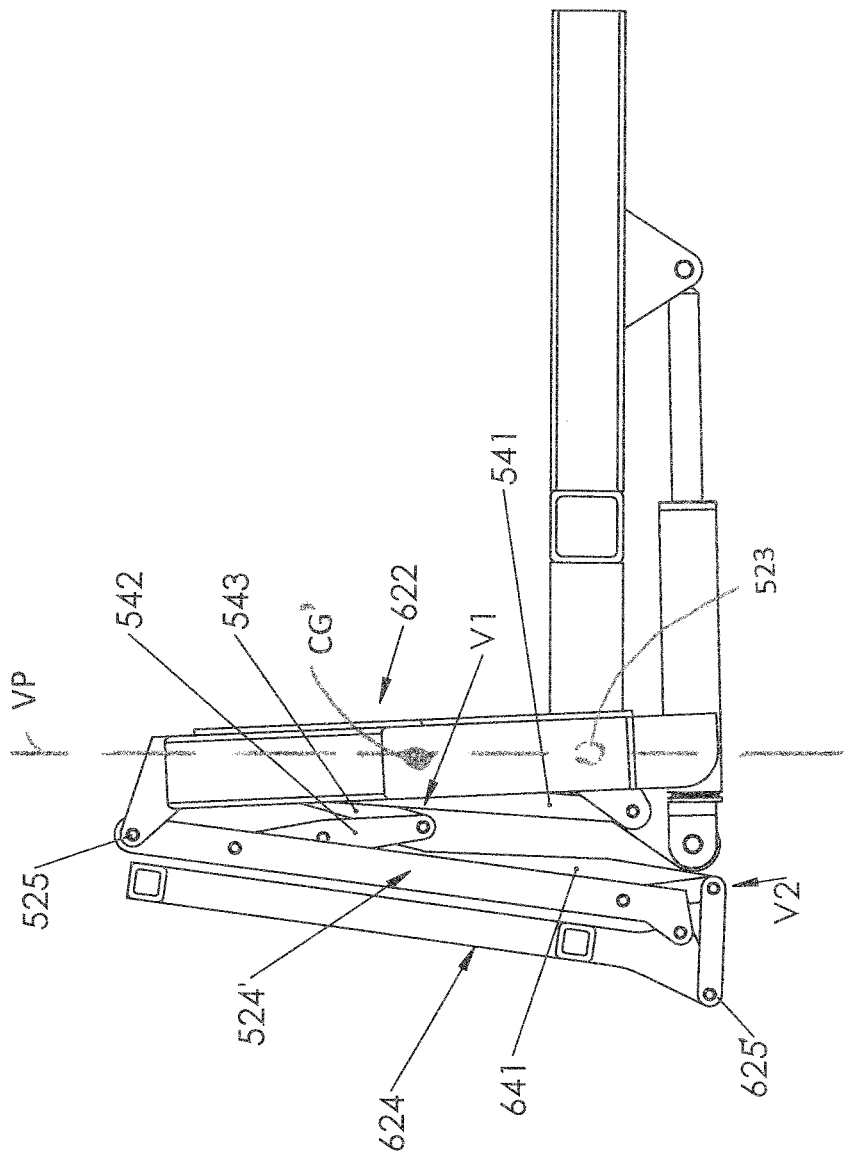
FIG. 48 is an end view of the catwalk embodiment of FIG. 37, wherein retraction has continued from FIG. 47 to the fully-retracted position.
Figure 49:
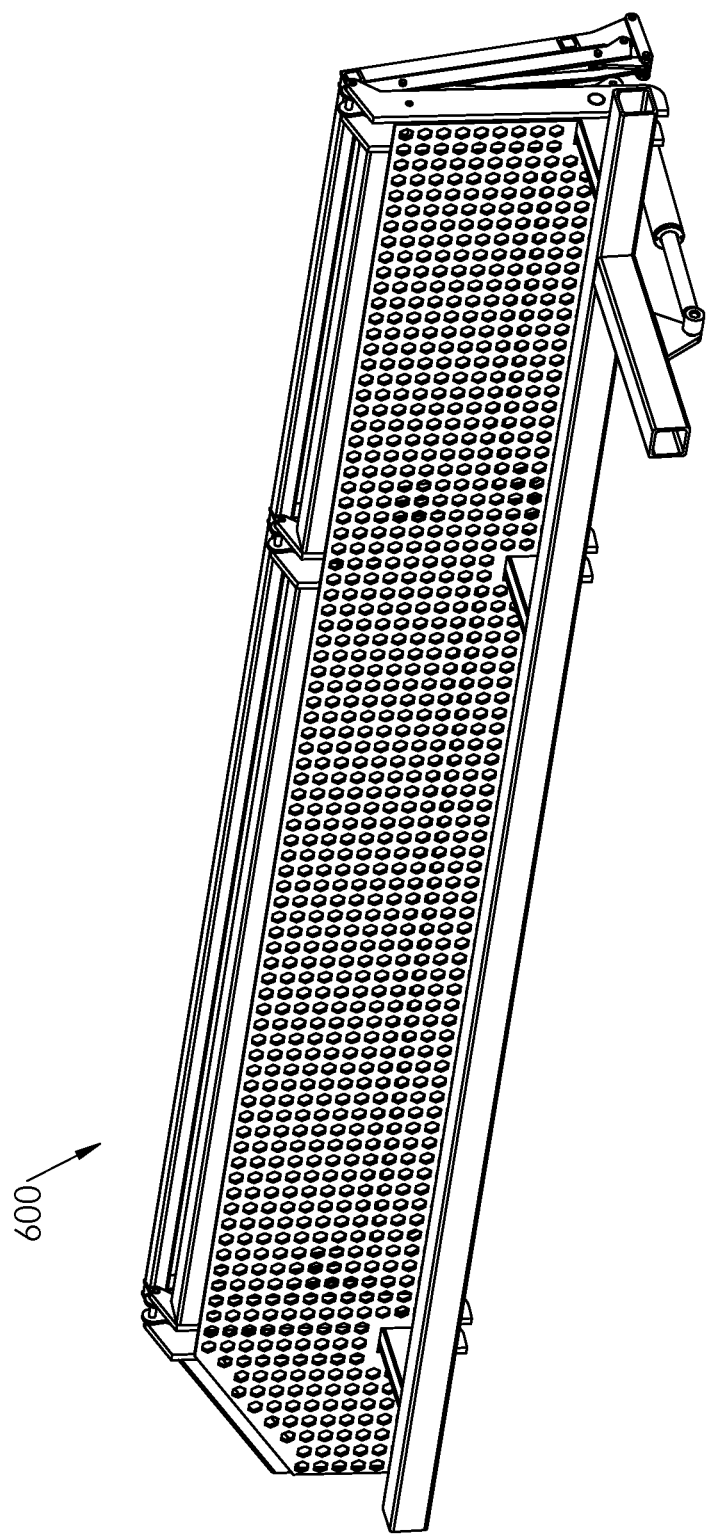
FIG. 49 is an inner side view of the catwalk embodiment of FIG. 37 in the fully-retracted position of FIG. 48.
Figure 50:
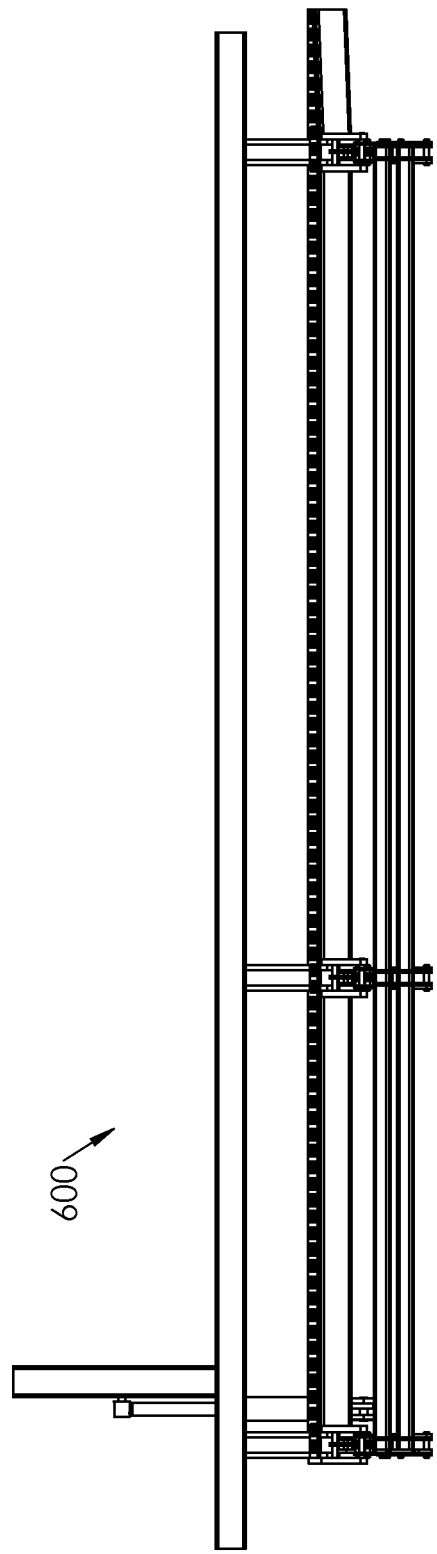
FIG. 50 is a top view of the catwalk embodiment of FIG. 37 in the fully-retracted position of FIG. 48.

Due to the thin railing portions, their folding near to each other, and the orientation of railing portion 624 relative to railing portion 524', catwalk 600 provides a compact, side-by-side configuration and the thin/small footprint for travel and storage. In the retracted position, the floor 622 (including the "main plane" of the floor and the walking surface 622S of the floor) and the railing portion 524' and the railing inner surface 524S' are typically in the range of 0-10 degrees (or 3-7 degrees) from each other, and railing portion 624 is typically parallel to railing portion 524' and so the railing portion 624' and the railing inner surface 624S are also in the range of 0-10 degrees (or 3-7 degrees) from floor 622. Thus, by viewing the end view of FIG. 48, one may see that the footprint of catwalk 600 is only slightly wider than that of catwalk 500, for example adding 3-6 inches at the bottom of the railing assembly, due to the "folding" of railing portion 624 against railing portion 524' and the resulting slanted orientation of railing portion 624. FIG. 48 also illustrates that guide arm system portion 526 and the inner arm 641 of guide arm system portion 626 are between, and mostly hidden by end members of, floor 622 and railing portion 524'. It will be understood from the Figures showing the retracted catwalk 600, for example FIGS. 48, 54 and 56, that the railing second portion 624 is the outermost extremity of the retracted catwalk.

By viewing FIGS. 52, 54, 55, and 57, it may be seen that catwalk 600 may be mounted on the vehicle 100 so that, in the deployed and the retracted positions, catwalk 600 is entirely above the side beams SB, which are the outermost right and left structures of truck 100. Further, in the retracted position, catwalk 600 extends only 0-3 inches horizontally out past the outer, vertical side surface VB of the side beam SB. For example, the retracted catwalk 600 adds only 0-3 inches of width on each side of the vehicle. Therefore, while the railing portions 524', 624 are folded side-by-side with each other, and side-by-side/beside the floor, the catwalk 600 may be mounted inward relative to the outer perimeter of the vehicle 100, so that the retracted catwalk 600 has little or no effect on the vehicle width during travel and storage.

Referring now to FIGS. 43-48, it may be seen that during, and as a consequence of, moving of the floor 622 from the deployed upward to the vertical or generally vertical retracted position, the guide arm system portion 526' automatically pivots/folds the railing portion 524' down from its deployed to its retracted position, as in catwalk 500. Consequently and automatically, guide arm system portion 626 forces railing portion 624 to pivot/fold relative to railing portion 524' upward in an opposite direction than the pivoting of railing portion 524' to reach its retracted position. This is accomplished by means of the structure, placement and geometry of multiple rigid elongated arms 641, 642, 643 of guard arm system portion 626 and the pivotal connections of these arms to each other, to railing portion 524', and to at least one of the arms of guide system portion 526', as will be further described below. The actuation system, and especially its one or more cylinders, accomplish this by powering movement of the floor 622, which powers movement of guide arm system portion 526', which powers movement of guide system portion 626, without contacting or directly powering any part of the railing portion 524' or any part of railing portion 624. Therefore, guide arm system portion 626 may be described as articulating, in response to guide arm system portion 526' pushing and pulling portion 626, to move the railing 624 into its deployed and retracted positions, respectively.

Referring again to FIGS. 43-48, each of railing portion 524' and railing portion 624 is rigid and unbending. Railing portion 524' pivots, on its pivotal connection 525 with the floor 622, as discussed previously for catwalk 500, and railing portion 624 pivots on its pivotal connection 625 with railing portion 524'. Railing portion 524' is shorter than railing 524 in catwalk 500, and railing 624 is generally of the same dimension from connection 625 to its handrail 627 as railing portion 524' is from connection 525 to connection 625. Therefore, in certain embodiments, the combination of railing portion 524' and railing portion 624 are the same, or about the same, size as railing 524, so the two portions 524', 624 may be described as two rigid halves of a railing that pivots/folds in it middle. This way, the retracted railing (524', 624) depends little or no distance below the floor 622 of the retracted catwalk 600 and the cylinder of the actuation system. This limits the distance the retracted railing extends down along the side of the vehicle, for example, to keep the catwalk 600 in both deployed and retracted position entirely above the beams SB, which may be beneficial for mounting and operation on certain vehicles (see FIGS. 54 and 57).

Still referring especially to FIGS. 43-48, outer arm 642 and middle arm 643 form a V-shaped portion V2 of guard arm system 626, and inner arm 641 pivotally connects V-shaped portion V2 to a middle region of outer arm 542 that is spaced from the pivotal connection of outer arm 542 to railing portion 524'. The pivotal connections of inner arm 641 to the V-shaped portion V2 and to outer arm 542 are such that inner arm 641 is spaced from railing portion 524' all along the length of inner arm 641 with inner arm 641 is generally parallel to railing portion 524'. Thus, a first end of inner arm 641 pivotally connects to outer arm 542 of V1, and the opposing second end of inner arm 641 connects to ends of both outer arm 642 and middle arm 643 at the "point" of V2. Outer arm 642 and middle arm 643 of V-shaped portion V2 pivotally connect to railing portion 624 and railing portion 524', respectively. Therefore, similarly to how outer arm 542 and middle arm 543 pivotally connect to railing 524' and the floor 622 on opposite sides of pivotal connection 525, outer arm 642 and middle arm 643 pivotally connect on opposite sides of pivotal connection 625.

Still referring to FIGS. 43-48, pivoting of the floor 522 results in pivoting/movement of guide arm system portion 526' as discussed earlier in this documents, which results in movement of guide arm system portion 626 to fold-down railing portion 624. As railing portion 524' pivots (arrow 5), the movement of outer arm 542 relative to railing portion 524' forces inner arm 641 (arrow 6 in FIGS. 45-47) generally longitudinally, to push the point of V-shaped portion V2 generally away from the floor 622 (arrow 7 on outer arm 642 in FIGS. 45-47), which railing portion 624 to pivot/rotate clockwise (arrow 8 in FIGS. 45-47). During this process, the V-shaped portion V2 moves from its members 642 and 643 being at angles to each other of about 20-25 degrees in the deployed position of FIG. 43, to about 45-50 degrees in the partially-retracted position of FIG. 45, to about 75-80 degrees in the retracted position of FIG. 48. Upon actuation in the opposite direction, these movements occur in in reverse and move the catwalk 600 components from the retracted position to the deployed position.

Figure 43:
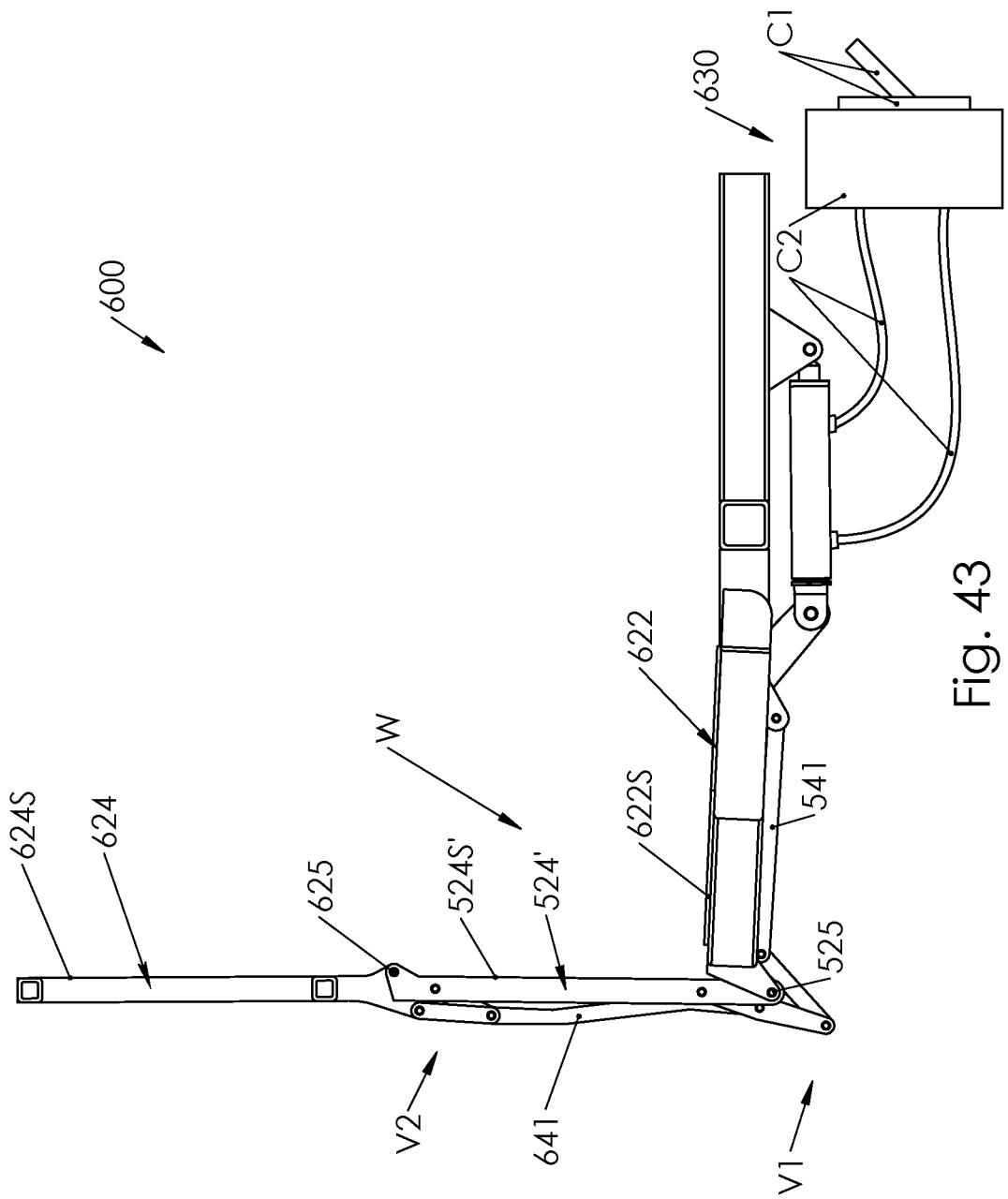
FIG. 43 is an end view of the catwalk embodiment of FIG. 37 in the deployed position.
Figure 44:
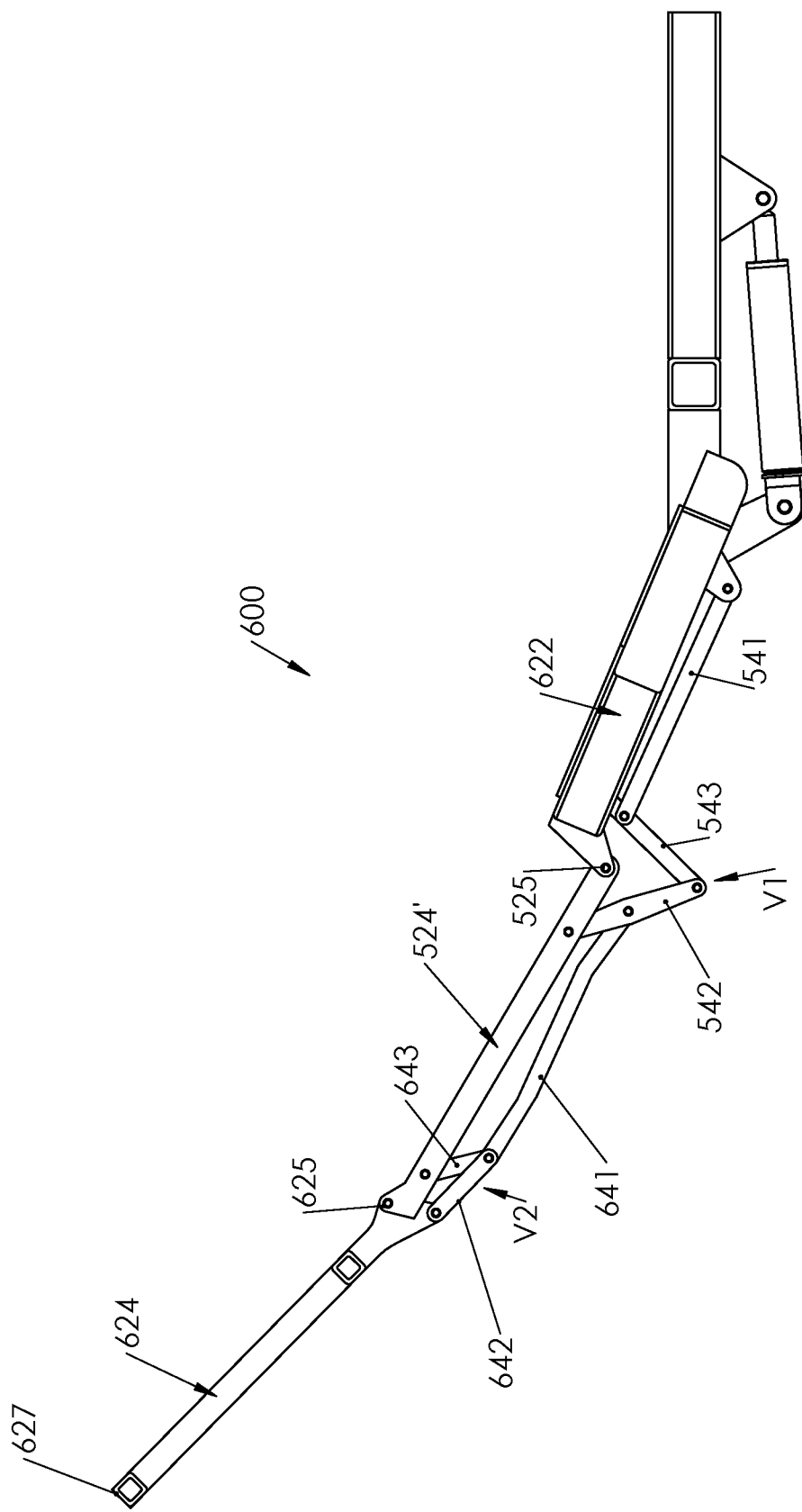
FIG. 44 is an end view of the catwalk embodiment of FIG. 37, wherein the catwalk has been retracted to part-way between the deployed position and the half-stroke position.
Figure 45:
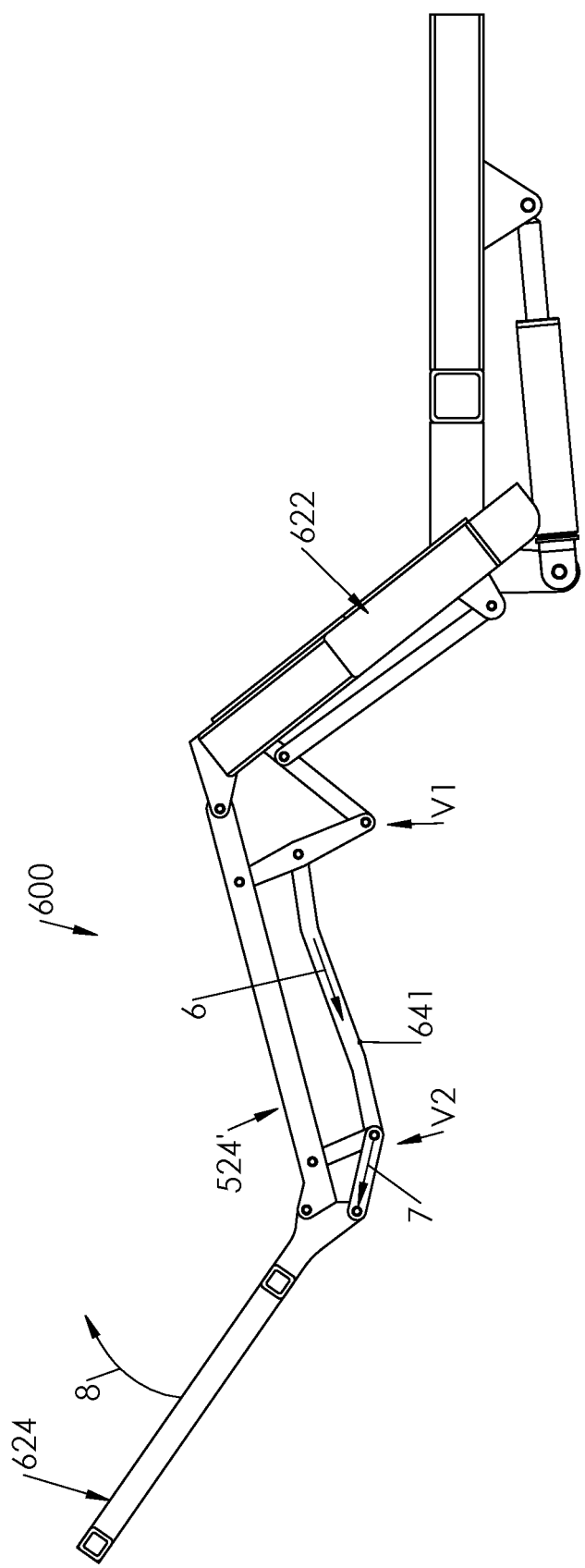
FIG. 45 is an end view of the catwalk embodiment of FIG. 37, wherein the retraction has continued from the position in FIG. 44 to approximately half-stroke position.
Figure 46:
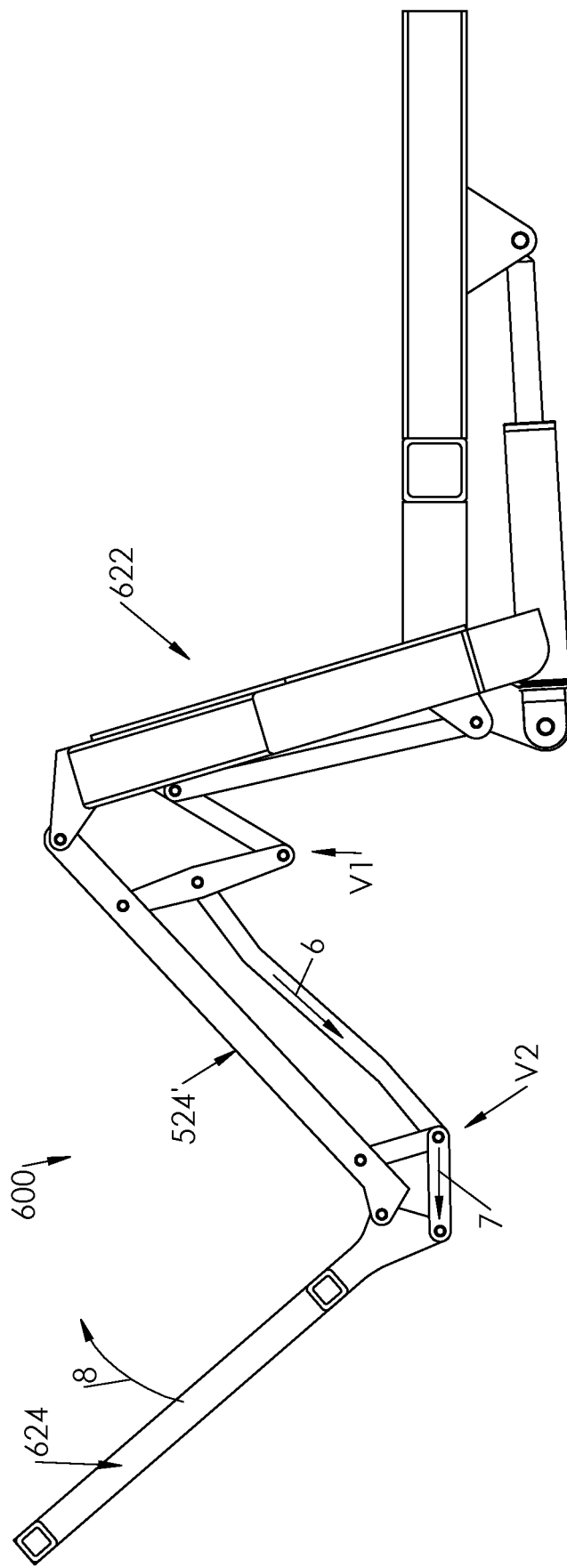
FIG. 46 is an end view of the catwalk embodiment of FIG. 37, wherein retraction has continued from the position in FIG. 45 to part-way between the half-stroke position and the fully-retracted position.
Figure 47:
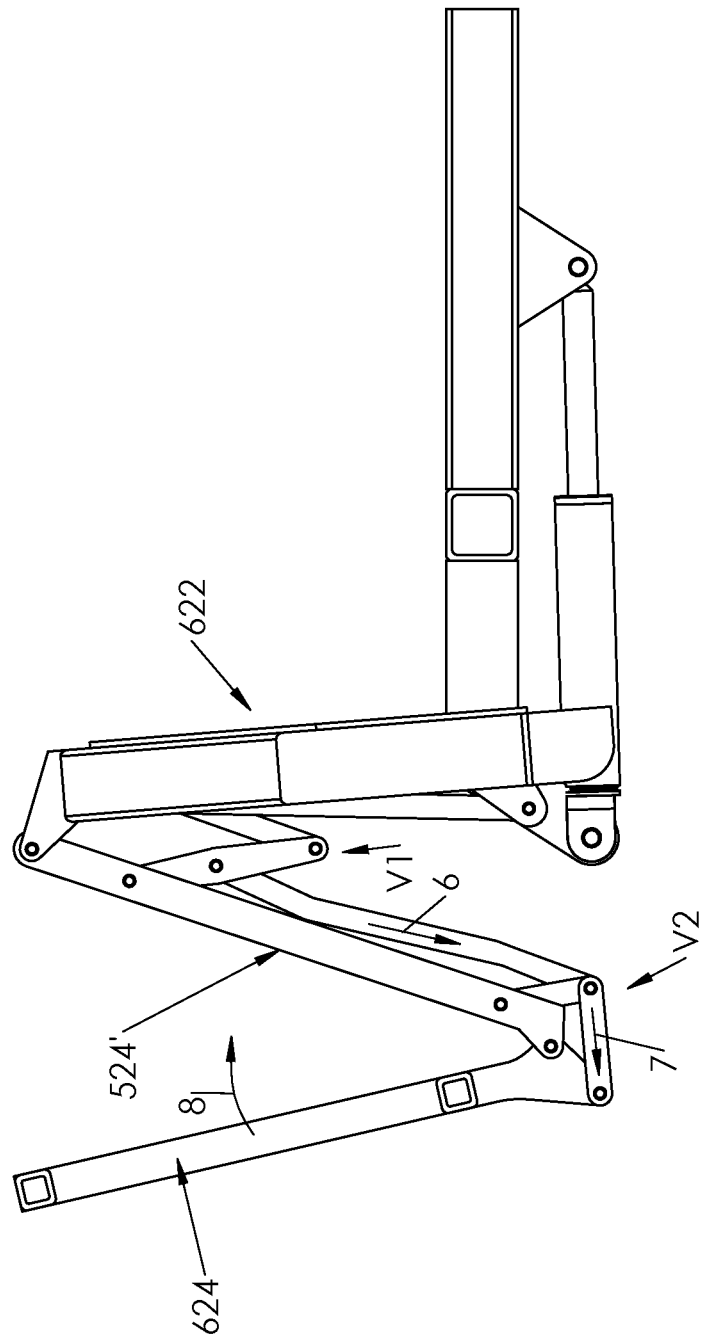
FIG. 47 is an end view of the catwalk embodiment of FIG. 38, wherein retraction has continued from the position in FIG. 46 to nearly the fully-retracted position.

It may be noted that the entire guide arm system including portion 526' and portion 626 (including arms 641, 642, 643) may be described as outside of the walkway W of the catwalk 600, because it is located below and/or out from the railing portions 624, 524', for example, below and/or toward the left on the drawing sheets relative the railing inner surface 524S' and railing inner surface 624S in FIG. 43.

It may be seen to best advantage by viewing the positions and actions of the catwalk of FIGS. 43-48, that lengthening of the actuator retracts/collapses the catwalk, shortening of the actuator deploys the catwalk, and the actuator remains generally horizontal when in, and during movement between, the retracted/collapsed and deployed positions. Further, the catwalk features configuration and center of gravity that may be described as assisting in shortening the actuator and deploying the catwalk, as further described below.

As shown to best advantage in FIG. 48, one may see that the description above about the embodiment of FIGS. 23-27 regarding configuration and center(s) of gravity also applies substantially or entirely to the embodiment of FIGS. 43-48, as will be understood by comparing FIGS. 23-27 and 43-48. In FIG. 48, the center of gravity CG of the floor is shown schematically, relative to the vertical plane VP passing through the floor pivotal connection/axle 523. The center of gravity CG of the floor in FIG. 48 is at, or near and preferably outward from, the vertical plane VP. Compared to the railing of FIGS. 23-27, a second railing portion is added to the first railing portion in FIGS. 43-48, as discussed above, and this moves the center of gravity of the combined floor and railing (first and second railing portions) further outward relative to the center of gravity of the combined floor and railing of FIGS. 23-27, while keeping the combined center of gravity still above the floor pivotal connection/axle 523, so that shortening of the cylinder and deployment continue to be assisted by this configuration. The weight of the floor and railing of catwalk of FIGS. 43-48, and any person or other weight on the floor, may be described as assisting in shortening (or maintaining the shortened condition) of the actuator and, therefore, as assisting in deployment (or maintaining the deployed condition).

Therefore, especially in view of the locations of these centers of gravity, that shortening of the actuator may easily and smoothly start and continue pivoting of the floor from the position in FIG. 48 to full deployment. Similarly as discussed for the catwalk of FIGS. 23-27, the maximum pressure set for the actuator system, due to the above-discussed safety considerations, will be sufficient, and, in most embodiments, greater than the minimum required to accomplish the deployment. In many embodiments, this contributes to the safety and reliability of the catwalk, because, as described elsewhere in this document, the pressure supplied to the actuator may be set/controlled to be a maximum amount that is only capable of lengthening the cylinder, and thereby only capable of retracting/collapsing the catwalk, if a person is not on the catwalk.

Certain embodiments may be described as a catwalk having a pivotal floor and a railing that is controlled in position relative to the pivotal floor by a guide arm system, the guide arm system automatically moving and retaining the railing in desired positions in response to pivoting of the floor, for example, moving of the railing into a deployed in-use position when the floor pivots to its in-use position, and moving the railing into a retracted storage position when the floor pivots to its storage position. Certain embodiments may be described as: a catwalk having an inner side for connection to a side of a vehicle/equipment, the catwalk being moveable between a retracted configuration and a deployed configuration, the catwalk comprising: a floor that is generally vertical in the retracted configuration, and that is generally horizontal in the deployed configuration so that the catwalk in the deployed configuration has a walkway above an upper surface of the floor; a railing that is pivotally connected to the floor and that has at least one railing portion; and a guide arm system adapted to pivot the railing from generally vertical and side-by-side with (and/or beside) the floor, to generally vertical and upending from the floor, when the floor pivots between the retracted configuration and the retracted configuration. The guard arm system preferably does not extend into said walkway when the catwalk is in the deployed configuration. The walkway in certain embodiments may be described above the upper surface of the floor and between the railing in the deployed configuration and said inner side of the catwalk. The catwalk may in certain embodiments further comprise an actuator system for pivoting the floor between the retracted and deployed configurations, wherein said actuator system does not move the guide arm system, and wherein the guard arm system has multiple rigid arms pivotally connected together that are forced, by the floor pivoting, to articulate to pivot the railing. The actuator system may comprise a hydraulic or pneumatic cylinder that has an upper, inner end near said inner side for pivotal connection to the vehicle/equipment, and a lower, outer end that is pivotally connected to an inner edge of the floor, wherein retraction, and extension, of the cylinder pivots the floor from the retracted configuration to the deployed configuration, and from the deployed configuration to the retracted configuration, respectively. In certain embodiments, a maximum pressure may be supplied to the cylinder that is sufficient to retract the catwalk only if a person is not on the catwalk, for example, the maximum pressure supplied to the cylinder may be sufficient to retract the catwalk plus a weight on the floor of the catwalk of no more than 90 pounds. In certain embodiments, said at least one railing portion comprises two railing portions that are pivotally connected to each other, that upend generally vertically in the deployed configuration, and that pivot relative to each other so that both railing portions are generally vertical and side-by-side relative to each other and side-by-side-with/beside the floor in the retracted configuration. In certain embodiments, the guide arm system comprises multiple rigid arms pivotally connected together, wherein said multiple rigid arms are forced, by the floor pivoting, to articulate to pivot the two railing portions relative to each other and also relative to the floor.

Certain embodiments may be described as: a catwalk for connection to a side of a vehicle/equipment, the catwalk being moveable between a deployed configuration and a retracted configuration, the catwalk comprising a floor that is generally horizontal in the deployed configuration and that pivots to be generally vertical in the retracted configuration, and a railing first portion that is pivotally connected to the floor at a floor-railing-connection to upend from the floor in the deployed configuration and to be lowered to be generally vertical and beside the floor in the retracted configuration, and the catwalk further comprising a guide arm system that extends from the floor to the railing first portion and comprises a first set of rigid arms that is adapted to articulate, in response to the floor pivoting to the retracted configuration, to lower the railing first portion.

Figure 54:
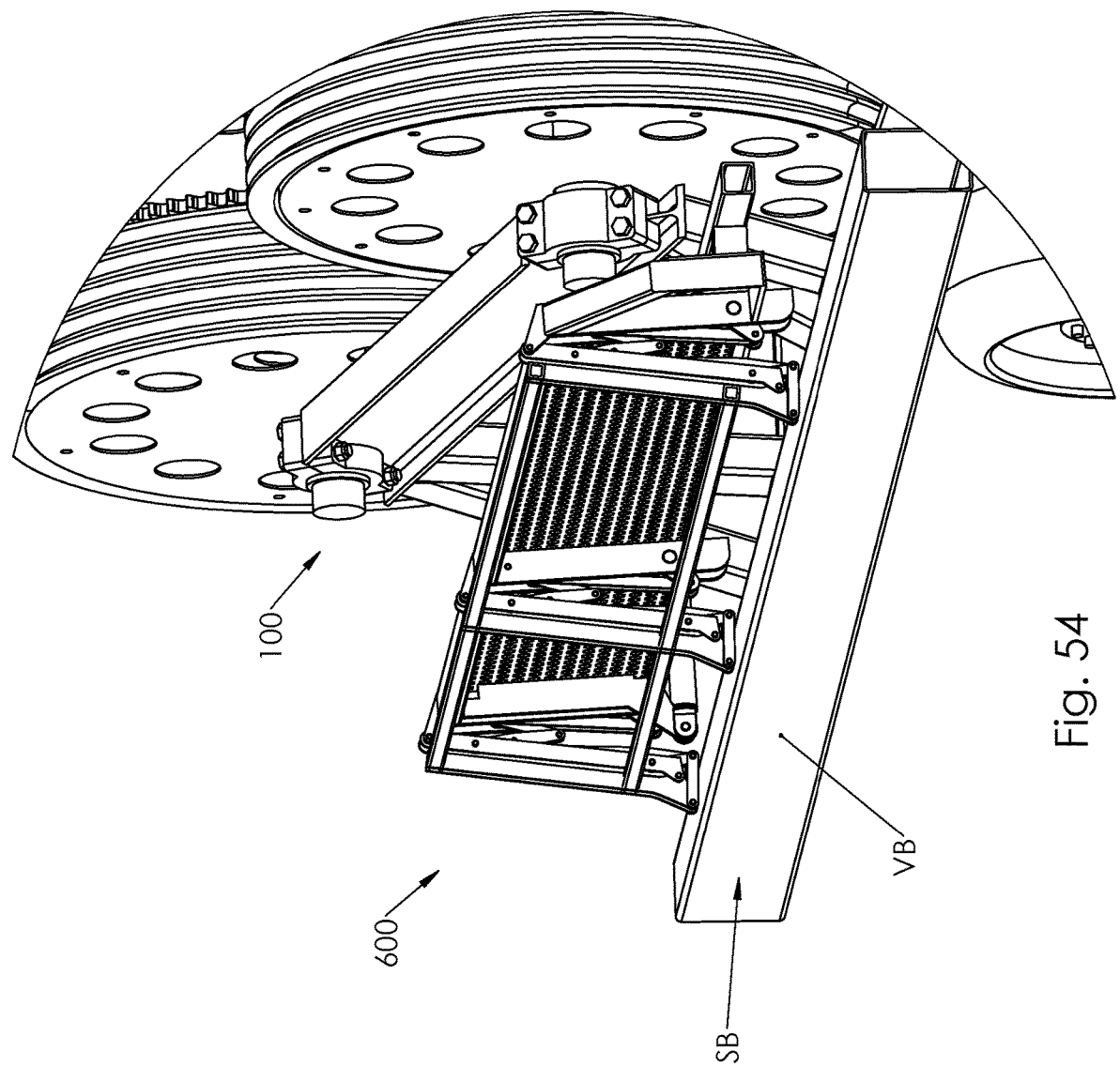
Figure 55:
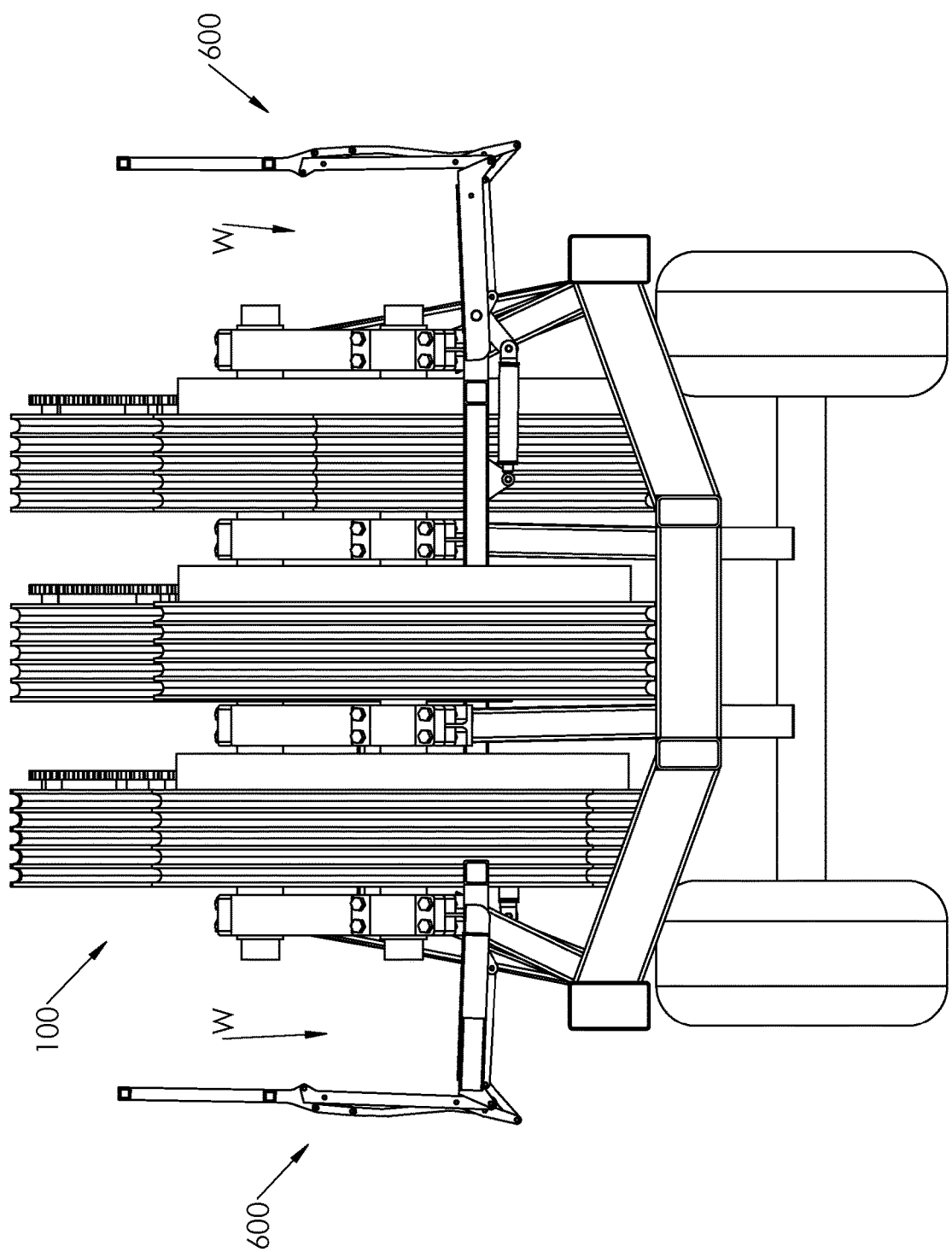
Figure 56:
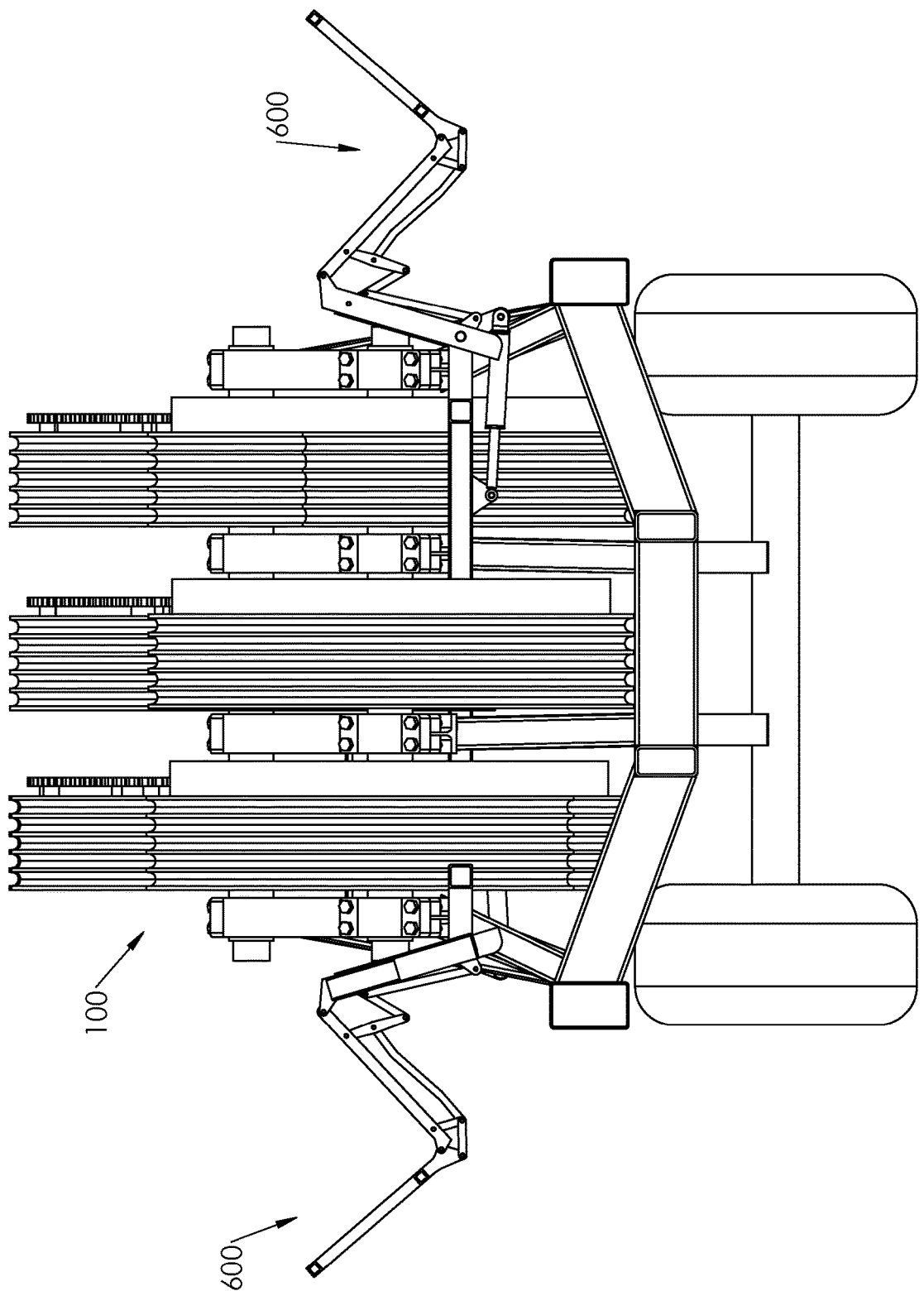
Figure 57:
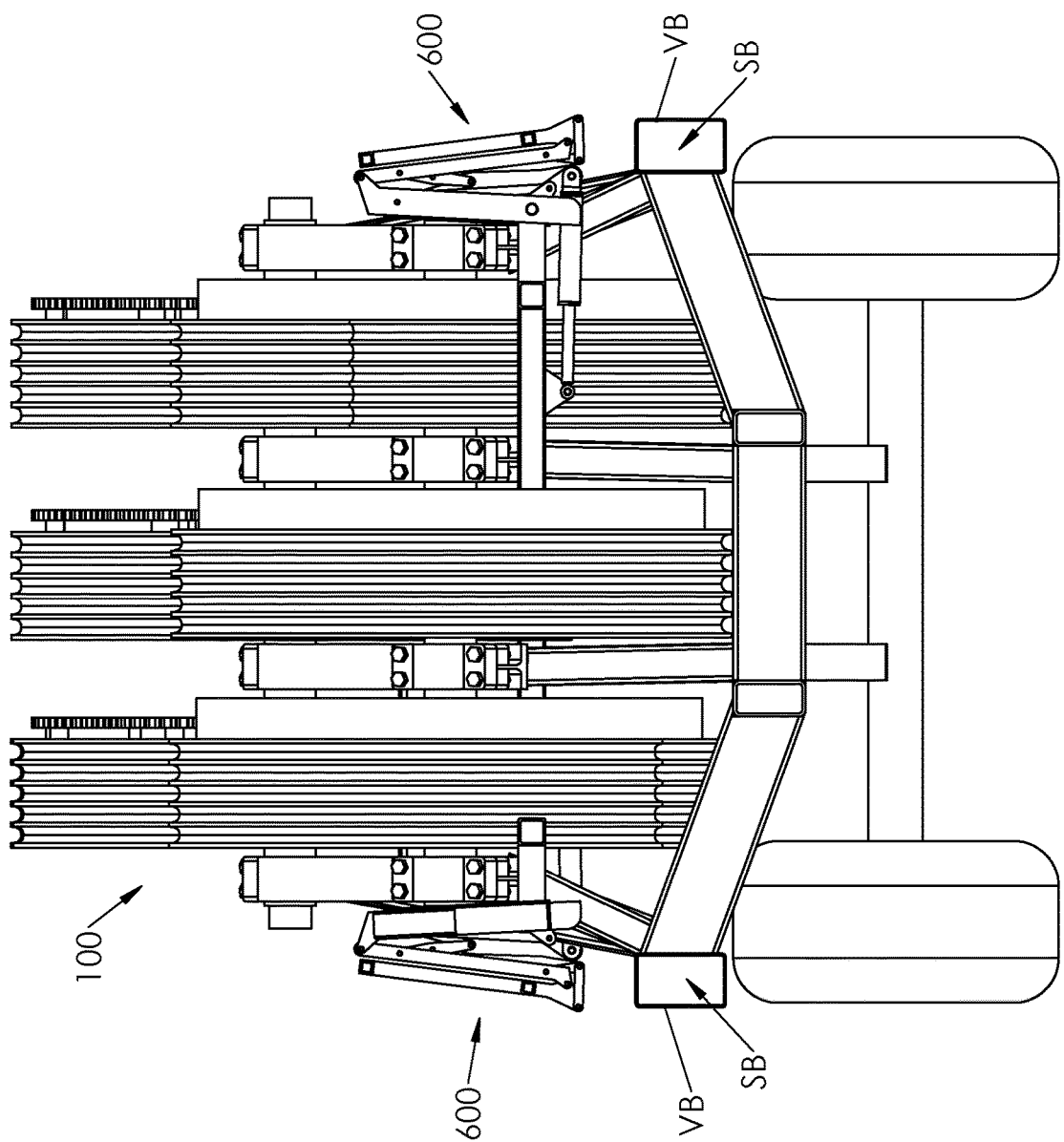
Figure 58:
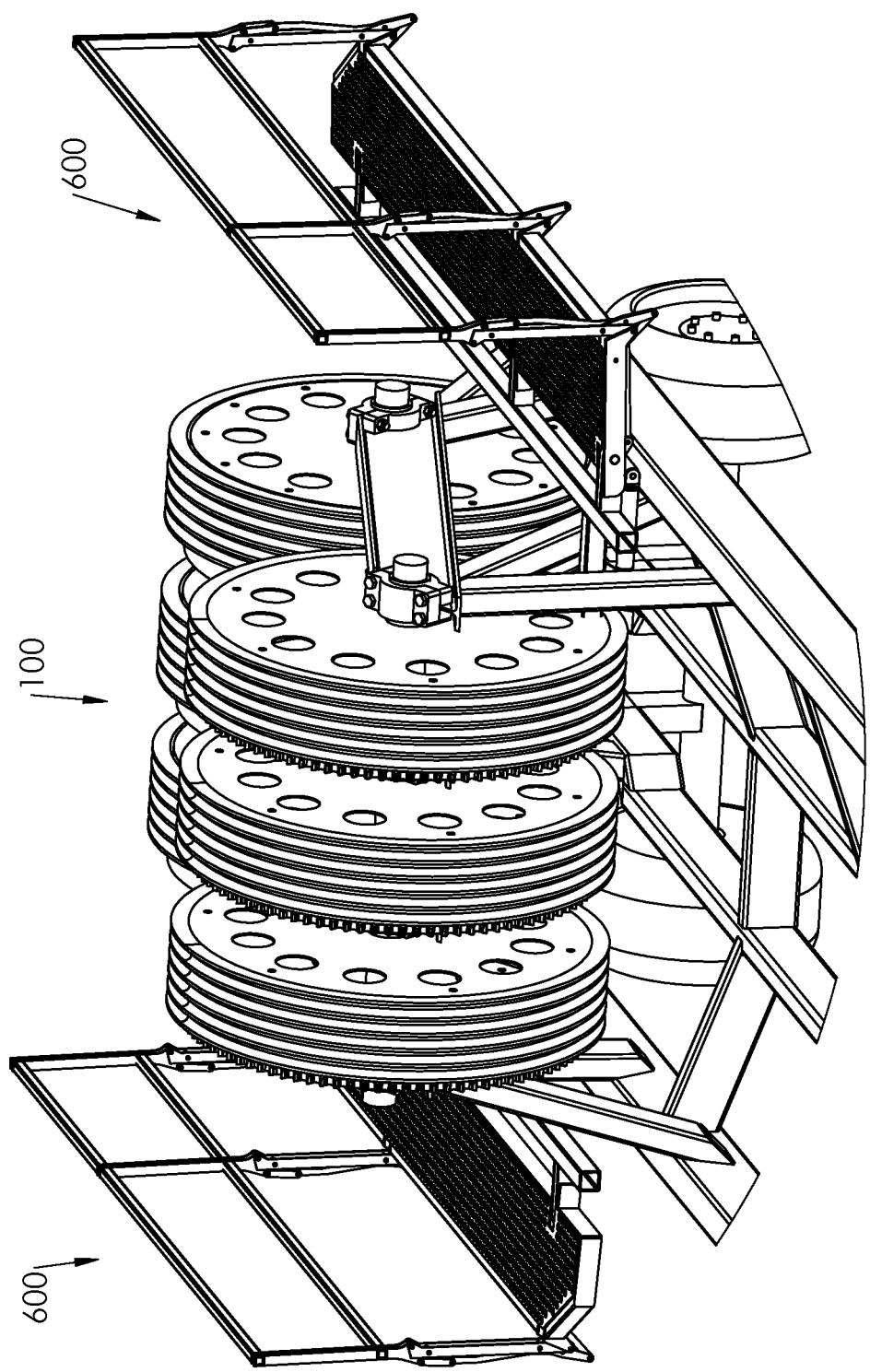

The catwalk may further comprise a railing second portion that is pivotally connected to the railing first portion and that is generally vertical and above the railing first portion in the deployed configuration, and wherein the guide arm system further comprises a second set of rigid arms that is pivotally connected to said first set and that is forced by the articulation of the first set to articulate to pivot the railing second portion relative to the railing first portion to be side-by-side with the railing first portion in the retracted configuration. In certain embodiments, said railing first portion has an outer edge to which the railing second portion is pivotally connected and, in the retracted configuration, the railing second portions extends upward from said outer edge (FIGS. 48, 54, 57). In certain embodiments, the first set of arms comprises two arms pivotally connected to each other to form a first V-shaped arm portion pivotally connecting the floor to the railing first portion. The second set of arms may comprise two arms pivotally connected to each other to form a second V-shaped arm portion pivotally connected the railing first portion to the railing second portion. In certain embodiments, the floor has a walking surface that faces upward in the deployed configuration, and the first set of rigid arms lowers the railing first portion to the retracted configuration, by pivoting the railing first portion in a first rotational direction to move the railing first portion away from the walking surface of the floor, and the second set of rigid arms pivots the railing second portion in a second rotational direction that is opposite said first rotational direction. In the retracted configuration of certain embodiments, said first set of rigid arms is between the floor and the railing first portion, and said second set of rigid arms is between the floor and the railing first portion and extending below bottom edges of the retracted railing first portion and railing second portion. In certain embodiments, the railing first and second portions in the deployed configuration are vertical and co-planar.

Certain embodiments may be described as: a catwalk having an inner side for connection to a vehicle/equipment, the catwalk comprising a floor and a railing, wherein an actuator system pivots the floor from a deployed horizontal position to a vertical retracted position, wherein the floor pivoting forces a guide arm system to articulate to move the railing from a deployed position upending from the floor to a retracted position generally parallel to the retracted floor. In certain embodiments, the railing may comprise multiple railing portions that are pivotal relative to each other, wherein the multiple railing portions all upend from the floor in the deployed position and all fold, in response to the guide arm system articulating, to be vertical, generally parallel, and beside the retracted floor. In certain embodiments, the actuator system comprises at least one hydraulic or pneumatic cylinder that pivots the floor, and wherein the guide arm system is forced to articulate only by the floor pivoting, and the guide arm system is not forced to articulate and not contacted by said at least one cylinder. In other words, the guide arm system articulation may be an automatic response to pivoting of the floor, so that the actuator system forces/controls the floor, and the floor forces/controls the guide arm system, and the guide arm system forces/controls the railing/railing-portions.

In certain embodiments, the catwalks of the above three paragraphs are controlled by activation/movement of a switch/lever/button on the vehicle, for example, by a user in the cab of the vehicle. This way, the catwalk may be deployed and retracted, without any contact by the user on any portion of the catwalk other than said switch/lever/button. The deployment and retraction may therefore be described as taking place "automatically" after (or except for) said activation/movement by the user.

In the Summary of the Invention, throughout the Detailed Description, and in the accompanying drawings, reference is made to particular features, including method steps, of certain embodiments of the invention. It is to be understood that the disclosure of the invention in this specification includes all possible combinations of such particular features. For example, where a particular feature is disclosed in the context of a particular aspect, a particular embodiment, or a particular Figure, that feature can also be used, to the extent appropriate, in the context of other particular aspects, embodiments, and Figures, and in the invention generally. Further, although this disclosed technology has been described above with reference to particular means, materials and embodiments, it is to be understood that the disclosed technology is not limited to these disclosed particulars and extends instead to all equivalents within the broad scope of this disclosure and of following claims.

The invention claimed is:

1. A catwalk having an inner side for connection to a side of a vehicle/equipment and an opposite, outer side away from said side of the vehicle/equipment, the catwalk being moveable between a retracted configuration and a deployed configuration, the catwalk comprising:
a floor having a floor pivotal connection for being pivotally connected to said side of the vehicle/equipment, the floor being generally vertical in the retracted configuration and generally horizontal in the deployed configuration so that the catwalk in the deployed configuration has a walkway above an upper surface of the floor;
a railing pivotally connected to an outer edge of the floor; and
a guide arm system adapted to pivot the railing from generally vertical and side-by-side with the floor in the retracted configuration, upward and inward toward said inner side of the catwalk to be generally vertical and upending from the floor in the deployed configuration, when the floor pivots from the retracted configuration to the deployed configuration, and
said guide arm system being further adapted to pivot the railing from the deployed configuration, outward away from said inner side of the catwalk and downward to the retracted configuration, when the floor pivots from the deployed configuration to the retracted configuration;
wherein, in the retracted configuration, the floor extends upward from the floor pivot connection so that the outer edge of the floor is at or near a top of the catwalk, and the railing extends downward from said outer edge of the floor.

2. The catwalk as in claim 1, wherein, in the retracted configuration, the railing is an outermost extremity of the catwalk.

3. The catwalk as in claim 1, wherein, in the deployed configuration, the walkway is above the upper surface of the floor and between the railing and said inner side of the catwalk, and wherein the catwalk has a length between two ends of the catwalk and the guide arm system extends under the floor perpendicularly to the length of the catwalk and does not extend into said walkway.

4. The catwalk as in claim 1, wherein the catwalk further comprises an actuator system for pivoting the floor between the retracted and deployed configurations, wherein said actuator system is not directly attached to the guide arm system, and wherein the guide arm system has multiple rigid arms pivotally connected together that are forced, by the floor pivoting, to articulate to pivot the railing.

5. The catwalk as in claim 4, wherein the actuator system comprises a hydraulic or pneumatic cylinder that has an inner end near said inner side for pivotal connection to the vehicle/equipment, and an outer end that is pivotally connected to an inner edge of the floor, wherein shortening of the cylinder pivots the floor from the retracted configuration to the deployed configuration, and lengthening of the cylinder pivots the floor from the deployed configuration to the retracted configuration.

6. The catwalk as in claim 5, wherein the floor has a center of gravity that, when the floor is in the retracted configuration, is above the floor pivotal connection and is at or near a vertical plane that extends through the floor pivotal connection.

7. The catwalk as in claim 5 wherein the floor has a center of gravity that, when the floor is in the retracted configuration, is above the floor pivotal connection and is outward from a vertical plane that extends through the floor pivotal connection.

8. The catwalk as in claim 6, wherein, when the floor is moving from the retracted configuration to the deployed configuration, weight of the floor, centered at said center of gravity, assists in shortening the cylinder and in deployment.

9. The catwalk as in claim 7, wherein, when the floor is moving from the retracted configuration to the deployed configuration, weight of the floor, centered at said center of gravity, assists in shortening the cylinder and in deployment.

10. The catwalk as in claim 5, wherein, when the catwalk is moving from the retracted configuration to the deployed configuration, weight of the floor and the railing assists in shortening the cylinder and in deployment.

11. The catwalk as in claim 5, wherein a maximum pressure is supplied to the cylinder that is sufficient to retract the catwalk only if a person is not on the catwalk.

12. The catwalk as in claim 5, wherein a maximum pressure is supplied to the cylinder that is sufficient to retract the catwalk plus a weight on the floor of the catwalk of no more than 90 pounds.

13. The catwalk as in claim 1, wherein said railing comprises two railing portions that are pivotally connected to each other, that upend generally vertically in the deployed configuration, and that pivot relative to each other so that the two railing portions are generally vertical and side-by-side relative to each other and beside the floor in the retracted configuration, wherein the guide arm system comprises multiple rigid arms pivotally connected together that are forced, by the floor pivoting, to articulate so that the two railing portions pivot relative to each other.

14. A catwalk having an inner side for connection to a side of a vehicle/equipment and an opposite, outer side away from said inner side of the catwalk, the catwalk being moveable between a retracted configuration and a deployed configuration, the catwalk comprising:
   a floor having a floor pivotal connection for being pivotally connected to the vehicle/equipment, the floor being vertical in the retracted configuration and horizontal in the deployed configuration so that the catwalk in the deployed configuration has a walkway above an upper surface of the floor;
   a railing pivotally connected to an outer edge of the floor by a pivotal connection joining the railing to the floor; and
   a guide arm system adapted to pivot the railing from vertical and side-by-side with the floor, upward and inward toward said inner side of the catwalk to deploy the railing to be vertical and upending from the floor, when the floor pivots from the retracted configuration to the deployed configuration;
   wherein, in the retracted configuration, the floor extends upward from the floor pivot connection and the railing extends downward and outward from said pivotal connection joining the railing to the floor.

15. The catwalk as in claim 14, wherein the catwalk further comprises an actuator system adapted to pivot the floor between the retracted and deployed configurations, said actuator system not being directly attached to the guide arm system, wherein the guide arm system has multiple rigid arms that are pivotally connected together and adapted to articulate to pivot the railing, when the floor pivots between the retracted configuration to the deployed configuration.

16. The catwalk as in claim 15, wherein the actuator system comprises a hydraulic or pneumatic cylinder that has an inner end near said inner side for pivotal connection to the vehicle/equipment, and an outer end that is pivotally connected to an inner edge of the floor, wherein the actuator system is adapted so that shortening of the cylinder pivots the floor from the retracted configuration to the deployed configuration and lengthening of the cylinder pivots the floor from the deployed configuration to the retracted configuration.

17. The catwalk as in claim 16, wherein the floor has a center of gravity that, when the floor is in the retracted configuration, is above the floor pivotal connection and is on a vertical plane that extends through the floor pivotal connection, so that said center of gravity assists in shortening the cylinder to deploy the floor.

18. The catwalk as in claim 16, wherein the floor has a center of gravity that, when the floor is in the retracted configuration, is above the floor pivotal connection and is outward in a range of 0.25 to 2 inches from a vertical plane that extends through the floor pivotal connection, so that said center of gravity assists in shortening the cylinder to deploy the floor.

19. The catwalk as in claim 14, wherein said railing is a first railing portion and the catwalk further comprises a second railing portion that is pivotally connected to said first railing portion, wherein the first and second railing portions upend vertically in the deployed configuration, and the first and second railing portions are vertical and side-by-side relative to each other and beside the floor in the retracted configuration, and wherein the guide arm system comprises multiple rigid arms pivotally connected together and adapted so that the guide arm system is forced, by the floor pivoting, to pivot the first and second railing portions between the deployed configuration and the retracted configuration.

20. The catwalk as in claim 19, wherein, in the retracted configuration, the second railing portion is an outermost extremity of the catwalk.

21. The catwalk as in claim 14, wherein said guide arm system is further adapted to pivot the railing outward away from said inner side of the catwalk and downward, from the deployed configuration to the retracted configuration, when the floor pivots from the deployed configuration to the retracted configuration.

22. The catwalk as in claim 21, wherein, in the retracted configuration, the railing is an outermost extremity of the catwalk.

* * * * *